US012147172B2

(12) United States Patent
Sugiyama et al.

(10) Patent No.: US 12,147,172 B2
(45) Date of Patent: Nov. 19, 2024

(54) DEVELOPING DEVICE, CLEANING METHOD, PROCESS CARTRIDGE AND ELECTROPHOTOGRAPHIC IMAGE FORMING APPARATUS

(71) Applicant: CANON KABUSHIKI KAISHA, Tokyo (JP)

(72) Inventors: Ryo Sugiyama, Shizuoka (JP); Taiji Katsura, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/463,431

(22) Filed: Sep. 8, 2023

(65) Prior Publication Data

US 2024/0111227 A1 Apr. 4, 2024

(30) Foreign Application Priority Data

Sep. 15, 2022 (JP) ................................ 2022-146783

(51) Int. Cl.
*G03G 15/08* (2006.01)
*G03G 15/095* (2006.01)

(52) U.S. Cl.
CPC ....... *G03G 15/0818* (2013.01); *G03G 15/095* (2013.01)

(58) Field of Classification Search
CPC ........... G03G 15/0233; G03G 15/0808; G03G 15/0818; G03G 15/095; G03G 15/1685
See application file for complete search history.

(56) References Cited

U.S. PATENT DOCUMENTS

| | | | | |
|---|---|---|---|---|
| 8,655,238 | B2 | 2/2014 | Uno et al. | |
| 10,678,161 | B2 | 6/2020 | Tsuru et al. | |
| 10,877,395 | B2 | 12/2020 | Oka et al. | |
| 10,942,471 | B2 | 3/2021 | Ogawa et al. | |
| 11,650,516 | B2 | 5/2023 | Uesugi et al. | |
| 11,841,629 | B2 * | 12/2023 | Ishii | G03G 15/1685 |
| 2020/0150556 | A1 | 5/2020 | Oka et al. | |
| 2020/0310282 | A1 * | 10/2020 | Sugiyama | G03G 15/0818 |
| 2020/0310283 | A1 | 10/2020 | Ogawa et al. | |
| 2022/0100113 | A1 | 3/2022 | Tanaka et al. | |
| 2022/0308496 | A1 * | 9/2022 | Nagaoka | G03G 15/0808 |
| 2023/0161275 | A1 | 5/2023 | Uno et al. | |

FOREIGN PATENT DOCUMENTS

| | | | |
|---|---|---|---|
| EP | 3 715 959 | A1 | 9/2020 |
| JP | 2017-062335 | A | 3/2017 |
| JP | 2020-079910 | A | 5/2020 |
| JP | 2020-166227 | A | 10/2020 |
| JP | 2022-055357 | A | 4/2022 |

OTHER PUBLICATIONS

Extended European Search Report in European Application No. 23197077.3 (Feb. 2024).

* cited by examiner

*Primary Examiner* — Hoang X Ngo
(74) *Attorney, Agent, or Firm* — Venable LLP

(57) ABSTRACT

A developing device comprising a developing roller in which a vicinity of an outer surface of a surface layer is hardened, a toner supply roller, and a toner, wherein the developing roller has fine particles comprising an organo-silicon compound and having a substantially hemispherical shape on the outer surface, a particle diameter of the fine particles is within a specific range, and the toner comprises silica particles as an external additive and a adhesion rate of the silica particles is 50% or more.

11 Claims, 7 Drawing Sheets

Fig.3A
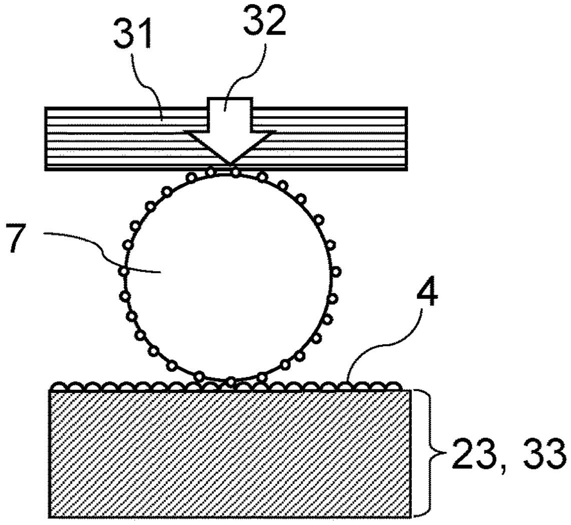
Fig.3B
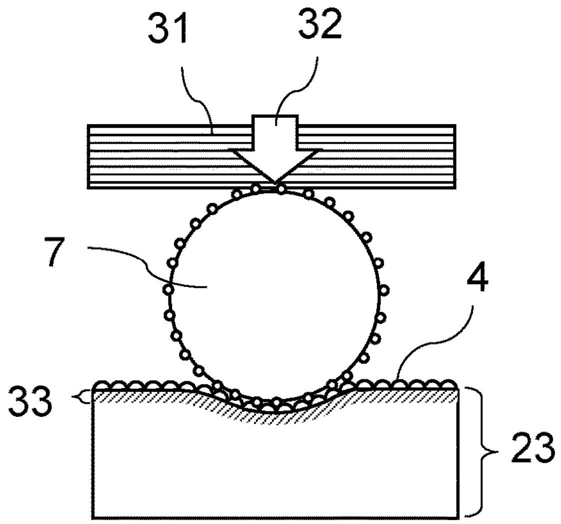
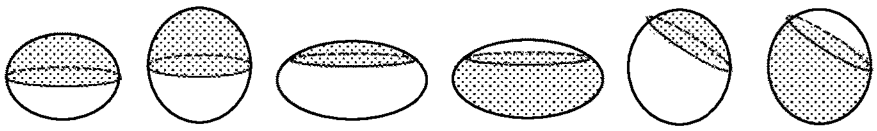
Fig.4

DEVELOPING DEVICE, CLEANING METHOD, PROCESS CARTRIDGE AND ELECTROPHOTOGRAPHIC IMAGE FORMING APPARATUS

BACKGROUND OF THE INVENTION

Field of the Invention

The present disclosure relates to a developing device, cleaning method, process cartridge and electrophotographic image forming apparatus.

Description of the Related Art

A developing device of an electrophotographic image forming apparatus (hereinafter also referred to as an "electrophotographic apparatus") according to one aspect includes a developing container in which toner is stored, a toner supply roller for supplying the toner to a developing roller, a toner layer thickness control member for regulating the amount of the supplied toner on the developing roller to an appropriate amount, and the developing roller for transporting the toner and developing the toner into an electrostatic latent image.

From the viewpoints of further enhancement of customer value and environmental protection, electrophotographic apparatuses are required to be able to form higher quality images stably during a long period of time. Accordingly, the developing device of the electrophotographic apparatus is also required to have the performance to form higher quality images stably during a long period of time.

In order to improve the durability of the developing device, it is important to prevent the occurrence of scratches on the outer surface of the developing roller and the occurrence of toner filming during long-term use.

Japanese Patent Application Publication No. 2020-166227 discloses a developing roller in which only the vicinity of the outer surface of a surface layer containing a crosslinked urethane resin is hardened to a high degree to suppress the occurrence of scratches on the outer surface and the occurrence of toner filming at an extremely high level, and also discloses a process cartridge having the developing roller.

Further, Japanese Patent Application Publication No. 2017-062335 discloses a developing device in which a developing roller is coated with fine silicone resin particles.

SUMMARY OF THE INVENTION

At least one aspect of the present disclosure is directed to providing a developing device that contributes to stable formation of high quality electrophotographic images. Moreover, at least one aspect of the present disclosure is directed to providing a cleaning method for a developing roller that can better remove the adhered matter on the outer surface of the developing roller. Furthermore, at least one aspect of the present disclosure is directed to providing a process cartridge that contributes to stable formation of high quality electrophotographic images. Furthermore, at least one aspect of the present disclosure is directed to providing an electrophotographic image forming apparatus capable of stably forming high quality electrophotographic images.

According to at least one aspect of the present disclosure, there is provided a developing device comprising a developing roller, toner, and a toner supply roller that supplies the toner to the developing roller, wherein the developing device comprising:

a developing roller;

a toner; and a toner supply roller that supplies the toner to the developing roller, the developing roller comprising:

an electro-conductive substrate, and a surface layer on the electro-conductive substrate, the surface layer being composed of a single layer, wherein the surface layer has a matrix comprising a crosslinked urethane resin as a binder, when an elastic modulus of the matrix in a first region in a cross section in a thickness direction of the surface layer is defined as E1, the first region being from an outer surface of the surface layer to a position at a depth of 0.1 μm from the outer surface, and an elastic modulus of the matrix in a second region in the cross section is defined as E2, the second region being from a position at a depth of 1.0 μm from the outer surface to a position at a depth of 1.1 μm from the outer surface, E1 and E2 satisfy following relational expressions (1) and (2):

$$E1 \geq 200\ \text{MPa} \quad (1)$$

$$10\ \text{MPa} \leq E2 \leq 100\ \text{MPa} \quad (2)$$

wherein fine particles are attached to the outer surface of the surface layer, and the fine particles form protrusions on the outer surface of the surface layer;

each of the fine particles comprises an organosilicon compound, and in a cross-sectional view of each of the fine particles and the outer surface of the surface layer, each of the fine particles has a substantially flat surface that is in surface contact with the outer surface of the surface layer and a curved surface that constitutes at least a part of each of the protrusions;

a number-average value of the longest diameter w of the substantially flat surface of the fine particles is 10 nm to 400 nm;

the toner comprises a toner particle and silica particles as an external additive;

the toner particle comprises a binder resin; and an adhesion rate of the silica particles to the toner particle measured by a water washing method is 50% or more.

According to at least one aspect of the present disclosure, there is provided a cleaning method of a developing roller's outer surface to which a plurality of fine particles are attached, wherein the developing roller comprises an electro-conductive substrate and a surface layer on the electro-conductive substrate, the surface layer being composed of a single layer, surface layer has a matrix comprising a crosslinked urethane resin as a binder, when an elastic modulus of the matrix in a first region in a cross section in a thickness direction of the surface layer is defined as E1, the first region being from the outer surface of the surface layer to a position at a depth of 0.1 μm from the outer surface, and an elastic modulus of the matrix in a second region in the cross section is defined as E2, the second region being from a position at a depth of 1.0 μm from the outer surface to a position at a depth of 1.1 μm from the outer surface, E1 and E2 satisfy following formulas (1) and (2):

$$E1 \geq 200 \text{ MPa} \quad (1)$$

$$10 \text{ MPa} \leq E2 \leq 100 \text{ MPa} \quad (2)$$

wherein fine particles are attached to the outer surface of the surface layer, and the fine particles form protrusions on the outer surface of the surface layer, each of the fine particles comprises an organosilicon compound, and in a cross-sectional view of each of the fine particles and the outer surface of the surface layer, each of the fine particles has a substantially flat surface that is in surface contact with the outer surface of the surface layer and a curved surface that constitutes at least a part of each of the protrusions, a number-average value of the longest diameter w of the substantially flat surface of the fine particles is 10 nm to 400 nm, the cleaning method comprises the steps of:

supplying toner to the developing roller using a toner supply roller and removing the plurality of fine particles from the outer surface of the surface layer by bringing the toner into contact with the plurality of the fine particles attached to the outer surface of the surface layer; wherein the toner comprises a toner particle and silica particles as an external additive;

the toner particle comprises a binder resin; and an adhesion rate of the silica particles to the toner particle measured by a water washing method is 50% or more.

Further, according to at least one aspect of the present disclosure, there is provided an electrophotographic process cartridge having the developing device and configured to be detachably mounted to a main body of an electrophotographic image forming apparatus is provided. Moreover, according to at least one aspect of the present disclosure, there is provide an electrophotographic image forming apparatus having the developing device.

Further features of the present disclosure will become apparent from the following description of exemplary embodiments with reference to the attached drawings.

BRIEF DESCRIPTION OF THE DRAWINGS

FIGS. 3A and 3B are enlarged schematic diagrams when toner is pressed against the developing roller surface layer in the developing device relating to the present disclosure;

FIG. 4 is a diagram showing an example of a substantially hemispherical shape in fine particles relating to the present disclosure;

FIGS. 5A to 5C are diagrams showing examples of the maximum length df, maximum height h, and maximum width b at the time of cross-sectional observation of fine particles.

DESCRIPTION OF THE EMBODIMENTS

Figure 1:
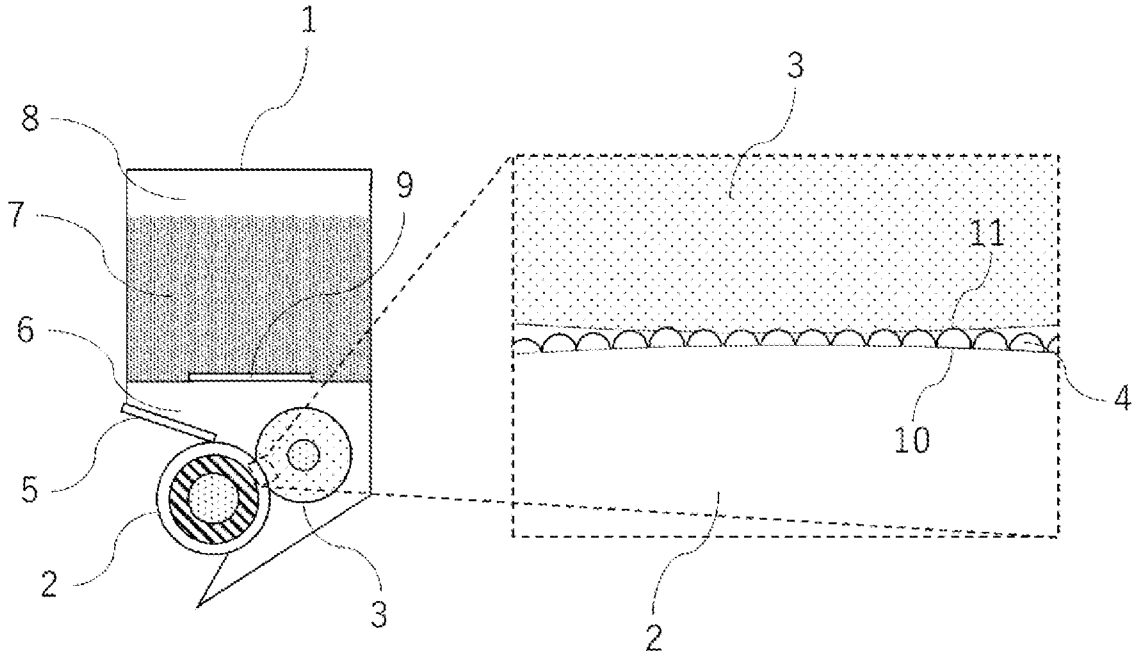
FIG. 1 is a sectional view of a developing device relating to the present disclosure and an enlarged view of a contact position between a developing roller and a toner supply roller.

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

According to the studies of the present inventors, the following phenomenon occurred when the developing device having the developing roller according to Japanese Patent Application Publication No. 2020-166227 was allowed to stand in a high-temperature and high-humidity environment for a long period of time. That is, at the contact position between the toner supply roller and the developing roller, a bleed substance that bled from the toner supply roller to the developing roller sometimes accumulated on the outer surface of the developing roller, and band-like unevenness occurred on the electrophotographic image at the pitch of the developing roller. Hereinafter, an electrophotographic image with band-like unevenness may be referred to as "band image".

In addition, it was difficult to prevent the occurrence of band images even when a coating agent made of silicone resin fine particles was applied to the developing roller in advance as in Japanese Patent Application Publication No. 2017-062335.

The present inventors have presumed that where the developing device having the developing roller relating to the invention described in Japanese Patent Application Publication No. 2020-166227 is used, band images with a developing roller pitch may be output for the following reason when the developing device is allowed to stand in a high-temperature and high-humidity environment for a long period of time.

The developing device, which is assembled with a developing roller and toner supply roller, may be allowed to stand in a high-temperature and high-humidity environment for a long period of time in the process of transportation and storage. At this time, the bleed substance from the toner supply roller, for example, the unreacted resin components of the toner supply roller and components of ion conductive agents added for imparting electric conductivity, and the like, may migrate from the toner supply roller to the developing roller at the contact position between the toner supply roller and the developing roller.

In the case of a conventional developing roller with a flexible surface layer, which is not a developing roller in which only the vicinity of the outer surface of a surface layer is hardened to a high degree as disclosed in Japanese Patent Application Publication No. 2020-166227, it is considered that even if the bleed substance has migrated to the developing roller, the migrated bleed substance will permeate inside through the gaps in the crosslinked structure of the flexible surface layer and will unlikely stay on the outer surface of the developing roller. Therefore, the concentration of the bleed substance is unlikely to increase locally on the outer surface of the developing roller that is in direct contact with the toner. As a result, it is considered that band images are unlikely to form.

Meanwhile, in the case of the developing roller disclosed in Japanese Patent Application Publication No. 2020-166227, in which the vicinity of the outer surface of the surface layer is hardened, as described above, the occurrence of scratches on the outer surface and the occurrence of toner filming can be suppressed. However, since the crosslink density in the vicinity of the outer surface of the surface layer is high, the bleed substance from the toner supply roller is unlikely to permeate into of the surface layer. For this reason, it is considered that the bleed substance is likely to be present locally at a high concentration at the contact position of the outer surface of the developing roller with the toner supply roller. As a result, the charging performance of the toner and the adherence of the toner component at the contact position of the developing roller differ significantly from those at other positions, so that bands tend to occur with the pitch of the developing roller in the electrophotographic image.

The occurrence of the band images due to the local adhesion of the bleed substance to the developing roller surface as described above cannot be sufficiently prevented even when a coating agent such as silicone fine particles is present between the developing roller and the members, as in the developing container described in Japanese Patent Application Publication No. 2017-062335. This is conceivably because even if the coating agent is simply placed between the toner supply roller and the developing roller, the bleed substance can reach the outer surface of the developing roller through the outer surface or the interior of the coating agent.

Accordingly, on the premise of using a developing roller in which only the vicinity of the outer surface of the surface layer is hardened to a high degree, the present inventors have made repeated studies to obtain a developing device equipped with such a developing roller that can prevent the occurrence of band images even after the developing device is allowed to stand in a high-temperature and high-humidity environment. As a result, the present inventors have found that by allowing fine particles having a specific shape to be present in a specific manner on the outer surface of the developing roller, it is possible to prevent local adhesion of bleed substance to the outer surface of the toner supply roller. That is, by making the bleed substance to adhere mainly to the fine particles attached to the outer surface of the developing roller, it is possible to prevent the bleed substance from locally adhering to the outer surface of the toner supply roller.

That is, the developing device relating to the at least one aspect of the present disclosure comprises a developing roller, toner, and a toner supply roller that supplies the toner to the developing roller.

The developing roller comprises:

an electro-conductive substrate, and a surface layer on the electro-conductive substrate, the surface layer being composed of a single layer, wherein the surface layer has a matrix comprising a crosslinked urethane resin as a binder, when an elastic modulus of the matrix in a first region in a cross section in a thickness direction of the surface layer is defined as E1, the first region being from an outer surface of the surface layer to a position at a depth of 0.1 μm from the outer surface, and an elastic modulus of the matrix in a second region in the cross section is defined as E2, the second region being from a position at a depth of 1.0 μm from the outer surface to a position at a depth of 1.1 μm from the outer surface, E1 and E2 satisfy following relational expressions (1) and (2):

$$E1 \geq 200\text{ MPa} \quad (1)$$

$$10\text{ MPa} \leq E2 \leq 100\text{ MPa} \quad (2)$$

wherein fine particles are attached to the outer surface of the surface layer, and the fine particles form protrusions on the outer surface of the surface layer;

each of the fine particles comprises an organosilicon compound, and in a cross-sectional view of each of the fine particles and the outer surface of the surface layer, each of the fine particles has a substantially flat surface that is in surface contact with the outer surface of the surface layer and a curved surface that constitutes at least a part of each of the protrusions;

a number-average value of the longest diameter w of the substantially flat surface of the fine particles is 10 nm to 400 nm;

the toner comprises a toner particle and silica particles as an external additive;

the toner particle comprises a binder resin; and an adhesion rate of the silica particles to the toner particle measured by a water washing method is 50% or more.

In addition, when high-quality electrophotographic images are to be formed after storing the developing device in a high-temperature and high-humidity environment, it is preferable that the fine particles on the outer surface of the developing roller to which the bleed substance has adhered be quickly removed from the outer surface of the developing roller. Accordingly, the present inventors have repeatedly studied methods for removing the fine particles having a specific shape and attached to the outer surface of the developing roller in a specific manner from the outer surface of the developing roller. As a result, the inventors have found that the above object can be well achieved by using a specific toner as the toner provided in the developing device.

That is, at least one aspect of the present disclosure relates to a cleaning method for cleaning an outer surface of a developing roller having a plurality of fine particles attached to the outer surface, wherein the developing roller comprising:

an electro-conductive substrate, and a surface layer on the electro-conductive substrate, the surface layer being composed of a single layer, wherein the surface layer has a matrix comprising a crosslinked urethane resin as a binder, when an elastic modulus of the matrix in a first region in a cross section in a thickness direction of the surface layer is defined as E1, the first region being from an outer surface of the surface layer to a position at a depth of 0.1 μm from the outer surface, and an elastic modulus of the matrix in a second region in the cross section is defined as E2, the second region being from a position at a depth of 1.0 μm from the outer surface to a position at a depth of 1.1 μm from the outer surface, E1 and E2 satisfy following relational expressions (1) and (2):

$$E1 \geq 200\text{ MPa} \quad (1)$$

$$10\text{ MPa} \leq E2 \leq 100\text{ MPa} \quad (2)$$

wherein fine particles are attached to the outer surface of the surface layer, and the fine particles form protrusions on the outer surface of the surface layer;

each of the fine particles comprises an organosilicon compound, and in a cross-sectional view of each of the fine particles and the outer surface of the surface layer, each of the fine particles has a substantially flat surface that is in surface contact with the outer surface of the surface layer and a curved surface that constitutes at least a part of each of the protrusions;

a number-average value of the longest diameter w of the substantially flat surface of the fine particles is 10 nm to 400 nm;

the toner comprises a toner particle and silica particles as an external additive;

the toner particle comprises a binder resin; and an adhesion rate of the silica particles to the toner particle measured by a water washing method is 50% or more.

Here, FIG. 1 is a sectional view of the developing device according to one embodiment of the present disclosure and an enlarged view of the contact position between the developing roller and the toner supply roller.

A developing device 1 shown in FIG. 1 has a developing roller 2, a toner supply roller 3, a developing container 6 in which a developing blade 5 is accommodated, and a toner container 8 in which toner 7 is accommodated. Further, the developing roller 2 is assembled so as to contact the toner supply roller 3 and the developing blade 5. The toner supply roller 3 supplies the toner 7 to the developing roller 2.

In the developing device 1 before initial use, the toner 7 may be present inside the developing container 6 or at the contact position between the developing roller 2 and the toner supply roller 3 as long as the effects of the present disclosure are not impaired. As shown in FIG. 1, the toner 7 is preferably partitioned from the developing container 6 by a sealing member 9 or the like. In the case of the developing device 1 in which the toner 7 is partitioned from the developing container 6 by the sealing member 9, the sealing member 9 is removed before the initial use of the developing device 1, so that the toner 7 flows into the developing container 6 from an opening provided in the toner container 8.

Further, the developing roller 2 comprised in the developing device 1 according to one embodiment of the present disclosure has an electro-conductive base and a single surface layer on the base. In the developing roller 2, a plurality of fine particles 4 are attached to the outer surface of the surface layer. The fine particles form protrusions on the outer surface of the surface layer. In a cross-sectional view of the fine particles 4 and the outer surface, each of the fine particles 4 has a substantially flat surface 10 that is in surface contact with the outer surface of the surface layer and a curved surface 11 constituting at least part of the protruding portion (preferably constitutes the protruding portion). For example, the fine particles 4 have a substantially hemispherical shape having a substantially flat surface and a curved surface. Further, the substantially flat surface 10 is in contact with the outer surface of the developing roller 2, and each fine particle 4 has a protruding curved surface 11 in the direction opposite to the substantially flat surface 10.

That is, the substantially flat surface of the fine particles 4 and the outer surface of the developing roller 2 come into surface contact, and the contact area increases. As a result of increasing the contact area between the fine particles 4 and the developing roller 2, the bleed substance from the toner supply roller 3 adheres and accumulates on the outer surface of the fine particles 4, while direct adhesion and accumulation thereof on the outer surface of the developing roller 2 can be greatly suppressed.

Furthermore, the present inventors have found that the band images can be quickly suppressed by making it possible to quickly remove the fine particles 4 from the outer surface of the developing roller 2 when the developing device 1 is driven. The developing device 1 comprising the developing roller 2 with the fine particles 4 attached to outer surface thereof and the toner supply roller 3 in contact with each other is allowed to stand in a high-temperature and high-humidity environment for a long period of time. In this case, as described above, the bleed substance adheres and accumulates on the outer surface of the fine particles 4 present at the contact position between the developing roller 2 and the toner supply roller 3.

If the fine particles 4 are still present on the outer surface of the developing roller 2 even when the developing device 1 is driven after being allowed to stand, there are locations on the outer surface of the developing roller 2 where the fine particles 4 to which the bleed substance has adhered and accumulated are present and locations where the fine particles 4 to which no bleed substance has adhered are present. Since the charging performance of the toner and the adhesion of toner components differ significantly between these locations, band images are eventually generated.

However, according to the developing device 1 of one embodiment of the present disclosure, the fine particles 4 are quickly removed from the outer surface of the developing roller 2 when the developing device 1 is driven, and the bleed substance is also removed together with the fine particles 4 from the outer surface of the developing roller 2. It is considered that since direct adhesion and accumulation of the bleed substance on the outer surface of the developing roller 2 after the removal is also suppressed by the fine particles 4, as described above, the band images are eventually suppressed quickly.

Here, the conditions under which the fine particles 4 can be quickly removed from the outer surface of the developing roller 2 will be described hereinbelow.

Figure 2:
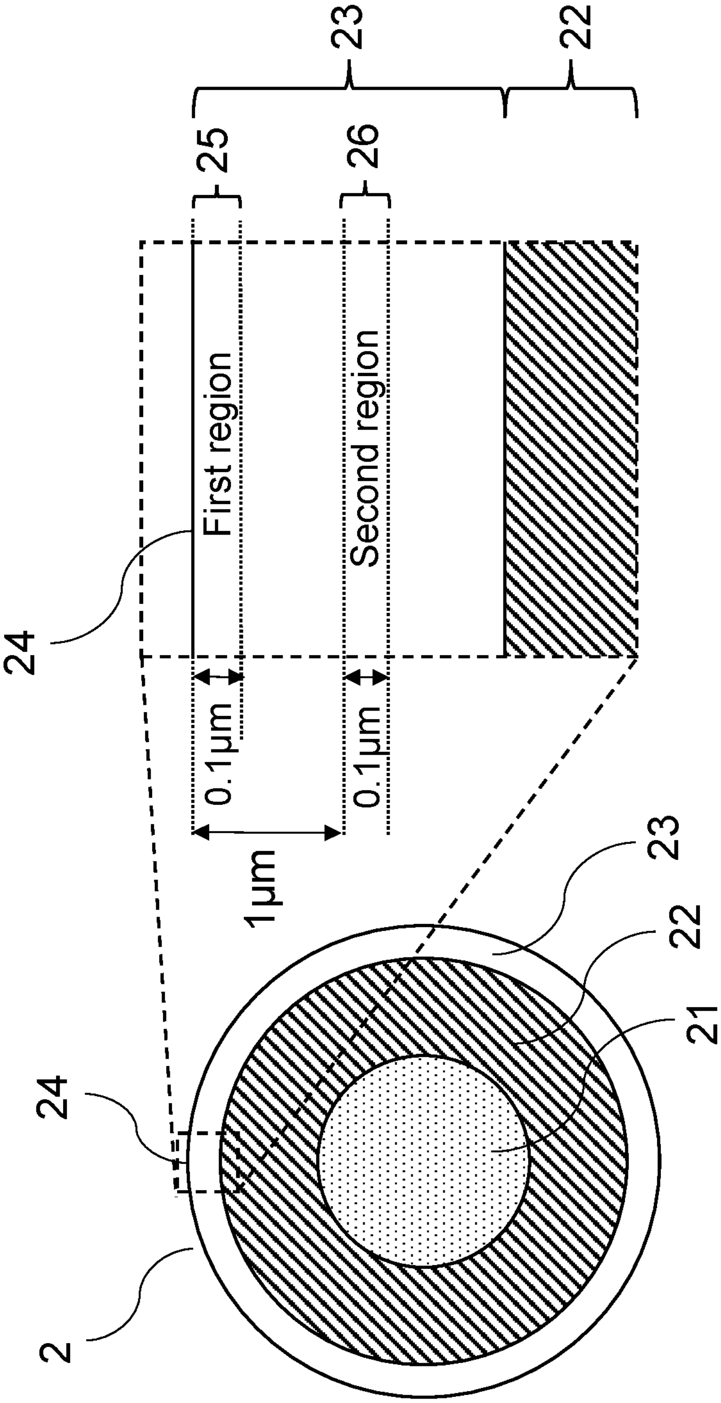
FIG. 2 is schematic sectional view of the developing roller relating to the present disclosure and an enlarged view including the surface layer and outer surface thereof.

The first condition is for the developing roller. FIG. 2 shows a cross-sectional view perpendicular to the longitudinal direction of the developing roller 2 having a mandrel 21 and an intermediate layer 22 as an electro-conductive substrate, and a single surface layer 23, and also an enlarged view of the surface layer 23 and the outer surface 24 thereof.

The surface layer 23 of the developing roller 2 is a single layer and has a matrix comprising a crosslinked urethane resin as a binder. As shown in the enlarged view of FIG. 2, a region from the outer surface 24 of the surface layer 23 to a depth of 0.1 μm is a first region 25, and a region from 1.0 μm to 1.1 μm in depth is a second region 26. The elastic modulus of the matrix in the first region 25 is denoted by E1, and the elastic modulus of the matrix in the second region 26 at a depth of from 1.0 μm to 1.1 μm from the outer surface is denoted by E2. At this time, the following formulas (1) and (2) are simultaneously satisfied.

$$E1 \geq 200 \text{ MPa} \quad (1)$$

$$10 \text{ MPa} \leq E2 \leq 100 \text{ MPa} \quad (2)$$

As described above, where the substantially flat surface of the fine particle and the developing roller are in surface contact and the contact area thereof increases, the bleed substance from the toner supply roller adheres and accumulates on the outer surface of the fine particles. Therefore, it is possible to greatly suppress the direct adhesion and accumulation of bleed substance on the outer surface of the developing roller. Meanwhile, the attachment force between the fine particles and the surface of the developing roller increases in proportion to the increase in the contact area, making it difficult to remove the fine particles on which the bleed substance adheres and accumulates from the outer surface of the developing roller.

However, by setting a state with a high hardness such that the elastic modulus E1 of the matrix in the first region located in the vicinity of the outer surface of the developing roller surface layer is 200 MPa or more, the tackiness between the fine particles and the outer surface of the developing roller is reduced, and the attachment force can be significantly reduced. As a result, even if the contact area between the fine particles and the outer surface of the developing roller is large, the fine particles can be removed from the outer surface of the developing roller by rubbing and polishing with the specific toner described hereinbelow.

In addition, fine particles can be quickly removed by limiting the high-hardness region only to the vicinity of the outer surface of the developing roller surface layer and making the inside of the surface layer flexible, that is, by setting the elastic modulus E2 of the matrix in the second region from 10 MPa to 100 MPa.

Here, FIGS. 3A and 3B show enlarged schematic diagrams when the contact member 31 presses the toner 7 against the developing roller surface layer 23. By driving the developing device according to the present disclosure, the toner 7 receives contact pressure 32 from the contact member 31 such as the developing blade or the toner supply roller and is pressed and rubbed against the developing roller surface layer 23. As a result, the outer surface of the developing roller surface layer 23 is polished by the toner 7, and the fine particles 4 attached to the outer surface are removed.

As shown in FIG. 3A, when a whole of the developing roller surface layer 23 is the high-hardness region 33, the surface layer 23 is not deformed even when pressed by the toner 7. Therefore, the contact area with the toner 7 acting as an abrasive, that is, the area that can be abraded by one toner particle, is small, and the fine particles 4 cannot be quickly removed.

Meanwhile, like in the developing roller of the present disclosure, when the high-hardness region 33 is only a very thin first region in the vicinity of the outer surface and the interior (second region) is flexible, the surface layer 23 can deform along the shape of the toner 7 when pressed by the toner 7. As a result, the contact area between the toner 7 and the developing roller surface layer 23 increases when the surface layer is pressed, and one toner particle can polish a wide area of the outer surface of the developing roller. At this time, since the vicinity of the outer surface of the developing roller has a high hardness as described above and the attachment force between the fine particles 4 and the developing roller is reduced, the fine particles can be quickly removed from the outer surface of the surface layer of the developing roller by polishing with the toner 7.

Where the elastic modulus E2 of the matrix in the second region is set to 100 MPa or less, as described above, the developing roller surface layer can deform following the shape of the toner when the toner is pressed against the developing roller surface layer by the contact member. As a result, the contact area between the toner at the time of pressing and the outer surface of the developing roller increases, and one toner particle can polish a wide region of the outer surface of the developing roller. Further, where the elastic modulus E2 is 10 MPa or more, flexibility sufficient to apply a reaction force to the toner necessary for polishing during rubbing accompanying the driving of the developing device is ensured. Thus, even if the outer surface of the surface layer of the developing roller has high hardness, this is only a very thin region of the outer surface, and the interior is sufficiently flexible, thereby making it possible to quickly remove the fine particles from the outer surface of the surface layer.

The second condition is for the fine particles. Each of the fine particles has a substantially hemispherical shape with a substantially flat surface and a curved surface and comprises an organosilicon compound. In a cross-sectional view of the fine particles and the outer surface in a state where the fine particles are in contact with the outer surface of the developing roller, the substantially flat surface of each fine particle is in contact with the outer surface of the developing roller, and each of the fine particles has a protruding curved surface facing in the direction opposite to the substantially flat surface. Furthermore, the number-average value of the longest diameter w of the substantially flat surface of the fine particles is 10 nm to 400 nm.

The fine particles form protrusions on the surface of the surface layer. In a cross-sectional view of the fine particles and the outer surface, each of the fine particles has a substantially flat surface that is in surface contact with the outer surface of the surface layer and a curved surface that constitutes at least part of the protruding portion. That is, as shown in the enlarged view of FIG. 1, the fine particles are attached to the outer surface of the developing roller so that the substantially flat surface of the fine particles and the outer surface of the developing roller are in contact with each other. As a result, during rubbing induced by the driving of the developing device, the curved surface of the fine particles meshes with the silica particles serving as an external additive of the toner, and the fine particles can receive a shear force necessary for removal thereof from the developing roller surface.

Furthermore, where the fine particles comprise an organosilicon compound, affinity thereof with the outer surface of the developing roller, which is a resin, and the silica particles, which are a silicon compound, can be obtained. Because of this affinity, in addition to the shape of the fine particles, a state in which the contact area between the fine particles and the outer surface of the developing roller is large is likely to be maintained and adhesion and accumulation of the bleed substance on the outer surface of the developing roller can be suppressed. Further, even at the time of meshing with the silica particles, due to the affinity between the silica particles and the fine particles, an appropriate chemical attachment force is likely to act, and the fine particles are likely to receive the shear force necessary for removal thereof from the outer surface of the developing roller.

Further, when the number-average value of the longest diameter w of the substantially flat surface of the fine particles is 10 nm or more, the fine particles comprising the organosilicon compound and the silica particles as the external additive are likely to mesh with each other, and the fine particles can be quickly removed from the outer surface of the developing roller. Furthermore, when the number-average value of w is 400 nm or less, the contact area between the substantially flat surface of the fine particles and the outer surface of the developing roller tends to be large, and adhesion and accumulation of the bleed substance on the outer surface of the developing roller can be suppressed.

The third condition is for the toner. The toner comprises a toner particle and silica particles as an external additive. The toner particle comprises a binder resin. In addition, the sticking rate of the silica particles to the toner particle measured by a water washing method is 50% or more.

Since the toner comprises silica particles as an external additive, as described above, the toner meshes with the fine particles comprising the organosilicon compound when the developing device is driven, and the shear force required to remove the fine particles from the outer surface of the developing roller is likely to be applied. In addition, since the silica particles are an inorganic silicon compound and are harder than the resin, the silica particles can demonstrate sufficient abrasiveness with respect to the developing roller, in which the vicinity of the outer surface is increased in hardness, and the fine particles comprising the organosilicon compound. Further, when the toner particle comprises a binder resin and the silica particles, and the adhesion rate of the silica particles is 50% or more, the attachment force between the silica particles and the toner particle exceeds the attachment force between the fine particles and the developing roller. Therefore, the fine particles can be removed from the outer surface of the developing roller by the shear force at the time of meshing with the fine particles.

As described above, none of the above three conditions produces an effect independently, but by satisfying all of them at the same time, it is possible to exhibit a series of effects, that is, to suppress adhesion and accumulation of the bleed substance on the outer surface of the developing roller due to the fine particles and to remove quickly the fine particles with the toner, leading to quick suppression of band images.

Embodiments of the present disclosure will be described hereinbelow.

Developing Roller

FIG. 2 shows a cross-sectional view perpendicular to the longitudinal direction of the developing roller 2 having the mandrel 21 and the intermediate layer 22 as an electro-conductive substrate, and a single surface layer 23, and an enlarged view of the surface layer 23. The intermediate layer 22 may be a single layer or multiple layers. For example, in a non-magnetic one-component contact development process, a developing roller having the surface layer 23 provided on an electro-conductive substrate in which the intermediate layer 22 is laminated on the mandrel 21 is preferably used.

1. Conductive Substrate

A configuration including the columnar or hollow cylindrical conductive mandrel 21 and the electro-conductive intermediate layer 22 consisting of one or multiple layers and provided on such mandrel can be used as the electro-conductive substrate. The mandrel 21 has a columnar or hollow cylindrical shape and is made of the following conductive materials.

Metals or alloys such as aluminum, copper alloys, and stainless steel; iron plated with chromium or nickel; and synthetic resins having electrical conductivity. A known adhesive may be applied to the surface of the mandrel 21 for the purpose of improving the adhesiveness with the intermediate layer 22, the surface layer 23, and the like on the outer periphery thereof.

As described above, the developing roller in which the intermediate layer 22 is laminated between the mandrel 21 and the surface layer 23 is preferably used in the non-magnetic one-component contact developing process. The intermediate layer 22 imparts hardness and elasticity to the developing roller 2 such that enable pressing against a photosensitive member with appropriate nip width and nip pressure so that the toner can be supplied in an appropriate amount to the electrostatic latent image formed on the surface of the photosensitive member.

It is usually preferable that the intermediate layer 22 be formed of a molded rubber material. Examples of rubber materials include the following. Ethylene-propylene-diene copolymer rubber (EPDM), acrylonitrile-butadiene rubber (NBR), chloroprene rubber (CR), natural rubber (NR), isoprene rubber (IR), styrene-butadiene rubber (SBR), fluororubber, silicone rubber, epichlorohydrin rubber, hydrogenated NBR, and urethane rubber.

These can be used alone or in combination of two or more. Among these, silicone rubber is particularly preferable because it is unlikely to cause permanent compressive strain even in contact with other members (toner layer thickness control member and the like) over a long period of time. Specific examples of silicone rubbers include cured products of addition-curable silicone rubbers.

The layer thickness of the intermediate layer 22 is preferably 0.5 mm to 10 mm. Setting the layer thickness of the intermediate layer 22 0.5 mm to 10 mm is preferable because appropriate nip width and nip pressure are likely to be obtained. More preferably, the layer thickness is 1 mm to 5 mm.

Further, the intermediate layer 22 may be an intermediate layer 22 obtained by blending a conductivity-imparting agent such as an electron conductive substance or an ion conductive substance with the rubber material. The volume resistivity of the intermediate layer 22 is preferably adjusted to $10^3$ Ω·cm to $10^{11}$ Ω·cm, more preferably to $10^4$ Ω·cm to $10^{10}$ Ω·cm.

2. The Surface Layer

The surface layer 23 is a single layer and has a matrix comprising a crosslinked urethane resin as a binder. As shown in the enlarged view of FIG. 2, a region from the outer surface 24 of the surface layer 23 to a depth of 0.1 μm is a first region 25, and a region from 1.0 μm to 1.1 μm in depth is a second region 26. The elastic modulus of the matrix in the first region 25 is denoted by E1, and the elastic modulus of the matrix in the second region 26 at a depth of from 1.0 μm to 1.1 μm from the outer surface is denoted by E2. At this time, the following formulas (1) and (2) are simultaneously satisfied.

$$E1 \geq 200\ \text{MPa} \tag{1}$$

$$10\ \text{MPa} \leq E2 \leq 100\ \text{MPa} \tag{2}$$

That is, the surface layer 23 has a very thin region with high hardness in the vicinity of the outer surface 24, and the region inside from the above region is flexible.

The elastic modulus E1 of the first region is 200 MPa ($200\times10^6$ Pa) or more. By setting E1 to 200 MPa or more, as described above, the tackiness between the fine particles and the outer surface of the developing roller is lowered, and the attachment force can be greatly suppressed. As a result, even when the contact area between the fine particles and the outer surface of the developing roller is large, the fine particles can be removed from the outer surface of the developing roller by rubbing and polishing with the specific toner.

Although there is no particular upper limit for the elastic modulus E1 of the first region, the upper limit is set to an appropriate range in relation to the elastic modulus E2 of the second region. Normally, it is preferable that the elastic modulus E1 of the first region be 4500 MPa ($4500\times10^6$ Pa) or less.

The elastic modulus E1 is preferably 200 MPa to 4500 MPa, more preferably 200 MPa to 1200 MPa, even more preferably 350 MPa to 1050 MPa, and still more preferably 450 MPa to 1020 MPa.

Also, the elastic modulus E2 of the second region is 10 MPa to 100 MPa. As described above, fine particles can be quickly removed by setting E2 to 10 MPa to 100 MPa. The range is preferably 15 MPa to 50 MPa, more preferably 20 MPa to 50 MPa, still more preferably 20 MPa to 30 MPa.

The elastic moduli E1 and E2 can be measured with a scanning probe microscope SPM, which will be described hereinbelow.

Such increase in hardness only in the vicinity of the outer surface can be realized by impregnating a crosslinked urethane resin with an acrylic monomer and crosslinking. In particular, since the matrix comprises a crosslinked urethane resin as a binder, even when the elastic modulus of the impregnated and crosslinked acrylic monomer (crosslinked acrylic resin) is extremely high, the effect of the toughness of the crosslinked urethane resin makes it possible to suppress the embrittlement of the portion where the crosslinked acrylic resin is present. As a result, as described above, even if the developing roller surface deforms following the shape of the toner when the toner is pressed against the developing roller, cracks and scratches are less likely to occur, resulting in high durability of the developing roller.

In addition, since the matrix comprises a crosslinked urethane resin as a binder, it is possible to form an interpenetrating polymer network structure (hereinafter referred to as an IPN structure) together with the crosslinked acrylic resin.

An IPN structure is a structure in which two or more polymer network structures are intertwined and entangled without being bound by covalent bonds. This structure will not unravel unless the molecular chains forming the network are cut.

There are several methods for forming the IPN structure. For example, a sequential network formation method may be used in which a first component polymer network is formed first, then swollen with a second component monomer and a polymerization initiator, and then a second component polymer network is formed. Alternatively, a simultaneous network formation method may be used in which a first component monomer and a second component monomer with different reaction mechanisms and respective polymerization initiators are mixed to form a network at the same time.

Also, resin particles may be added to the surface layer for the purpose of forming protrusions on the outer surface of the developing roller. When the surface layer has to have surface roughness, fine particles for imparting roughness to the surface layer can be comprised. Specifically, fine particles of polyurethane resin, polyester resin, polyether resin, polyamide resin, acrylic resin, and polycarbonate resin can be used. These are also preferably crosslinked resin particles. Crosslinked urethane beads are preferred.

Also, the layer thickness of the surface layer is preferably 4 μm to 100 μm. The layer thickness is the thickness at the portion where the protruding portion is not formed. A layer thickness of 4 μm to 100 μm is preferable because flexible deformation of the surface layer easily occurs. The layer thickness is more preferably 6 μm to 30 μm, and still more preferably 10 μm to 25 μm.

2-1. Crosslinked Urethane Resin

The matrix comprises crosslinked urethane resin as a binder. The crosslinked urethane resin comprised in the matrix is not particularly limited as long as the elastic modulus E2 described above can be achieved. Polyurethanes can be obtained from polyols and isocyanates, optionally with chain extenders.

Polyols, which are raw materials for polyurethanes, can be exemplified by polyether polyols, polyester polyols, polycarbonate polyols, polyolefin polyols, acrylic polyols, and mixtures thereof.

Isocyanates, which are raw materials for polyurethanes, can be exemplified by the following. Tolylene diisocyanate (TDI), diphenylmethane diisocyanate (MDI), polymeric MDI, naphthalene diisocyanate (NDI), tolidine diisocyanate (TODI), hexamethylene diisocyanate (HDI), isophorone diisocyanate (IPDI), phenylene diisocyanate (PPDI), xylylene diisocyanate (XDI), tetramethylxylylene diisocyanate (TMXDI), cyclohexane diisocyanate, and mixtures thereof.

Among the above, polymeric MDI is preferable. Here, the polymeric MDI is represented by the following chemical formulas (1) and (1)'. In chemical formula (1)', n is preferably from 1 to 4. Chemical formula (1) is the case where n is 1 in chemical formula (1)'.

Commercially available polymeric MDIs may be used, examples thereof including Millionate MR series (manufactured by Tosoh Corporation) such as Millionate MR200 (trade name).

(1)

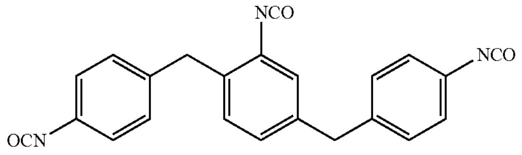

(1)'

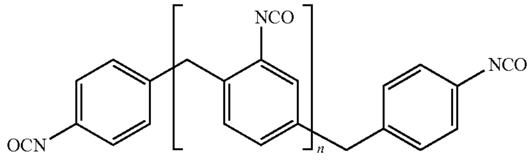

Examples of chain extenders that are raw materials for polyurethanes include difunctional low-molecular-weight diols such as ethylene glycol, 1,4-butanediol and 3-methylpentanediol, trifunctional low-molecular-weight triols such as trimethylolpropane, and mixtures thereof.

In addition, prepolymer type isocyanate compounds having an isocyanate group at the end, which are obtained by pre-reacting the above various isocyanate compounds and various polyols in a state in which the isocyanate groups are excessive, may be used. As these isocyanate compounds, materials obtained by blocking isocyanate groups with various blocking agents such as MEK oxime may be used.

The elastic modulus E2 can be adjusted within the above range by the molecular structure of the crosslinked urethane resin or the interaction caused by the addition of fine particles such as silica and carbon black. Specifically, for example, E2 can be increased by decreasing the molecular weight of the polyol or isocyanate, increasing the number of functional groups of hydroxyl groups or isocyanate groups, and increasing the amount of fine particles added. Also, E2 can be reduced by increasing the molecular weight of the polyol or isocyanate, decreasing the number of hydroxyl groups or isocyanate groups, and decreasing the amount of fine particles added.

2-2. Crosslinked Acrylic Resin

The surface layer preferably has a crosslinked acrylic resin impregnated in the crosslinked urethane resin. The type of acrylic monomer that is impregnated into the crosslinked urethane resin and crosslinked is preferably a polyfunctional monomer having a plurality (two or more) of acryloyl groups or methacryloyl groups as functional groups in order to form a crosslinked structure.

Here, the number of functional groups of six or less is preferable because the increase in viscosity of the acrylic monomer is suppressed and the acrylic monomer does not remain on the outer surface of the surface layer and easily permeates inside. Furthermore, using an acrylic monomer having four or less functional groups is more preferable because when used in combination with a surfactant, the acrylic monomer does not remain on the outer surface of the surface layer, easily permeates into the outer surface of the surface layer and is likely to stay in the vicinity of the outer surface of the surface layer, for example, in a region with a depth of less than 1 μm.

Di(meth)acrylates such as neopentyl glycol diacrylate and PO (propylene oxide)-modified neopentyl glycol diacrylate are preferred.

The molecular weight of the acrylic monomer is preferably in the range of 200 to 750. By using the molecular weight within this range, the binder resin comprised in the surface layer can be efficiently impregnated with the acrylic monomer, and the vicinity of the outer surface can be increased in hardness.

That is, by selecting one or two or more acrylic monomers that satisfy the above-described molecular weight range and viscosity range, impregnating the surface layer therewith and crosslinking, it is possible to increase the hardness of the vicinity of the outer surface of the surface layer.

The method for cross-linking the acrylic monomer is not particularly limited, and a known method can be used. Specific examples include methods such as heating and ultraviolet irradiation.

A known radical polymerization initiator or ionic polymerization initiator can be used for each polymerization method.

Examples of polymerization initiators for polymerization by heating include peroxides such as 3-hydroxy-1,1-dimethylbutyl peroxyneodecanoate, α-cumyl peroxyneodecanoate, t-butyl peroxyneoheptanoate, t-butyl peroxybivalate, t-amylperoxy-normal-octoate, t-butylperoxy 2-ethylhexyl carbonate, dicumyl peroxide, di-t-butyl peroxide, di-t-amyl peroxide, 1,1-di(t-butylperoxy)cyclohexane, n-butyl-4,4-di (t-butylperoxy)valerate, and azo compounds such as 2,2-azobisbutyronitrile, 2,2-azobis(4-methoxy-2,4-dimethylvaleronitrile), 2,2-azobis(2,4-dimethylvaleronitrile), 2,2-azobis(2-methylbutyronitrile), 1,1-azobis(cyclohexane-1-carbonitrile), 2,2-azobis[2-(2-imidazolin-2-yl)propane], 2,2-azobis[2-methyl-N-(2-hydroxyethyl)propionamide], 2,2-azobis[N-(2-propenyl)-2-methylpropionamide], 2,2-azobis (N-butyl-2-methoxypropionamide), and dimethyl-2,2-azobis(isobutyrate).

Examples of polymerization initiators for polymerization by irradiation with ultraviolet rays include 2,2-dimethoxy-1,2-diphenylethan-1-one, 1-hydroxycyclohexylphenyl ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]-phenyl}-2-methylpropan-1-one, 2-methyl-1-[4-(methylthio)phenyl]-2-morpholinopropane-1-one, 2-benzyl-2-dimethylamino-1-(4-morpholinophenyl)-butan-1-one, 2-dimethylamino-2-(4-methylbenzyl)-1-(4-morpholine-4-yl-phenyl)-butan-1-one, bis(2,4,6-trimethylbenzoyl)-phenylphosphine oxide, 2,4,6-trimethylbenzoyl-diphenylphosphine oxide.

These polymerization initiators may be used alone or in combination of two or more thereof.

Further, from the viewpoint of efficiently advancing the reaction, the blended amount of the polymerization initiator to be used is preferably 0.5 parts by mass to 10 parts by mass where the total amount of compounds (for example, compounds having a (meth)acryloyl group) for forming a specific resin is 100 parts by mass.

Known devices can be used as appropriate as the heating device and the ultraviolet irradiation device. As a light source for radiating ultraviolet rays, for example, an LED lamp, a high-pressure mercury lamp, a metal halide lamp, a xenon lamp, a low-pressure mercury lamp, or the like can be used. The integrated quantity of light required for polymerization can be adjusted as appropriate according to the type and amount of the compound and polymerization initiator used.

Examples of methods for confirming the presence of a crosslinked acrylic resin impregnated in a matrix comprising a crosslinked urethane resin include the following methods. (1) A method for confirming by solvent extraction, (2) a method for confirming a change in glass transition point before and after impregnation treatment, (3) a method for confirming a change in peak top temperature of thermal chromatogram before and after impregnation treatment, (4) a method for confirming by MS.

2-3. Conductive Agent

An electro-conductive agent can be blended in the surface layer for the purpose of controlling the conductivity of the surface layer. Examples of the electro-conductive agent blended in the surface layer include an ion conductive agent and an electron conductive agent such as carbon black. Among them, carbon black is preferable because the conductivity of the electro-conductive elastic layer and the charging performance of the electro-conductive elastic layer with respect to the toner can be controlled. The volume resistivity of the electro-conductive elastic layer is preferably in the range of $1\times10^{3}$ Ω·cm to $1\times10^{11}$ Ω·cm.

2-4. Additives

The surface layer can comprise various additives within a range that does not impair the features of the present disclosure.

In particular, the surface layer (for example, matrix) preferably further comprises at least one surfactant selected from the group consisting of silicone surfactants and fluorosurfactants, more preferably comprises a silicone surfactant.

The surfactant can have both a low-polarity group such as a silicone-containing group or a fluorine-containing group, and a high-polarity group at a modification segment. Due to a large difference in polarity between the urethane group or other high-polarity group of the crosslinked urethane resin and the low-polarity group such as the silicone-containing group or fluorine-containing group in the surfactant molecule, the surfactant migrates and remains in the vicinity of the outer surface of the surface layer.

Furthermore, when the matrix comprising the surfactant is impregnated with the acrylic monomer, the acrylic monomer tends to remain near the surfactant. In particular, impregnation with an acrylic monomer having a polarity close to that of the high-polarity group of the surfactant is preferred because the acrylic monomer tends to remain in the vicinity of the outer surface. After that, by cross-linking the impregnated acrylic monomer, the matrix present in the region in the vicinity of the outer surface of the surface layer can be locally hardened.

Furthermore, the surfactant is more preferably a silicone-based surfactant, because the affinity with the fine particles comprising the organosilicon compound is further improved.

The elastic modulus E1 can be adjusted within the above range depending on the molecular structure and presence state of the impregnated and cured crosslinked acrylic resin, interaction with the crosslinked urethane resin, and the like. Specifically, E1 can be easily increased by reducing the molecular weight of the acrylic monomer to be impregnated or by increasing the number of acryloyl groups or methacryloyl groups. E1 can be easily decreased by increasing the molecular weight of the acrylic monomer to be impregnated or decreasing the number of acryloyl groups or methacryloyl groups.

2-5. Method for Forming Surface Layer

Although the method for forming the surface layer is not particularly limited, the surface layer can be formed, for example, by the following method.

A coating liquid for forming the surface layer that comprises a composition that is a raw material for the crosslinked urethane resin and, in addition thereto, an electro-conductive agent, additives, resin particles, and solvent, as necessary, is prepared. An electro-conductive substrate is dipped into the coating liquid and drying is performed to form a layer comprising the crosslinked urethane resin as a binder on the electro-conductive substrate.

Next, the surface layer is impregnated with an acrylic monomer and a polymerization initiator, and the acrylic monomer is crosslinked. A coating liquid comprising an acrylic monomer and, if necessary, a polymerization initiator, a sensitizer, a solvent, and the like is prepared. Next, the roller on which the layer comprising the crosslinked urethane resin has been formed is coated with the coating liquid by a known coating method such as dipping, roll coating, or spray coating. As a result, the layer comprising the crosslinked urethane resin is impregnated with the acrylic monomer etc. Next, after drying the solvent as necessary, the surface layer is formed by crosslinking the acrylic monomer by heating, ultraviolet irradiation, or the like.

Fine Particles

A plurality of fine particles are attached to the outer surface of the surface layer of the developing roller. The fine particles form protrusions on the outer surface of the surface layer. Also, each of the fine particles comprises an organosilicon compound. In a cross-sectional view of the fine particles and the outer surface, each of the fine particles has a substantially flat surface that is in surface contact with the outer surface of the surface layer and a curved surface that constitutes at least part of the protruding portion. The number-average value of the longest diameter w of the substantially flat surface of the fine particles is 10 nm to 400 nm.

1. Shape of Fine Particles

A fine particle in one embodiment of the present disclosure has a substantially flat surface and a curved surface, for example, has a substantially hemispherical shape.

In a cross-sectional view of the fine particles and the outer surface in a state where the fine particles are in contact with the outer surface of the developing roller, the substantially flat surface of each of the fine particles is in surface contact with the outer surface of the surface layer. Moreover, each of the fine particles has a protruding curved surface in the direction opposite to the substantially flat surface. As a result, the substantially flat surface of the fine particles and the outer surface of the developing roller are brought into contact with each other.

That is, the fine particles and the outer surface of the developing roller are in surface contact, and the contact area increases. As a result of increasing the contact area between the fine particles and the developing roller, the bleed substance from the toner supply roller adheres and accumulates on the outer surface of the fine particles, while direct adhesion and accumulation of the bleed substance on the outer surface of the developing roller is significantly suppressed.

In addition, since the fine particles have a protruding curved surface in the direction opposite to the substantially flat surface, the fine particles mesh with the silica particles serving as an external additive of the toner during rubbing induced by the driving of the developing device, and the fine particles can receive the shear force necessary for removal thereof from the developing roller surface.

The substantially hemispherical shape of the fine particles is, for example, a shape obtained by cutting an ellipsoid on an arbitrary plane. As shown in FIG. 4, when an ellipsoid is divided into two on an arbitrary plane, one of the two three-dimensional bodies (the three-dimensional body indicated by the dot pattern in FIG. 4) is an example of a substantially hemispherical shape in the present disclosure. In the present disclosure, the term ellipsoid is inclusive of a perfect sphere and a three-dimensional body approximated to an ellipsoid, and the arbitrary plane may or may not pass through the center of the ellipsoid.

A method for producing substantially hemispherical fine particles in the present disclosure is not limited to the method of cutting an ellipsoid, and also included a method of bottom-up forming the fine particles on a base material having a substantially flat surface. In the case of the method of bottom-up forming on a base material having a substantially flat surface, where particles having a substantially flat surface and also having a diameter several tens of times larger than the size of the fine particles are used as the base material, it is easy to produce fine particles of a substantially hemispherical shape that have a substantially flat surface and a curved surface.

The substantially hemispherical shape of the fine particles can be confirmed by observing a cross section that intersects with the substantially flat surface of the fine particles. Specifically, when observing the cross section of the fine particle, where the following two conditions (1) and (2) are satisfied, it is determined that the fine particle has a substantially hemispherical shape having a substantially flat surface and a curved surface. An example will be described with reference to FIGS. 5A to 5C.

(1) A cross section that intersects with the substantially flat surface of a fine particle is observed. In the cross section, two intersection points of a line Lf corresponding to the substantially flat surface and a line Lc corresponding to the curved surface are denoted by Pa and Pb. A straight line connecting Pa and Pb is defined as a virtual straight line Li, and the largest distance between the virtual straight line Li and a line Lf corresponding to the substantially flat surface is defined as a maximum length df.

An intersection point of the virtual straight line Li and a straight line Ls1, which perpendicularly intersects with the virtual straight line Li on the cross section, on the straight line Ls1 is denoted by Pc, and an intersection point of a line Lc corresponding to the curved surface with the straight line Ls1 is denoted by Pe. The distance between the intersection point Pc and the intersection point Pe is denoted by Da. The distance between an intersection point Pd, where the line Lf corresponding to the substantially flat surface intersects with the straight line Ls1, and the intersection point Pe, where the line Lc corresponding to the curved surface intersects with the straight line Ls1, is denoted by db. The distance when any one of Da and db is at maximum is defined as a maximum height h, and in this case, the number-average value of the ratio df/h of the maximum length df to the maximum height h is 0.00 to 0.10.

(2) A cross section that intersects with the substantially flat surface of a fine particle is observed. In the cross section, an ellipse that passes through two intersection points (corresponding to Pa and Pb above) of the substantially flat surface and the curved surface and circumscribes the curved surface of the fine particle is denoted by e1.

In the cross section, an ellipse passing through two intersection points of the substantially flat surface and the curved surface and inscribed in the curved surface of the fine particle is denoted by e2. In e1 and e2, the number-average value of the ratio l1/l2 of a major axis l1 of the ellipse e1 to a major axis l2 of the ellipse e2 is 0.90 to 1.10. In addition, the number-average value of the ratio s1/s2 of a minor axis s1 of the ellipse e1 to a minor axis s2 of the ellipse e2 is 0.90 to 1.10.

Figure 5A:
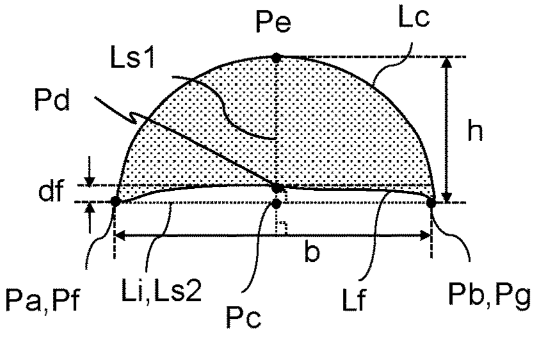
FIGS. 5A to 5C is an explanatory diagram of how to determine that the fine particles have substantially hemispherical shape.
Figure 5B:
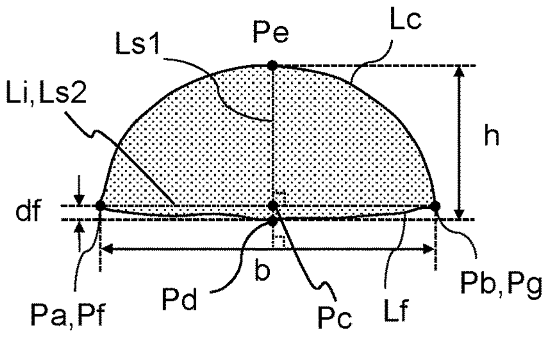
Figure 5C:
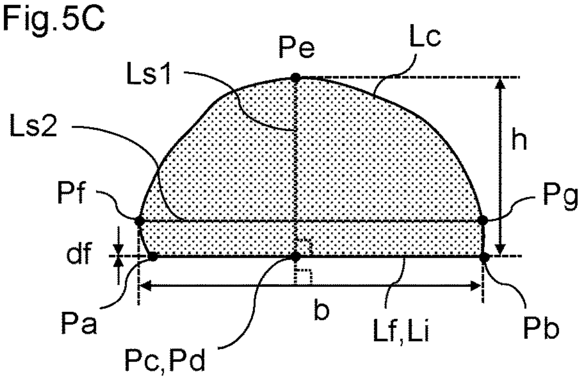

Examples of the maximum length df and maximum height h are shown in FIGS. 5A to 5C. The number-average value of the ratio df/h is preferably 0.00 to 0.05. Within the above range, the contact area between the fine particles and the outer surface of the developing roller is increased, and it is possible to suppress the direct adhesion and accumulation of the bleed substance on the outer surface of the developing roller.

Examples of the ellipse e1, ellipse e2, major axis l1 of ellipse e1, major axis l2 of ellipse e2, minor axis s1 of ellipse e1, and minor axis s2 of ellipse e2 are shown in FIGS. 5D to 5G.

Furthermore, the number-average value of the longest diameter w of the substantially flat surface of the fine particles is 10 nm to 400 nm. Where the number-average value of the longest diameter w is 10 nm or more, the fine particles comprising the organosilicon compound and the silica particles serving as an external additive are likely to mesh with each other, and the fine particles can be quickly removed from the outer surface of the developing roller. Furthermore, where the number-average value of the longest diameter w is 400 nm or less, a state in which the contact area between the substantially flat surface of the fine particle and the outer surface of the developing roller tends is large is likely to be realized, and the adhesion and accumulation of the bleed substance on the outer surface of the developing roller can be suppressed.

The number-average value of the longest diameter w is preferably 30 nm to 250 nm, more preferably 50 nm to 120 nm. Where the number-average value of the longest diameter w is 30 nm or more, the fine particles are more likely to mesh with the silica particles. Further, it is preferable that the number-average value of the longest diameter w be 250 nm or less because a state in which the contact area between the substantially flat surface of the fine particle and the outer surface of the developing roller tends is large is likely to be realized, and the direct adhesion and accumulation of the bleed substance on the outer surface of the developing roller can be suppressed.

The number-average value of the longest diameter w can be controlled by the type and number of parts of the monomer used in the production of the fine particles, the reaction temperature and reaction time during polymerization of the monomer, the pH of the reaction medium and reaction system, and the type and concentration of the dispersing agent. Further, when the fine particles are produced by a bottom-up forming method on a base material, it is possible to control the shape and the number-average value of the longest diameter w of the fine particles by the shape and size of the base material as well.

When a cross section that intersects with the substantially flat surface of the fine particle is observed, two intersection points of the line Lf corresponding to the substantially flat surface and the line Lc corresponding to the curved surface are denoted by Pa and Pb, and a straight line connecting the intersection points Pa and Pb is defined as the virtual straight line Li.

In a straight line Ls1 which perpendicularly intersects with the virtual straight line Li, an intersection point of the virtual straight line Li and the straight line Ls1 is denoted by Pc, and an intersection point of the line Lc and the straight line Ls1 is denoted by Pe. The distance between the intersection point Pc and the intersection point Pe is denoted by Da. The distance between an intersection point Pd, where the line Lf intersects with the straight line Ls1, and the intersection point Pe is denoted by db. The distance when any one of Da and db is at maximum is defined as a maximum height h.

Meanwhile, two intersection points where a straight line Ls2, which is parallel to the virtual straight line Li (Ls2 may be the same as Li), intersects with the line Lc, on the straight line Ls2 are denoted by Pf and Pg, and the distance Dc between Pf and Pg when this distance is at maximum is defined as a maximum width b.

At this time, the number-average value of the ratio h/b of the maximum height h to the maximum width b is 0.30 to 0.80, more preferably 0.40 to 0.70, and still more preferably 0.50 to 0.60.

The ratio h/b is calculated by measuring h and b in one fine particle when observing the cross section of the fine particle. Examples of h and b are shown in FIGS. 5A to 5C.

Where the number-average value of h/b is 0.30 or more, the protruding portion in the direction opposite to the substantially flat surface where the fine particle is in contact with the developing roller becomes high and is more likely to mesh with the silica particles serving as an external additive. Further, when the number-average value of h/b is 0.80 or less, the protruding portion does not become too high, so that a state in which a contact area of the fine particle with the outer surface of the developing roller is large can be easily maintained even when vibrations etc. generated, for example, when the developing device is assembled occur at the contact position between the developing roller and the toner supply roller.

The number-average value of the ratio h/b is determined by the type and number of parts of the monomer of the fine particles, the reaction temperature and reaction time during polymerization of the monomer, the pH of the reaction medium and reaction system, and the type of the dispersing agent of the monomer and concentration in the reaction system.

h/b can be increased, for example, by increasing the reaction temperature during polymerization of the monomer. Also, h/b can be reduced by lowering the reaction temperature during monomer polymerization.

3. Organosilicon Compound

In the present disclosure, the fine particles comprise an organosilicon compound. Where the fine particles comprise an organosilicon compound, affinity thereof with the outer surface of the developing roller, which is a resin, and the silica particles, which are a silicon compound, can be obtained. Because of this affinity, in addition to the shape of the fine particles, a state in which the contact area between the fine particles and the outer surface of the developing roller is large is likely to be maintained and adhesion and accumulation of the bleed substance on the outer surface of the developing roller can be suppressed.

Further, even at the time of meshing with the silica particles, due to the affinity between the silica particles and the fine particles, an appropriate chemical attachment force is likely to act, and the fine particles are likely to receive the shear force necessary for removal thereof from the outer surface of the developing roller.

Further, in the present disclosure, the fine particles preferably have at least one structure selected from the group consisting of a structure represented by a following formula (D), a structure represented by a following formula (T), and a structure represented by a following formula (Q). The fine particles more preferably have at least one structure selected from the group consisting of a structure represented by the following formula (D) and a structure represented by the following formula (T), and more preferably a structure represented by the following formula (T) (T3 unit structure). For example, the fine particles are preferably organosilicon polymers.

$(Ra)(Rb)Si(O_{1/2})_2$ Formula (D)

$Rc\text{-}Si(O_{1/2})_3$ Formula (T)

$Si(O_{1/2})_4$ Formula (Q)

Ra, Rb, and Rc in formula (D), formula (T), and formula (Q) represent organic groups bonded to silicon atoms.

Where the fine particles have at least one structure selected from the group consisting of the structures represented by formulas (D), (T), and (Q), more excellent balance of affinities with the outer surface of the developing roller and the silica particles serving as an external additive is obtained.

Ra, Rb and Rc are preferably organic groups having 1 to 8 carbon atoms (preferably 1 to 6 carbon atoms, more preferably 1 to 3 carbon atoms). In particular, it is preferable that Ra, Rb and Rc be alkyl groups (more preferably a methyl group), because the hardness of the fine particles is increased, making it difficult for the bleed substance to migrate into the inside of the fine particles, and direct adhesion and accumulation on the outer surface of the developing roller can be suppressed.

Further, the content of the structure represented by formula (D), formula (T), and/or formula (Q) in the fine particles (preferably the structure represented by formula (D) and the structure represented by formula (T), and more preferably the structure represented by formula (T)) is 50 mol % or more, more preferably 70 mol % or more.

It can be confirmed by FTIR that the fine particles comprise an organosilicon compound. In addition, the presence of a siloxane polymer segment ($—Si(O_{1/2})^*$(*is an integer of 2 to 4)) in the structures represented by formula (D), formula (T), and formula (Q) can be confirmed by $^{29}$Si-NMR measurement of the fine particles. The presence of Ra, Rb, and Rc in formula (D) and formula (T) can be confirmed by $^{13}$C-NMR measurement of the fine particles.

The fine particles can be produced, for example, by polycondensation of an organosilicon compound. For example, the fine particles are polycondensation products of an organosilicon compound. Here, the organosilicon compound is at least one selected from the group consisting of an organosilicon compound having a structure represented by the following formula (ZD), an organosilicon compound having a structure represented by the following formula (ZT), and an organosilicon compound having a structure represented by the following formula (ZQ). An organosilicon compound having a structure represented by the formula (ZT) is more preferred.

(ZD)

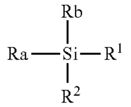

(ZT)

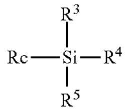

(ZQ)

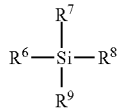

In formula (ZD), formula (ZT), and formula (ZQ), Ra, Rb and Re are silicon-bonded organic groups (preferably alkyl group having 1 to 8 (preferably 1 to 6, more preferably 1 to 3) carbon atoms). $R^1$, $R^2$, $R^3$, $R^4$, $R^5$, $R^6$, $R^7$, $R^8$ and $R^9$ are each independently a halogen atom, a hydroxy group, an acetoxy group, or an alkoxy group (preferably having 1 to 3, more preferably 1 or 2 carbon atoms).

Examples of organosilicon compounds having a structure represented by formula (ZD) include the following.

Dimethyldimethoxysilane, dimethyldiethoxysilane, 3-glycidoxypropylmethyldimethoxysilane, 3-glycidoxypropylmethyldiethoxysilane, 3-methacryloxypropylmethyldimethoxysilane, 3-methacryloxypropylmethyldiethoxysilane, N-2-(aminoethyl)-3-aminopropylmethyldimethoxysilane, and 3-mercaptopropylmethyldimethoxysilane.

Examples of organosilicon compounds having a structure represented by formula (ZT) include the following.

Trifunctional vinylsilanes such as vinyltrimethoxysilane, vinyltriethoxysilane, vinyldiethoxymethoxysilane, vinylethoxydimethoxysilane, vinyltrichlorosilane, vinylmethoxydichlorosilane, vinylethoxydichlorosilane, vinyldimethoxychlorosilane, vinylmethoxyethoxychlorosilane, vinyldiethoxychlorosilane, vinyltriacetoxysilane, vinyldiacetoxymethoxysilane, vinyldiacetoxyethoxysilane, vinylacetoxydimethoxysilane, vinylacetoxymethoxyethoxysilane, vinylacetoxydiethoxysilane, vinyltrihydroxysilane, vinylmethoxydihydroxysilane, vinylethoxydihydroxysilane, vinyldimethoxyhydroxysilane, vinylethoxymethoxyhydroxysilane, and vinyldiethoxyhydroxysilane; trifunctional allylsilanes such as allyltrimethoxysilane, allyltriethoxysilane, allyldiethoxymethoxysilane, allylethoxydimethoxysilane, allyltrichlorosilane, allylmethoxydichlorosilane, allylethoxydichlorosilane, allyldimethoxychlorosilane, allylmethoxyethoxychlorosilane, allyldiethoxychlorosilane, allyltriacetoxysilane, allyldiacetoxymethoxysilane, allyldiacetoxyethoxysilane, allylacetoxydimethoxysilane, allylacetoxymethoxyethoxysilane, allylacetoxydiethoxysilane, allyltrihydroxysilane, allylmethoxydihydroxysilane, allylethoxydihydroxysilane, allyldimethoxyhydroxysilane, allylethoxymethoxyhydroxysilane, and allyldiethoxyhydroxysilane; trifunctional styrylsilanes such as p-styryltrimethoxysilane; trifunctional methylsilanes such as methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyl dimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, and methyldiethoxyhydroxysilane; trifunctional ethylsilanes such as ethyltrimethoxysilane, ethyltriethoxysilane, ethyltriethoxysilane, ethyltriacetoxysilane, and ethyltrihydroxysilane; trifunctional propylsilanes such as propyltrimethoxysilane, propyltriethoxysilane, propyltrichlorosilane, propyltriacetoxysilane, and propyltrihydroxysilane; trifunctional butylsilanes such as butyltrimethoxysilane, butyltriethoxysilane, butyltrichlorosilane, butyltriacetoxysilane, and butyltrihydroxysilane; trifunctional hexylsilanes such as hexyltrimethoxysilane, hexyltriethoxysilane, hexyltrichlorosilane, hexyltriacetoxysilane, and hexyltrihydroxysilane; trifunctional phenylsilanes such as phenyltrimethoxysilane, phenyltriethoxysilane, phenyltrichlorosilane, phenyltriacetoxysilane, and phenyltrihydroxysilane; trifunctional epoxysilanes such as 3-glycidoxypropyltrimethoxysilane, 3-glycidoxypropyltriethoxysilane, and 2-(3,4-epoxycyclohexyl)ethyltrimethoxysilane; trifunctional methacrylsilanes such as 3-methacryloxypropyltrimethoxysilane and 3-methacryloxypropyltriethoxysilane; trifunctional acrylsilanes such as 3-acryloxypropyltrimethoxysilane; trifunctional aminosilanes such as 3-aminopropyltrimethoxysilane, 3-aminopropyltriethoxysilane, N-2-(aminoethyl)-3-aminopropyltrimethoxysilane, N-2-(aminoethyl)-3-aminopropyltriethoxysilane, and N-phenyl-3-aminopropyltrimethoxysilane; trifunctional ureidosilanes such as 3-ureidopropyltriethoxysilane; trifunctional 3-chloropropylsilanes, such as 3-chloropropyltrimethoxysilane; trifunctional mercaptosilanes such as 3-mercaptopropyltrimethoxysilane and 3-mercaptopropyltriethoxysilane; trifunctional sulfidosilanes such as bis(triethoxysilylpropyl)tetrasulfide; and trifunctional isocyanatosilanes such as 3-isocyanatopropyltriethoxysilane.

Examples of organosilicon compounds having the structure represented by formula (ZQ) include the following.

Tetraalkoxysilanes such as tetramethoxysilane and tetraethoxysilane; tetraalkylcarboxysilanes such as tetraacetoxysilane; and tetrahalosilanes such as tetrachlorosilane.

In addition to the polycondensation products of the above organosilicon compounds, the fine particles may comprise a polycondensation product of an organosilicon compound having one reactive group in a molecule (monofunctional silane), a bifunctional silane other than the above, a trifunctional silane and a tetrafunctional silane. Examples of these compounds include the following.

Hexamethyldisilazane, trimethylsilyl chloride, triethylsilyl chloride, triisopropylsilyl chloride, t-butyldimethylsilyl chloride, N,N'-bis(trimethylsilyl)urea, N,O-bis(trimethylsilyl)trifluoroacetamide, trimethylsilyltrifluoromethane sulfonate, 1,3-dichloro-1,1,3,3-tetraisopropyldisiloxane, trimethylsilylacetylene, hexamethyldisilane, tetraisocyanatosilane, methyltriisocyanatosilane, and vinyltriisocyanatosilane.

Furthermore, the fine particles may comprise, in addition to the polycondensation product of the organosilicon compound, a polycondensation product of an organotitanium compound and an organoaluminum compound.

4. Method for Producing Fine Particles A specific method for producing fine particles will be described below, but this method is not limiting.

A sol-gel method is an example of a method for producing fine particles. In the sol-gel method, a metal alkoxide $M(OR)_n$ (M: metal, O: oxygen, R: hydrocarbon, n: oxidation number of the metal) is used as a starting material, subjected to hydrolysis and polycondensation in a medium, and gelled through a sol state. When the fine particles have a structure represented by formula (D), (T) or (Q), an organosilicon compound having a structure represented by formula (ZD), (ZT) or (ZQ) may be used as the metal alkoxide $M(OR)_n$.

By using this production method, functional materials in various shapes such as surface layers, fibers, bulk bodies, and fine particles can be produced from the liquid phase at low temperatures. Furthermore, since the sol-gel method starts from a solution and forms the material by gelling the solution, various microstructures and shapes can be produced. The microstructure and shape can be controlled by the type and number of parts of monomers, reaction temperature, reaction time, pH of the reaction medium and reaction system, types and concentration of dispersing agent, and the like.

It is generally known that in a sol-gel reaction, the bond state of the metalloxane bond (M-O-M) generated varies depending on the acidity of the reaction medium. Specifically, when the reaction medium is acidic, a hydrogen ion is electrophilically added to the oxygen in one reactive group (for example, an alkoxy group). The oxygen atom in a water molecule then coordinates to the metal atom to form a hydroxyl group through a substitution reaction.

When enough water is present, since one hydrogen ion attacks one oxygen of the reactive group (for example, an alkoxy group), the content of hydrogen ions and the number of reactive groups in the medium decrease as the reaction proceeds, so the substitution reaction to the hydroxy group slows down. Therefore, the polycondensation reaction occurs before all the reactive groups attached to the metal atoms are hydrolyzed, and a one-dimensional linear polymer or a two-dimensional polymer tends to be produced relatively easily.

Meanwhile, when the medium is alkaline, the hydroxide ion is attached to the metal atom and the reaction proceeds through a pentacoordinated intermediate. As a consequence, all of the reactive groups (for example, alkoxy groups) are likely to be eliminated and are easily substituted with hydroxy groups. In particular, when a metal compound having three or more reactive groups on the same metal atom is used, hydrolysis and polycondensation occur three-dimensionally and an organometallic polymer with many three-dimensional crosslinking bonds (for example, organosilicon polymer) is formed. Also, this reaction is completed in a short period of time.

Therefore, in order to form fine particles composed of an organometallic polymer, it is preferable to proceed with the sol-gel reaction in an alkaline reaction medium, and when production is carried out in an aqueous medium, it is specifically preferable that pH be 8.0 or more. As a result, fine particles having higher strength and excellent durability can be formed.

The following are examples of aqueous media. Water or a mixed solvent of water and an alcohol such as methanol, ethanol and propanol.

In addition, in order to make the fine particles solid and substantially hemispherical in shape and to control the number-average value of the longest diameter w of the substantially flat surface to 10 nm to 400 nm, it is preferable to carry out the production by dispersing an organometallic compound (for example, an organosilicon compound) and a base material in a medium such as aqueous medium.

First, a base material is dispersed in a medium to obtain a base material dispersion liquid. The dispersion is preferably performed such that the concentration of the solid fraction of the base material is 5% by mass to 40% by mass with respect to the total amount of the base material dispersion liquid. A dispersion stabilizer, which will be described hereinbelow, may be used as appropriate. Moreover, it is preferable to adjust the temperature of the base material dispersion to 35° C. or higher.

Furthermore, it is preferable to adjust the pH of the base material dispersion liquid to a pH at which condensation of the organosilicon compound is unlikely to proceed. The pH at which the condensation of the organosilicon compound is unlikely to proceed varies depending on the type of the organosilicon compound, but it is preferably adjusted within ±0.5 around the pH at which the reaction is most unlikely to proceed. It is not necessary to completely disperse the base material in the medium. For example, when the base material is a flat plate, the flat plate may be set up in the reaction vessel to allow the condensation to proceed on the base material.

Next, it is preferable to use the organosilicon compound that has been hydrolyzed. For example, the organosilicon compound may be hydrolyzed in a separate container. The feed ratio of the hydrolysis is preferably 40 parts by mass to 500 parts by mass, more preferably 100 parts by mass to 400 parts by mass of ion-exchange water such as ion-exchanged water or RO water when the amount of the organosilicon compound is 100 parts by mass. The hydrolysis conditions are preferably pH 1.0 to 7.0 (more preferably 2.0 to 4.0), temperature 15° C. to 80° C. (more preferably 40° C. to 70° C.), and time 1 min to 600 min (more preferably 30 min to 300 min).

The hydrolyzed organosilicon compound is then added to the base material dispersion liquid. The base material dispersion liquid and the organosilicon compound hydrolysate are stirred and mixed, and the mixture is preferably kept at a temperature of 35° C. or higher (more preferably 40° C. to 60° C.) for 3 to 120 min. Thereafter, the pH is adjusted to be suitable for condensation (preferably pH 6.0 or higher or pH 3.0 or lower, more preferably pH 8.0 or higher (more preferably from 8.5 to 9.5)) to condense the organosilicon compound at once, and the system is preferably kept for 60 min or longer at a temperature of 35° C. or higher (more preferably 40° C. to 60° C.) to form fine particles made of an organosilicon polymer on the base material surface.

The base material having fine particles formed on the surface hereof is stirred and mixed using a medium in which the base material has a high solubility and the fine particles have a low solubility, so that only the base material is dissolved. Since the solubility varies depending on the type of the base material and the type of medium, the solid fraction concentration, stirring time, and temperature of the base material are set within a range in which the base material is sufficiently dissolved.

After that, the fine particles are separated by a technique such as centrifugation and dried to obtain solid fine particles of a substantially hemispherical shape. In addition, when the solubility of the base material is low, the fine particles may be separated by removing the fine particles from the base material by lifting the fine particles from the reaction vessel as they are.

From the standpoint of separability from the fine particles, various flat plates of metal, glass, ceramics, etc., resin particles and the like are suitable for the base material to be used in producing the fine particles. Among them, resin particles having a low degree of cross-linking and being soluble are particularly preferable. When the size of the resin particles (for example, the number-average particle diameter) is 1 μm to 100 μm (more preferably 5 μm to 15 μm), the particle diameter of the base material is several tens of times or more the particle diameter of the fine particles, so that it is easy to produce fine particles of a substantially hemispherical shape having a substantially flat surface and a curved surface. Although the material of the resin particles is not particularly limited, polymethyl methacrylate (PMMA) particles, polystyrene fine particles, etc. produced by soap-free emulsion polymerization or the like are suitable.

In addition, when dispersing the organosilicon compound and the base material in the medium, known surfactants and inorganic and organic dispersing agents may be used as dispersion stabilizers.

The following are examples of surfactants.

(1) Anionic surfactants: alkyl sulfates such as sodium lauryl sulfate; polyoxyethylene alkyl ether sulfate esters such as sodium polyoxyethylene lauryl ether sulfate; sulfonates such as sodium dodecylbenzene sulfonate, sodium alkylnaphthalene sulfonates; and higher fatty acid salts such as sodium stearate and sodium laurate.

(2) Cationic surfactants: quaternary ammonium salts such as dodecyl ammonium bromide, dodecyltrimethylammonium bromide, dodecylpyridinium chloride, dodecylpyridinium bromide, hexadecyltrimethylammonium bromide, lauryltrimethylammonium chloride, and alkylbenzyldimethylammonium chlorides.

(3) Nonionic surfactants: polyoxyethylene alkyl ethers such as polyoxyethylene lauryl ether and polyoxyethylene oleyl ether; polyoxyalkylene derivatives such as polyoxyethylene alkyl ethers; sorbitan fatty acid esters such as sorbitan monolaurate and sorbitan monostearate; glycerin fatty acid esters such as glycerol monostearate; polyoxyethylene fatty acid esters such as polyethylene glycol monolaurate.

In addition, the following are examples of inorganic dispersing agents.

Trivalent aluminum salts such as aluminum chloride, aluminum sulfate, aluminum hydroxide, aluminum phosphate, and polyaluminum chloride; trivalent and divalent iron salts such as iron (III) chloride, iron (III) sulfate, iron (III) hydroxide, iron (II) chloride, iron (II) sulfate, iron (II) hydroxide, polyiron sulfate, and polysilica iron; divalent magnesium salts such as magnesium chloride, magnesium sulfate, magnesium hydroxide, magnesium phosphate, and magnesium carbonate; divalent calcium salts such as calcium chloride, calcium sulfate, tricalcium phosphate, calcium hydrogen phosphate, calcium dihydrogen phosphate, calcium hydroxide, hydroxyapatite, calcium carbonate, and calcium metasilicate; divalent cobalt salts such as cobalt chloride and cobalt sulfate; divalent zinc salts such as zinc phosphate; divalent barium salts such as barium sulfate; silicate minerals such as bentonite; and metal oxides such as silica and alumina.

Further, examples of organic dispersing agents include the following.

Polyvinyl alcohol, gelatin, methylcellulose, methylhydroxypropylcellulose, ethylcellulose, sodium salt of carboxymethylcellulose, and starch.

These dispersion stabilizers are selected, as appropriate, depending on the type of base material and the interaction with the organometallic compound. These dispersion stabilizers may be used singly or in combination.

5. Method for Producing Developing Roller Having Fine Particles Attached to Outer Surface Thereof A method for producing a developing roller having fine particles attached to outer surface thereof will be described below, but this method is not limiting.

A developing roller having a plurality of fine particles attached to outer surface thereof according to one embodiment of the present disclosure can be obtained by attaching the fine particles to the developing roller. A method for attaching the fine particles to the outer surface of the developing roller is not particularly limited as long as the fine particles can be attached to the area of the outer surface of the developing roller that contacts the toner supply roller.

A method for attaching fine particles to the outer surface of the developing roller can be exemplified by a method of filling fine particles into a developing device equipped with a toner supply roller and a toner layer thickness control member that are used in an electrophotographic apparatus, assembling a developing roller to which fine particles have not been attached, and driving the developing device.

With this method, the fine particles are supplied to the developing roller by the toner supply roller and rubbed against the outer surface of the developing roller by the toner supply roller and the toner layer thickness control member. At this time, the developing roller is repeatedly driven to rotate, so that the fine particles are likely to be stably attached to the outer surface of the developing roller while the substantially flat portions of the fine particles are in contact with the outer surface of the developing roller.

In addition, according to this method, since the fine particles can be rubbed against the developing roller repeatedly, the substantially flat surfaces of the fine particles that have a large contact area are likely to be attached while being in contact with the outer surface of the developing roller. The amount of the fine particles attached to the outer surface of the developing roller can be changed according to the amount of the fine particles filled into the developing device and the driving time of the developing device.

Further, when the base material for producing fine particles is particles and the fine particles are peeled off from the outer surface of the base material, the fine particles may be attached to the outer surface of the developing roller by filling the developing device with the particles having the fine particles formed on outer surface thereof and driving the developing device in the same manner.

Also, the amount of the fine particles attached to the outer surface of the developing roller according to one embodiment of the present disclosure can be confirmed, for example, based on the silicon element concentration (atomic %) measured by EDS. In the measurement method described hereinbelow, it is preferable that the amount of the fine particles based on the Si element concentration in the outer surface of the surface layer to which the fine particles have been attached be 3.0 atomic % or more. This amount is more preferably 3.0 atomic % to 20.0 atomic %, still more preferably 5.0 atomic % to 15.0 atomic %, and even more preferably 8.0 atomic % to 12.0 atomic %.

The above ranges are preferable because there are almost no gaps created by the fine particles present on the outer surface of the developing roller, and direct adhesion and accumulation of the bleed substance on the outer surface of the developing roller can be further suppressed.

The amount of the fine particles attached to the outer surface of the developing roller can be controlled by, for example, the amount of the fine particles filled and the driving time of the developing device when the developing device is filled with the fine particles and driven to attach the fine particles to the developing roller. Also, excessive fine particles may be removed by an air blow or the like.

Toner Supply Roller

The toner supply roller according to one embodiment of the present disclosure preferably has an electro-conductive substrate and a foamed elastic layer on the substrate. When a developing device comprising the toner supply roller and the developing roller is allowed to stand in a high-temperature and high-humidity environment for a long period of time, the bleed substance of the toner supply roller, that is, the unreacted residue of a resin component, an ion conductive agent component added for imparting electric conductivity, and the like, may migrate from the toner supply roller to the developing roller at the contact position between the toner supply roller and the developing roller.

The foamed elastic layer of the toner supply roller preferably has conductivity. Where the foamed elastic layer has conductivity, it is possible to apply a potential difference between the toner supply roller and the developing roller by applying a high voltage from a high voltage power source of an electrophotographic apparatus. The difference between the voltage applied to the toner supply roller and the voltage applied to the developing roller is preferably about +300 V to −300 V.

For example, when a negative-charging toner is used, the amount of toner stripped from the developing roller can be increased by setting the voltage difference to the positive side, and the amount of toner supplied to the developing roller can be increased by setting the voltage difference to the negative side. By performing such voltage control according to the state of the developing device, the toner supply/stripping amount can be stabilized during a long period of time. Therefore, it is possible to obtain a developing device with higher durability.

The foamed elastic layer can be imparted with conductivity, for example, by adding an ion conductive agent to the resin of the foamed elastic layer. That is, the foamed elastic layer preferably comprises an ion conductive agent.

1. Conductive Substrate

The substrate functions as a support member for the foamed elastic layer and as an electrode. The substrate is composed of a metal or alloy such as aluminum, copper alloy, stainless steel, iron plated with chromium or nickel, or an electro-conductive material such as synthetic resin having conductivity. The substrate is solid cylindrical or hollow cylindrical.

2. Foamed Elastic Layer

The toner supply roller is required to have the ability to uniformly supply toner to the developing roller surface, and characteristics such as the average surface cell diameter, the number of cells, air permeability, and the density of the entire foamed elastic layer are important. The physical property values of the foamed elastic layer are not particularly limited, but for example, values within the following numerical ranges are preferred. The average surface cell diameter is 100 μm to 500 μm, the number of cells is 50 cells/inch to 300 cells/inch, the air permeability is 0.5 L/min to 3.0 L/min, the density is 0.05 g/$cm^3$ to 0.20 g/$cm^3$.

From the viewpoint of the above properties and durability, it is preferable that the foamed elastic layer comprise a crosslinked urethane resin as a binder.

Further, examples of the ion conductive agent for imparting conductivity to the foamed elastic layer include salts of the metals of the periodic table group 1 such as $KCF_3SO_3$, $LiCF_3SO_3$, $LiN(CF_3SO_2)_2$, $NaClO_4$, $LiClO_4$, $LiAsF_6$, $LiBF_4$, NaSCN, KSCN, NaCl, and the like; ammonium salts such as $NH_4Cl$, $(NH_4)_2SO_4$, $NH_4NO_3$, and the like; salts of the metals of the periodic table group 2 such as $Ca(ClO_4)_2$, $Ba(ClO_4)_2$, and the like; complexes of these salts with polyhydric alcohols such as 1,4-butanediol, ethylene glycol, polyethylene glycol, propylene glycol, polypropylene glycol, and derivatives thereof; complexes of these salts with monools such as ethylene glycol monomethyl ether, ethylene glycol monoethyl ether, polyethylene glycol monomethyl ether, and polyethylene glycol monoethyl ether; aliphatic sulfonates, alkylsulfuric acid ester salts, alkylphosphoric acid ester salts; betaine salts, and the like.

From the viewpoint of stability, the total content of the ion conductive agent is preferably 0.1 parts by mass to 30 parts by mass with respect to 100 parts by mass of the binder resin forming the foamed elastic layer.

The ion conductive agent preferably comprises fluorine as an anion component. The ion conductive agent is preferably at least one compound selected from the group consisting of $KCF_3SO_3$, $LiCF_3SO_3$, $LiN(CF_3SO_2)_2$, $LiAsF_6$ and $LiBF_4$. By using a fluorine-based anion, high conductivity is easily obtained. Furthermore, it is more preferable that the anion component be $N(CF_3SO_2)_2^-$.

The anion component comprised in the foamed elastic layer can be specified, for example, by ESI-MS or LC/MS.

3. Other Components

A catalyst, a blowing agent, a foam stabilizer, and other auxiliary agents can be used in the foamed elastic layer as needed.

The catalyst is not particularly limited and can be appropriately selected for use from conventionally known various catalysts. For example, amine-based catalysts, organometallic catalysts, and acid salt catalysts obtained by reducing the initial activity of the amine-based catalysts and organometallic catalysts can be used. One kind of catalyst may be used, or two or more kinds may be used in combination.

The blowing agent is not particularly limited and can be appropriately selected for use from various known blowing agents. In particular, water is preferably used as a blowing agent because it reacts with polyisocyanates to generate carbon dioxide gas. Further, even if other blowing agents are used in combination with water, the gist of the present disclosure is not compromised.

The foam stabilizer is not particularly limited and can be appropriately selected for use from conventionally known various foam stabilizers.

As other auxiliary agents, if necessary, crosslinking agents, flame retardants, colorants, ultraviolet absorbers, antioxidants, conductive fillers, and the like may be used as long as they do not interfere with the effects of the present disclosure. Conductive fillers that can be used include carbon black and conductive metals such as aluminum and copper.

4. Method for Producing Toner Supply Roller

A method for producing a toner supply roller according to one embodiment of the present disclosure will be described below, but this method is not limiting.

There are no particular restrictions on the foaming method. Any method, such as a method using a blowing agent or a method of mixing air bubbles by mechanical stirring, can be used. The expansion ratio may be determined as appropriate and is not particularly limited.

For example, the foamed elastic layer of the foamed elastic roller can be obtained by mixing the following materials and allowing them to react while foaming.

Materials that form the binder resin
- Polyether polyols, polyester polyols, and the like
- Polyisocyanates Ion conductive agent
Catalyst
Foam stabilizer
Blowing agent There are no particular restrictions on the temperature or time when mixing. The mixing temperature is usually in the range of 10° C. to 90° C., preferably from 20° C. to 80° C. The mixing time is usually 1 sec to 10 min, preferably 3 sec to 5 min, although it depends on the structure of the mixing unit used, the rotation conditions, and the like.

There are no particular restrictions on the method of joining the substrate and the foamed elastic layer. A method in which a substrate is placed in advance in a mold (molding die) and the raw material mixture as described above is cast and cured, a method in which the raw material mixture is molded in advance into a predetermined shape to be a foamed elastic layer and then adhesively bonded to the substrate, and the like can be used. In either method, an adhesive layer can be provided between the substrate and the foamed elastic layer as needed. Known materials such as adhesives and hot-melt sheets can be used for the adhesive layer.

In the case of the casting and curing method, a mold release agent may be applied in advance to the inner wall of the mold. A known mold release agent can be used as the mold release agent. Examples thereof include an aqueous release agent containing a wax component and silicone oil, and a release agent obtained by dissolving a fluororesin in a fluorine-based solvent. The fluororesin-containing release agent can be exemplified by FLUOROSURF FG-5093F130-0.5 (trade name, manufactured by Fluoro Technology Co., Ltd.).

There are no particular restrictions on the method for forming the shape of the foamed elastic layer as the foamed elastic roller. For example, in addition to the above-described method of casting into a mold having a predetermined shape, the following method can be used. A method of cutting a block of polyurethane foam into a predetermined size by machining, a method of grinding to a predetermined size, or a method in which these methods are combined as appropriate.

Toner

A toner according to an embodiment of the present disclosure comprises a toner particle and silica particles as an external additive. The toner particle comprises a binder resin. The sticking rate of silica particles to the toner particle measured by a water washing method is 50% or more.

1. Toner Particle

The toner particle according to one embodiment of the present disclosure comprises a binder resin. The toner particle may also comprise a colorant and other components.

As the binder resin, a resin (preferably amorphous resin) generally used as a binder resin for toner can be used. Specifically, styrene-acrylic resin (styrene-acrylic acid ester copolymer, styrene-methacrylic acid ester copolymer, and the like), polyester resin, epoxy resin, polyurethane resin, polyamide resin, cellulose resin, polyether resin, styrene-butadiene copolymer, mixed resins and composite resins thereof can be used.

The colorant is not particularly limited, and known ones can be used.

The toner particle may comprise a release agent. The release agent is not particularly limited, and known agents shown below can be used. Petroleum waxes such as paraffin wax, microcrystalline wax, petrolatum and derivatives thereof, montan wax and derivatives thereof, hydrocarbon waxes obtained by the Fischer-Tropsch method and derivatives thereof, polyolefin waxes such as polyethylene and polypropylene and derivatives thereof, natural waxes such as carnauba wax, candelilla wax and derivatives thereof, higher aliphatic alcohols, fatty acids such as stearic acid and palmitic acid, or compounds thereof, acid amide waxes, ester waxes, ketones, hydrogenated castor oil and derivatives thereof, vegetable waxes, animal waxes, and silicone resin. The derivatives include oxides, block copolymers with vinyl-based monomers, and graft-modified products. These can be used singly or in combination.

The toner particle may comprise a crystalline resin. The crystalline resin is not particularly limited and known ones can be used. Specific examples include crystalline polyester resins, crystalline acrylic resins, and the like. A crystalline resin may be a block polymer having a crystalline segment and an amorphous segment.

The toner particle may comprise a charge control agent and known ones can be used.

Also, examples of methods for producing toner particles are given below.

(1) Suspension polymerization method: a polymerizable monomer composition comprising polymerizable monomers capable of forming a binder resin and, if necessary, a release agent and a colorant is granulated in an aqueous medium, and the polymerizable monomers are polymerized to obtain toner particles.

(2) Pulverization method: toner particles are obtained by melt-kneading a binder resin and, if necessary, a release agent and a colorant, and pulverizing the mixture.

(3) Dissolution suspension method: an organic phase dispersion produced by dissolving a binder resin and, if necessary, a release agent, a colorant, and the like in an organic solvent is suspended in an aqueous medium, granulated, and polymerized, and the organic solvent is thereafter removed to obtain toner particles.

(4) Emulsion polymerization and aggregation method: toner particles are obtained by aggregating and associating binder resin particles and, if necessary, release agent particles and colorant particles in an aqueous medium.

The following are examples of aqueous media. Water, a mixed solvent of water and an alcohol such as methanol, ethanol and propanol, and the like.

2. Silica Particles

Since the toner has silica particles as an external additive, as described above, the toner meshes with the fine particles comprising the organosilicon compound when the developing device is driven, and the shear force required to remove the fine particles from the outer surface of the developing roller is likely to be applied. In addition, since the silica particles are an inorganic silicon compound and are harder than the resin, the silica particles can demonstrate sufficient abrasiveness with respect to the developing roller in which the vicinity of the outer surface is increased in hardness and the fine particles comprising the organosilicon compound.

Known silica fine particles can be used as the silica particles according to the present disclosure and may be either dry silica fine particles or wet silica fine particles, preferably fine particles of wet silica obtained by a sol-gel method (hereinafter also referred to as sol-gel silica).

Sol-gel silica exists in a spherical and monodispersed form, but some particles may also coalesce.

Where the half-value width of the peak of primary particles in a weight-based particle size distribution chart is 25 nm or less, the number of such coalesced particles is small, the uniform attachment of the silica fine particles to the toner particle surface is enhanced, and higher flowability will be obtained.

In addition, the adhesion rate of silica particles to toner particles measured by a water washing method is 50% or more. Where the adhesion rate of the silica particles is 50% or more, the attachment force between the silica particles and the toner particles exceeds the attachment force between the fine particles and the developing roller, and the fine particles can be removed from the outer surface of the developing roller by the shear force generated when meshing with the fine particles. The adhesion rate is preferably 50% to 95%, more preferably 65% to 92%, and even more preferably 70% to 92%.

The adhesion rate can be controlled by the order of material addition, the temperature at the time of external addition, the number of revolutions, and the like when adding the external additive.

In addition, the number-average particle diameter of primary particles of silica particles is preferably 7 nm to 400 nm. The number-average particle diameter is preferably 7 nm or more, because meshing with the fine particles is facilitated and the shear force required to remove the fine particles from the outer surface of the developing roller is more likely to be applied. Further, the number-average particle diameter is preferably 400 nm or less, because meshing with the fine particles is facilitated, the silica particles are likely to be stably stuck to the binder resin, and the shear force is more likely to be applied.

Furthermore, the number-average particle diameter of the primary particles of the silica particles is more preferably 7 nm to 100 nm, more preferably 10 nm to 30 nm. The number-average particle diameter of the primary particles of the silica fine particles obtained by the sol-gel method can be controlled by the reaction temperature in the hydrolysis and condensation reaction steps, the dropping rate of the alkoxysilane, the weight ratio of water, organic solvent and catalyst, and the stirring speed.

Also, the content of the silica particles in the toner is preferably 0.5 parts by mass to 3.0 parts by mass, more preferably 1.0 part by mass to 2.0 parts by mass with respect to 100 parts by mass of the toner particles. When the content of the silica particles is 0.5 parts by mass or more, the silica particles are more likely to mesh with the fine particles, thereby facilitating the removal of the fine particles from the outer surface of the developing roller. Further, when the amount of the silica particles is 3.0 parts by mass or less, occurrence of rolling with the fine particles due to the presence of excess silica particles on the outer surface of the toner particle is suppressed, and the toner and the fine particles are more likely to mesh with each other, thereby facilitating the removal of the fine particles from the outer surface of the developing roller.

The silica fine particles obtained in this way are usually hydrophilic and have many surface silanol groups. Therefore, when the silica fine particles are to be used as an external additive for toner, it is preferable to hydrophobize the surface thereof.

A method of hydrophobizing treatment can be exemplified by a method in which the solvent is removed from the silica sol suspension, followed by drying and treatment with a hydrophobizing agent, and a method in which the silica sol suspension is directly added with a hydrophobizing agent and treated simultaneously with drying. From the viewpoint of controlling the half-value width of the particle size distribution and controlling the saturated water adsorption amount, a method of directly adding a hydrophobizing agent to the silica sol suspension is preferred.

Examples of hydrophobizing agents include the following.

γ-(2-Aminoethyl)aminopropyltrimethoxysilane, 7-(2-aminoethyl)aminopropylmethyldimethoxysilane, γ-methacryloxypropyltrimethoxysilane, N-β-(N-vinylbenzylaminoethyl)-γ-aminopropyltrimethoxysilane hydrochloride, hexamethyldisilazane, methyltrimethoxysilane, butyltrimethoxysilane, isobutyltrimethoxysilane, hexyltrimethoxysilane, octyltrimethoxysilane, decyltrimethoxysilane, dodecyltrimethoxysilane, phenyltrimethoxysilane, o-methylphenyltrimethoxysilane, p-methylphenyltrimethoxysilane, methyltriethoxysilane, butyltriethoxysilane, hexyltriethoxysilane, octyltriethoxysilane, decyltriethoxysilane, dodecyltoethoxysilane, phenyltriethoxysilane, o-methylphenyltriethoxysilane, and p-methylphenyltriethoxysilane.

Further, the silica fine particles may be subjected to pulverizing in order to facilitate monodispersion of the silica fine particles on the toner particle surface and to exhibit the effect of stably meshing with the fine particles.

3. Hydrotalcite Particles

Here, when the toner supply roller comprises an ion conductive agent in the foamed elastic layer, the toner preferably comprises hydrotalcite particles as an external additive. As a result, band images can be suppressed more quickly.

The hydrotalcite has ion exchange capacity. Therefore, even when the ion conductive agent component bleeds from the toner supply roller and adheres to the fine particles or the outer surface of the developing roller in the gaps between the fine particles, it is considered that where polishing is performed by the toner having hydrotalcite particles as an external additive, band images are suppressed more quickly because the ion conductive agent component is also removed by ion exchange with the hydrotalcite particles in the polishing process.

The hydrotalcite particles can be those represented by the following structural formula (1).

$$M^{2+}_{y}M^{3+}_{x}(OH)_2A^{n-}_{(x/n)}\cdot mH_2O \text{ Structural formula (1)}$$

Here, $0<x\leq 0.5$, $y=1-x$, and $m\geq 0$.

$M^{2+}$ and $M^{3+}$ represent divalent and trivalent metals, respectively.

$M^{2+}$ is preferably at least one divalent metal ion selected from the group consisting of Mg, Zn, Ca, Ba, Ni, Sr, Cu, and Fe.

$M^{3+}$ is preferably at least one trivalent metal ion selected from the group consisting of Al, B, Ga, Fe, Co, and In.

$A^{n-}$ is an n-valent anion exemplified by $CO_3^{2-}$, $OH^-$, $Cl^-$, $I^-$, $F^-$, $Br^-$, $SO_4^-$, $HCO_3^-$, $CH_3COO^-$, and $NO_3^-$, and may be present alone or in multiple species.

Furthermore, when the ion conductive agent comprises a fluorine-based anion, it is more preferable that the toner comprise, as an external additive, hydrotalcite particles in which fluorine is present. As described above, fluorine-based anions tend to exhibit excellent electrical conductivity, and are therefore suitable for, for example, toner supply rollers for highly durable developing devices.

Meanwhile, it is considered that where hydrotalcite has fluorine inside thereof, affinity with fluorine-based anions is improved and more excellent ion-exchange ability with respect to the fluorine-based anions is exhibited.

The hydrotalcite particles in which fluorine is present can be produced by introducing (intercalating) fluoride ions between layers by anion exchange. By introducing an appropriate amount of fluorine into the hydrotalcite particles, it is possible to exhibit excellent ion-exchange ability with respect to the fluorine-based anions.

The value Mg/Al (elemental ratio) of the ratio of the atomic number concentration of magnesium to aluminum in the hydrotalcite particles, which is obtained from the main component mapping of the hydrotalcite particles by the STEM-EDS mapping analysis of the toner, is preferably 1.5 to 4.0, more preferably 1.6 to 3.8.

Mg/Al can be controlled by adjusting the amount of raw materials during production of hydrotalcite. The atomic number concentration of magnesium is preferably 3.00 atomic % to 20.00 atomic %, more preferably 4.00 atomic % to 16.00 atomic %, still more preferably 9.00 atomic % to 14.00 atomic %.

The number-average particle diameter of the primary particles of the hydrotalcite particles is preferably 60 nm to 1000 nm, more preferably 60 nm to 800 nm, and even more preferably 200 nm to 600 nm.

In addition, the presence or absence of fluorine and aluminum content in the hydrotalcite particles can be confirmed by STEM-EDS mapping analysis of the toner. In the line analysis in the STEM-EDS mapping analysis of the toner, fluorine is preferably present inside the hydrotalcite particles, and fluorine and aluminum are more preferably present.

Further, the value F/Al (elemental ratio) of the atomic number concentration ratio of fluorine to aluminum in the hydrotalcite particles, which is obtained from the main component mapping of the hydrotalcite particles by the STEM-EDS mapping analysis of the toner, is preferably 0.01 to 0.60.

F/Al is preferably 0.01 or more because the affinity with fluorine-based anions is improved. F/Al is preferably 0.60 or less because the fluorine-based anion component is likely to be quickly ion-exchanged.

The elemental ratio F/Al is more preferably 0.02 to 0.60, and even more preferably 0.04 to 0.30. F/Al can be controlled by adjusting the concentration of fluorine during the production of the hydrotalcite particles.

The mixer for externally adding such an external additive to the toner particle is not particularly limited, and any known mixer can be used regardless of whether it is of dry or wet type. Examples thereof include FM Mixer (manufactured by Nippon Coke Kogyo Co., Ltd.), Super Mixer (manufactured by Kawata Mfg. Co., Ltd.), Nobilta (manufactured by Hosokawa Micron Corporation), Hybridizer (manufactured by Nara Machinery Co., Ltd.), and the like. In order to control the coating state of the external additive, the toner can be prepared by adjusting the number of revolutions of the external additive device, the processing time, and the temperature and amount of water in the jacket.

For example, the mixing time is preferably 1 min to 60 min, more preferably 3 min to 10 min. The temperature of the jacket is preferably 5° C. to 40° C., more preferably 7° C. to 15° C.

The content of such hydrotalcite particles is preferably 0.1 parts by mass to 1.0 part by mass, more preferably 0.1 parts by mass to 0.3 parts by mass, based on 100 parts by mass of the toner particles. By adding 0.1 part by mass or more, the ion conductive agent component from the toner supply roller can be efficiently removed by ion exchange with the hydrotalcite particles.

4. Other External Additives

In addition to the silica particles and hydrotalcite particles described above, the toner according to an embodiment of the present disclosure can comprise known particles such as titanium oxide, strontium titanate, zinc stearate, and the like as an additive within a range that does not impede the effects of the present disclosure.

Developing Device

FIG. 1 is a cross-sectional view perpendicular to the longitudinal direction of a developing device according to one embodiment of the present disclosure. The developing device 1 shown in FIG. 1 has the developing roller 2 having fine particles 4 attached to outer surface thereof, the toner supply roller 3, the developing container 6 in which the developing blade 5 is accommodated, and the toner container 8 in which toner 7 is accommodated. Further, the developing roller 2 is assembled so as to contact the toner supply roller 3 and the developing blade 5.

In the developing device 1 before initial use, the toner 7 may be present inside the developing container 6 or at the contact position between the developing roller 2 and the toner supply roller 3 as long as the effects of the present disclosure are not impaired, but as shown in FIG. 1, the toner is preferably partitioned from the developing container 6 by the sealing member 9 or the like. In the case of the developing device 1 in which the toner 7 is partitioned from the developing container 6 by the sealing member 9, the sealing member 9 is removed before the initial use of the developing device 1, so that the toner 7 flows into the developing container 6 from an opening provided in the toner container 8.

The developing process in the developing device 1 will be explained below. The toner 7 is applied onto the developing roller 2 by the toner supply roller 3 which is rotatably supported. The toner 7 applied on the developing roller 2 rubs against the developing blade 5 as the developing roller 2 rotates. An appropriate amount of toner 7 is uniformly coated on the developing roller 2 by regulating the toner 7 with the developing blade.

As described above, since the toner supply roller 3 is conductive, it is possible to apply a potential difference between the toner supply roller 3 and the developing roller 2 by applying a high voltage from the high-voltage power supply of the electrophotographic apparatus. It is preferable that the voltage applied to the toner supply roller 3 be different from the voltage applied to the developing roller 2 by about +300 V to −300 V.

For example, when a negative-charging toner is used, the amount of the toner 7 stripped from the developing roller 2 can be increased by setting the voltage difference to the positive side. Further, by setting the voltage difference to the negative side, the amount of the toner 7 supplied to the developing roller 2 can be increased. By performing such voltage control according to the state of the developing device 1, the supply/stripping amount of the toner 7 can be stabilized over a long period of time.

As the developing blade 5, a member in which a rubber elastic body is fixed to a metal plate, a member having a spring property such as a thin plate of SUS or phosphor bronze, or a member in which resin or rubber is laminated on the surface thereof can be used. Further, by providing a potential difference between the developing blade 5 and the developing roller 2, it is possible to control the toner layer on the developing roller 2. For this purpose, the developing blade 5 preferably has conductivity. The voltage applied to the developing blade 5 preferably has a difference of about 0 V to −300 V with respect to the voltage applied to the developing roller, for example, when a negative-charging toner is used.

Method for Cleaning Outer Surface of Developing Roller

A cleaning method according to one aspect of the present disclosure is implemented along with the use of the developing device, that is, along with the initial sequence driving of the developing device by the electrophotographic apparatus, for example, along with the driving for supplying and coating the toner on the developing roller at the time of initial use or driving for image output. By such driving, the toner in the developing container is supplied to the outer surface of the developing roller by driving the toner supply roller and the developing roller.

The toner is rubbed against the outer surface of the developing roller by a contacting member such as the toner supply roller, the developing blade, or the photosensitive member, which will be described hereinbelow, whereby a plurality of fine particles attached to the outer surface of the surface layer of the developing roller is brought into contact with the toner. Because of the contact between the fine particles and the toner, the fine particles are scraped off and removed from the surface. By combining the developing roller, fine particles, and toner that satisfy the features of the present disclosure, the fine particles to which the bleed substance from the toner supply roller has adhered are effectively removed from the outer surface of the developing roller along with these steps.

Process Cartridge and Electrophotographic Image Forming Apparatus A process cartridge according to the present disclosure is a process cartridge detachably mounted on the main body of the electrophotographic image forming apparatus (electrophotographic apparatus), the process cartridge having the above-described developing device.

Further, the electrophotographic apparatus according to the present disclosure comprises a photosensitive member and a developing device arranged in contact with the photosensitive member to supply a developer to an electrostatic latent image formed on the photosensitive member, the developing device being the developing device described above. It is possible to provide a process cartridge and an electrophotographic apparatus capable of suppressing the occurrence of band images occurring with a developing roller pitch when the developing device is allowed to stand in a high-temperature and high-humidity environment, having high durability and capable of obtaining high-quality images even when the developing device has a developing roller capable of suppressing the occurrence of scratches and filming at an extremely high level.

Figure 6:
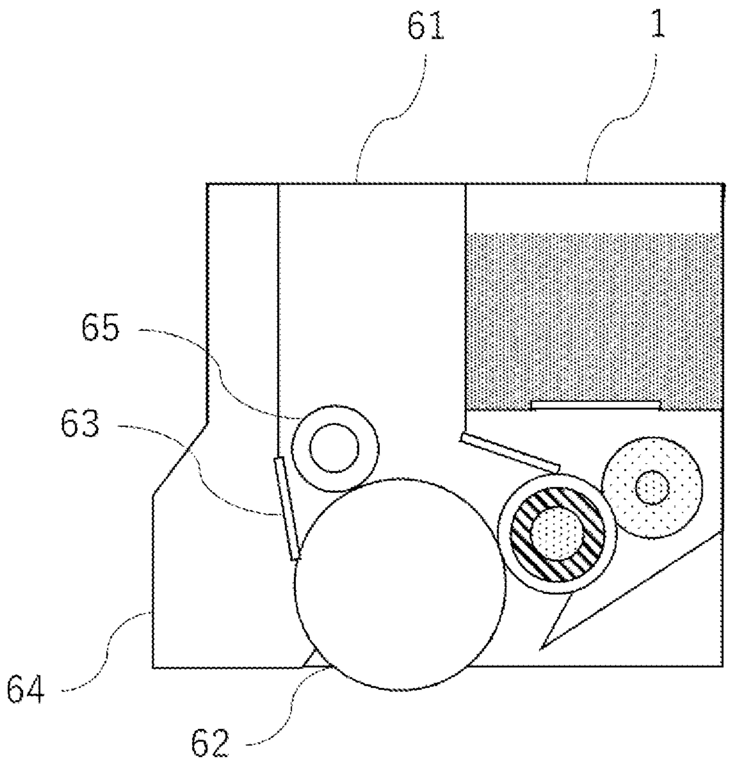
FIG. 6 is a cross-sectional view of a process cartridge relating to the present disclosure.

An embodiment of the process cartridge is shown in FIG. 6. A process cartridge 61 shown in FIG. 6 is detachably mounted to the electrophotographic apparatus and comprises the developing device 1 according to the present disclosure. Further, the process cartridge 61 shown in FIG. 6 is an all-in-one process cartridge integrated with a photosensitive member 62, a cleaning blade 63, a waste toner container 64, and a charging roller 65.

Figure 7:
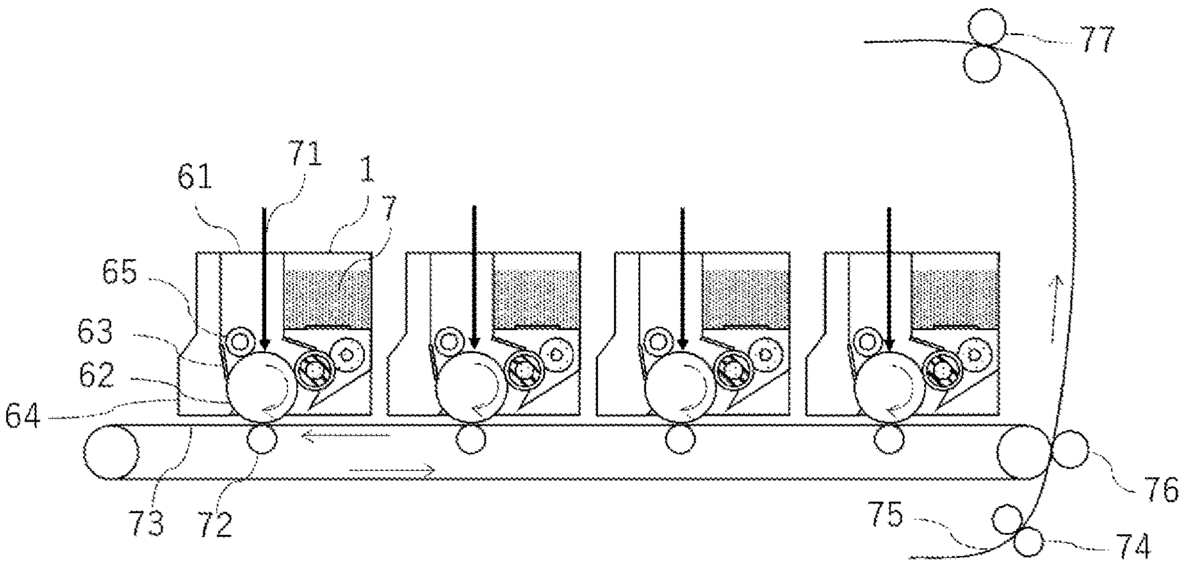
FIG. 7 is a cross-sectional view of an electrophotographic image forming apparatus relating to the present disclosure.

An embodiment of the electrophotographic apparatus is shown in FIG. 7. The process cartridge 61 having the developing device 1, the photosensitive member 62, the cleaning blade 63, the waste toner container 64 and the charging roller 65 is detachably mounted to the electrophotographic apparatus shown in FIG. 7. The photosensitive member 62, the cleaning blade 63, the waste toner container 64, and the charging roller 65 may be arranged in the main body of the electrophotographic apparatus.

The photosensitive member 62 rotates in the direction of the arrow and is uniformly charged by the charging roller 65 for charging the photosensitive member 62. An electrostatic latent image is formed on the surface of the photosensitive member 62 by laser light 71 which is exposure means for writing an electrostatic latent image on the photosensitive member 62. The electrostatic latent image is developed by applying the toner 7 by the developing device 1 arranged in contact with the photosensitive member 62 and visualized as a toner image. The development is a so-called reversal development that forms a toner image on the exposed portion.

The visualized toner image on the photosensitive member 62 is transferred to an endless belt-like transfer belt 73 by a transfer roller 72 which is a transfer member. The transferred toner image is conveyed by the transfer belt 73 to the secondary transfer position in the direction of the arrow and is transferred by a secondary transfer roller 76 onto paper 75 which is a recording medium fed by a paper supply roller 74. The paper 75 onto which the toner image has been transferred is subjected to fixing by a fixing device 77 and discharged out of the apparatus to complete the printing operation.

Methods for measuring physical properties are described below.

Method for Measuring Elastic Moduli E1 and E2 of First Region and Second Region of Developing Roller Surface Layer A scanning probe microscope (SPM) (trade name: MFP-3D-Origin, manufactured by Oxford Instruments) is used to measure the elastic moduli E1 and E2 of the first region and the second region of the developing roller surface layer.

A measurement sample is prepared in the following manner.

The developing roller is cooled to −150° C., and a cryomicrotome (trade name: UC-6, manufactured by Leica Microsystems) is used to cut out a thin rubber sample in which a cross section in the thickness direction of the surface layer including the outer surface of the developing roller surface layer is revealed.

The prepared thin rubber sample is allowed to stand for 24 h in an environment with a room temperature of 23° C. and a humidity of 50%. Next, the thin rubber sample is placed on a silicon wafer, and the silicon wafer is set on the stage of the scanning probe microscope. Then, the cross-sectional portion of the surface layer in the thin rubber sample is scanned with a probe (AC160 (product name), manufactured by Olympus Corporation). The conditions for the probe are resonance frequency: 282 kHz (primary) and 1.59 MHz (higher order). As the spring constant and the inverse constant of the probe, the values measured by the thermal noise method using the above apparatus are used for each probe.

Also, as other measurement conditions, the SPM measurement mode is an AM-FM mode, the free amplitude of the probe is 3 V, and the set point amplitude is 2 V (first order) and 25 mV (high order). In a field of view with a size of 5 μm×5 μm including the outer surface of the developing roller surface layer, the scanning speed is 1 Hz and the number of scanning points is 256 vertically and 256 horizontally.

Elastic Modulus E1 of the Matrix in the First Region of the Developing Roller Surface Layer For the first region of the developing roller surface layer (the region from the outer surface to 0.1 μm in depth in the cross section in the thickness direction), 10 measurement points are designated, a force curve is acquired based on the following conditions at each measurement point, and the elastic modulus is calculated by Hertz theory. For the results obtained, the arithmetic mean of 8 points, except for the highest and lowest values, is found. The matrix for the surface layer is selected by avoiding the electro-conductive agent, filler, and the like comprised in the surface layer. Specifically, the matrix is selected by designating measurement points while avoiding fine particle-shaped portions in the phase image of the field-of-view region.

Conditions for Acquisition of Force Curve

Force Dist: 500 nm
Scan Rate: 1.0 Hz
Show Markers: ON
Show Tip: ON
Withdraw During Movement: ON
Imaging Mode: Contact
Trigger Channel: DeflVolts
Increasing: ON
Relative: ON
Trigger Point: 0.2 V to 0.5 V Elastic Modulus Calculation Condition Based on Hertz Theory Segment: Ext
Tip Geometry: Sphere
Radius: 8 nm
Tip: Silicon <100>
Sample Poisson: 0.33

The above measurements are performed at a total of 9 locations, (3 locations at equal intervals in the axial direction of the developing roller)×(3 locations at equal intervals in the circumferential direction of the developing roller), and the arithmetic mean value is taken as the elastic modulus E1 of the matrix in the first region of the surface layer of the developing roller.

Elastic Modulus E2 of the Matrix in the Second Region of the Developing Roller Surface Layer The elastic modulus E2 of the matrix in the second region at a depth of 1.0 μm to 1.1 μm from the outer surface of the developing roller surface layer is measured in the same manner as the elastic modulus E1, except for the measurement points.

Method for Confirming that Fine Particles have Substantially Flat Surface and Curved Surface A scanning transmission electron microscope (STEM) is used to confirm that the fine particles have substantially flat surface and curved surface.

A sample for STEM observation is prepared in the following manner.

First, from vertically above a cover glass (Matsunami Glass Co., Ltd., square cover glass; square No. 1) placed on a horizontal surface, fine particles are sprinkled on the surface of the cover glass, and then the fine particles that have fallen on the surface are rubbed against the surface. Then, an Os film (5 nm) and a naphthalene film (20 nm) are applied to the fine particles as protective films using an osmium plasma coater (OPC80T, Filgen, Inc.).

Next, a PTFE tube (inner diameter Φ1.5 mm×outer diameter Φ3 mm×3 mm) is filled with a photocurable resin (product name: D800, manufactured by JEOL Ltd.). Next, a cover glass is gently placed on the tube so that the surface on which the fine particles are attached is in contact with the photocurable resin in the tube. In this state, the photocurable resin in the tube is irradiated with light to cure the photocurable resin. After that, the cover glass and the tube are removed to obtain a column made of the resin in which fine particles are embedded in the outermost surface portion. From the obtained column, a thin slice is cut out in which a cross section along the longitudinal direction of the column is exposed.

The cross section of the thin slice is cut using an ultrasonic ultramicrotome (Leica Microsystems, UC7) so that a new cross section parallel to the cross section is revealed. The cutting speed is 0.6 mm/s. Then, new cross sections revealed one after another are observed, and cutting is stopped when a cross section in which the radial portion of the embedded fine particle is revealed is obtained. Then, a sample for transmission electron microscope (STEM) observation (hereinafter also referred to as "STEM observation sample") having a film thickness of 100 nm in which the cross section where the radial portion of the embedded fine particles is revealed is produced.

The obtained sample for STEM observation is observed with STEM. The STEM device, observation method, and observation conditions used are as follows.

Device: "Tecnai TF20XT" (trade name, manufactured by FEI Inc.)

An image with a STEM probe size of 1 nm and an image size of 1024×1024 pixels is acquired. In addition, Contrast on the Detector Control panel of the bright-field image is adjusted to 1425, Brightness to 3750, Contrast of the Image Control panel to 0.0, Brightness to 0.5, and Gammma to 1.00, and a STEM image including a cross-section of the fine particle in the sample for STEM observation is acquired. The image is acquired at a magnification of 100,000 times to 200,000 times.

From the obtained STEM image, the number-average values of the fine particle ratio df/h, ratio l1/l2, and ratio s1/s2 are calculated using image processing software ImageJ (developed by Wayne Rasband). A method for calculating df/h will be described below with reference to FIGS. 5A to 5C.

First, using a straight line tool (Straight Line) on a toolbar, a scale bar in an observation condition display section displayed at the bottom of the image is selected. Where Set Scale is selected from the Analyze menu in that state, a new window opens and the pixel distance of the straight line selected in the Distance in Pixels box is entered. A scale bar value (for example, 100) in the Known Distance box of the window is entered, a scale bar unit (for example, nm) in the Unit of Measurement box is entered, and OK is clicked to complete the scale setting.

Next, ROI Manager is selected from Tools in the Analyze menu, and check is entered in Show All and Labels in the newly opened ROI Manager window.

Next, using the straight line tool (Straight Line) on the toolbar, a virtual straight line Li connecting the two intersection points Pa and Pb of the line Lf corresponding to the substantially flat surface of the fine particle and the line Lc corresponding to the curved surface shown in FIGS. 5A to 5C is drawn. In that state, Add is selected in the ROI Manager window. Next, a straight line A orthogonal to the virtual straight line Li is drawn as follows. The straight line A is drawn so that the distance d between the intersection point of the straight line A and the virtual straight line Li and the intersection point of the straight line A and the line Lf corresponding to the substantially flat surface of the fine particle is at maximum, and Add is selected. The distance d on the straight line A is the maximum length df.

Furthermore, a straight line Ls1 orthogonal to the virtual straight line Li is drawn as follows. The straight line Ls1 is drawn so that one of the following Da and db is maximized. The distance between the intersection point Pc, which is the intersection point of the virtual straight line Li and the straight line Ls1, and the intersection point Pe, which is the intersection point of the line Lc corresponding to the curved surface and the straight line Ls1, is denoted by Da. Also, the distance between the intersection point Pd, which is the intersection point of the line Lf corresponding to the substantially flat surface and the straight line Ls1, and the intersection point Pe, which is the intersection point of the line Lc corresponding to the curved surface and the straight line Ls1, is denoted by db.

The distance when any one of the Da and the db is at maximum is defined as the maximum height h. A straight line Ls1 is drawn in this way and Add is selected.

After that, where Measure in the ROI Manager window is selected, analysis is performed. The length (Length) corresponding to the maximum length df and the maximum height h is acquired from the newly opened Results window, and the ratio df/h is calculated.

Figure 5D:
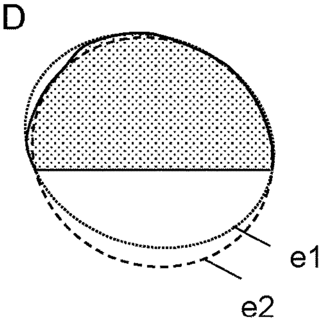
FIGS. 5D to 5G are diagrams showing examples of the major axis l1 of an ellipse e1, the major axis l2 of an ellipse e2, the minor axis s1 of the ellipse e1, and the minor axis s2 of the ellipse e2 at the time of cross-sectional observation of fine particles.
Figure 5E:
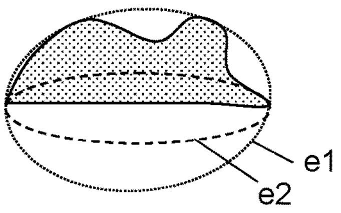

Also, using the elliptical tool (Elliptical selections) on the toolbar, an ellipse e1 that passes through two intersection points (corresponding to Pa and Pb above) of the substantially flat surface and the curved surface of the fine particle shown in FIGS. 5D and 5E and circumscribes the curved surface of the fine particle, and an ellipse e2 that passes through two intersection points (corresponding to Pa and Pb above) of the substantially flat surface and the curved surface of the fine particle and is inscribed in the curved surface of the fine particle are drawn. In that state, Add is selected in the ROI Manager window.

Figure 5F:
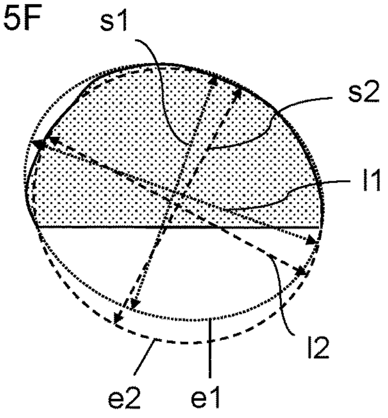
Figure 5G:
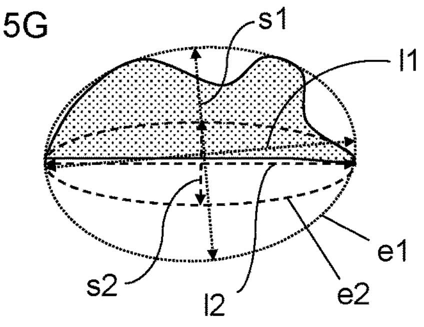

Next, using the straight line tool (Straight Line) on the toolbar, straight lines that form the major axis l1 and minor axis s1 of the ellipse e1 and the major axis l2 and minor axis s2 of the ellipse e2 are drawn, as shown in FIGS. 5F and 5G, and Add is selected. Where Measure is then selected in the ROI Manager window, analysis is performed. From the newly opened Results window, the lengths (Length) corresponding to the major axis l1 of the ellipse e1, the major axis l2 of the ellipse e2, the minor axis s1 of the ellipse e1 and the minor axis s2 of the ellipse e2 are acquired and ratios l1/l2 and s1/s2 are calculated.

The above procedure is performed for 100 fine particles to be evaluated, and the number-average values of the ratios df/h, l1/l2, and s1/s2 are calculated.

The following two points are confirmed using the above method.

(1) The number-average value of df/h is 0.00 to 0.10.

(2) The number-average value of l1/l2 is 0.90 to 1.10, and the number-average value of s1/s2 is 0.90 to 1.10.

Where it can be confirmed that these two points (1) and (2) are satisfied, the fine particles are determined to have a substantially hemispherical shape with a substantially flat surface and a curved surface.

Method for Confirming that Each Fine Particle has Substantially Flat Surface that is in Surface Contact with Outer Surface of Surface Layer and Curved Surface that Constitutes at Least Part of Protruding Portion A scanning electron microscope (SEM) is used to confirm whether the substantially flat surface of the fine particles is in contact with the outer surface of the developing roller.

First, a cross-sectional area including the outer surface of the developing roller is cut into thin slices using a diamond knife while being held at −110° C. with a cryomicrotome (trade name: EMFC6, manufactured by Leica Microsystems). Further, from the thin slice, a 100 μm square sample material including the outer surface of the surface layer of the developing roller and having a width of 1 μm in the depth direction is prepared.

The SEM equipment, observation method and conditions are as follows.

Device: Ultra-high resolution field emission scanning electron microscope S-4800 manufactured by Hitachi High-Technologies Corporation (hereinafter referred to as "S-4800").

(1) Sample Preparation

A carbon double-sided tape for SEM (manufactured by Nissin EM Co., Ltd.) is attached to a sample table (aluminum sample table 15 mm×6 mm), and a thin-slice sample of the developing roller is attached thereon. After that, platinum is vapor-deposited at 15 mA for 15 sec. The sample table is set in the sample holder and the sample table height is adjusted to 30 mm with the sample height gauge.

Setting the Conditions for Observation with the S-4800

Liquid nitrogen is introduced to the brim of the anti-contamination trap attached to the S-4800 housing and standing for 30 minutes is carried out. The "PC-SEM" of the S-4800 is started and flashing is performed (the FE tip, which is the electron source, is cleaned). The acceleration voltage display area in the control panel on the screen is clicked and the [flashing] button is pressed to open the flashing execution dialog. A flashing intensity of 2 is confirmed and execution is carried out. The emission current due to flashing is confirmed to be 20 μA to 40 μA. The sample holder is inserted in the specimen chamber of the S-4800 housing. [home] is pressed on the control panel to transfer the sample holder to the observation position.

The acceleration voltage display area is clicked to open the HV setting dialog and the acceleration voltage is set to [2.0 kV] and the emission current is set to [10 μA]. In the [Basic] tab of the operation panel, the signal selection is set to [SE], the SE detector is selected to [Lower (L)], and the mode to observe the backscattered electron image is set. Similarly, in the [base] tab of the operation panel, the probe current of the electron optical system condition block is set to [Normal]; the focus mode is set to [UHR]; and WD is set to [8.0 mm]. The [ON] button in the acceleration voltage display area of the control panel is pressed to apply the acceleration voltage.

(3) Focus adjustment The magnification is set to 5,000 (5 k) by dragging within the magnification indicator area of the control panel. Turning the [COARSE] focus knob on the operation panel, adjustment of the aperture alignment is carried out where some degree of focus has been obtained. [Align] in the control panel is clicked and the alignment dialog is displayed and [beam] is selected. The displayed beam is migrated to the center of the concentric circles by turning the STIGMA/ALIGNMENT knobs (X, Y) on the operation panel.

[aperture] is then selected and the STIGMA/ALIGNMENT knobs (X, Y) are turned one at a time and adjustment is performed so as to stop the motion of the image or minimize the motion. The aperture dialog is closed and focus is performed with the autofocus. This operation is repeated an additional two times to achieve focus. The magnification is set to 10,000 (10 k) times by dragging the inside of the magnification display section of the control panel while the middle point of the longest diameter of the observation particle is aligned with the center of the measurement screen. Turning the [COARSE] focus knob on the operation panel, adjustment of the aperture alignment is carried out where some degree of focus has been obtained. [Align] in the control panel is clicked and the alignment dialog is displayed and [beam] is selected. The displayed beam is migrated to the center of the concentric circles by turning the STIGMA/ALIGNMENT knobs (X, Y) on the operation panel.

[aperture] is then selected and the STIGMA/ALIGNMENT knobs (X, Y) are turned one at a time and adjustment is performed so as to stop the motion of the image or minimize the motion. The aperture dialog is closed and focus is performed with the autofocus. After that, the magnification is set to 50,000 (50 k) times, the focus is adjusted using the focus knob and the STIGMA/ALIGNMENT knob in the same manner as above, and focusing is performed by autofocus again. This operation is repeated again to adjust the focus.

(4) Image Saving

The brightness is adjusted in the ABC mode, the size is set to 640×480 pixels, the magnification is set to 10,000 to 50,000 (10 k to 50 k) times, and a cross-sectional image of the region including the fine particles and the outer surface of the developing roller is acquired and saved. From the obtained SEM image, it is confirmed that a plurality of fine particles are attached to the outer surface of the developing roller. Further, from the SEM image, it is confirmed that the fine particles having a substantially flat surface and a curved surface specified by the above method are in surface contact with the outer surface of the surface layer at the substantially flat surface, and that the fine particles form protrusions on the outer surface of the surface layer, and each curved surface constitutes at least a portion of the protruding portion.

Method for Calculating the Number-Average Value of Longest Diameter w of Substantially Flat Surface of Fine Particles A scanning electron microscope (SEM) is used to calculate the number-average value of the longest diameter w of the substantially flat surface.

A sample is prepared in the following manner.

An electro-conductive paste (product number 16053, manufactured by TED PELLA, Inc., PELCO Colloidal Graphite, Isopropanol base) is thinly applied to a sample stage (aluminum sample stage 15 mm×6 mm), and fine particles are attached on top thereof. After air blowing to remove excess fine particles from the sample stage, platinum is vapor-deposited at 15 mA for 15 sec. The sample stage is set on the sample holder, and the height of the sample stage is adjusted to 30 mm using a sample height gauge.

The SEM device, observation method and conditions are as described above.

From the obtained SEM image, the number-average value of the longest diameter w of the substantially flat surface of the fine particles is calculated using image processing software ImageJ (developed by Wayne Rasband). The scale setting is performed in the same manner as described above, and the number-average value of the longest diameter w of the substantially flat surface of the fine particles is calculated in the following procedure.

Figure 8:
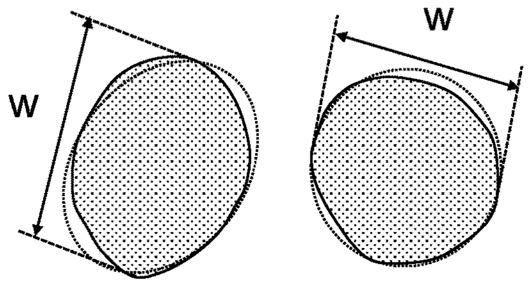
FIG. 8 is an explanatory diagram of the method of measuring the longest diameter of the substantially flat surface of the fine particles.

Set Measurements is selected from the Analyze menu and Feret's diameter is checked. Also, ROI Manager is selected from Tools in the Analyze menu, and Show All and Labels in the newly opened ROI Manager window are checked. Subsequently, using the elliptical tool (Elliptical selections) on the toolbar, the substantially flat surface of one fine particle is approximated by an ellipse, as shown in FIG. 8. In that state, Add is selected in the ROI Manager window.

Similarly, for fine particles different from the selected fine particle, the substantially flat surface is approximated by an ellipse, and Add is selected. Where Measure is selected in the ROI Manager window after repeating the operation for all fine particles in the image, analysis is performed.

From the newly opened Results window, the longest diameter w (Feret) of the substantially flat surface of each fine particle is acquired. The longest diameter w of the substantially flat surface of the fine particle thus obtained is the length of the longest straight line connecting any two points on the outer periphery of the substantially flat surface of the fine particle.

The above procedure is performed for 100 fine particles to be evaluated, and the number-average value of the longest diameter w of the substantially flat surface of the fine particles is calculated.

Method for Calculating Number-Average Value of Ratio h/b of Maximum Height h and Maximum Width b of Fine Particles A scanning transmission electron microscope (STEM) is used to calculate the number-average value of the ratio h/b of the maximum height h to the maximum width b.

The preparation of a sample for STEM observation, the STEM device, the observation method, and the conditions are the same as in the <Method for Confirming That Fine Particles Have Substantially Flat Surface and Curved Surface>.

From the obtained STEM image, the number-average value of the fine particle ratio h/b is calculated using image processing software ImageJ (developed by Wayne Rasband). The scale setting is performed as described above, and the subsequent steps are as follows.

ROI Manager is selected from Tools in the Analyze menu, and Show All and Labels are checked in the newly opened ROI Manager window. Subsequently, using the straight line tool (Straight Line) on the toolbar, a straight line Ls1 giving the maximum height h is drawn in the same manner as described above, as shown in FIGS. 5A to 5C. In that state, Add is selected in the ROI Manager window.

Next, as shown in FIGS. 5A to 5C, a straight line Ls2 orthogonal to the straight line Ls1 that gives the maximum height h and parallel to the virtual straight line Li is drawn. The straight line Ls2 is drawn so that the distance Dc between two intersection points Pf and Pg where the straight line Ls2 and the line Lc corresponding to the curved surface intersect is at maximum. The distance Dc between the intersections Pf and Pg at this time is the maximum width b. Where Measure is selected from the ROI Manager window after the straight line Ls2 is drawn and Add is selected, analysis is performed. The length (Length) corresponding to the maximum height h and the maximum width b is acquired from the newly opened Results window, and the ratio h/b is calculated.

The above procedure is performed for 100 fine particles to be evaluated, and the number-average value of the ratio h/b is calculated.

Confirmation that Fine Particles Comprise an Organosilicon Compound

Confirmation that the fine particles attached to the outer surface of the developing roller of the present disclosure comprise an organosilicon compound is performed using a Fourier transform infrared spectrometer (FTIR).

First, a carbon double-sided tape for SEM (manufactured by Nissin EM Co., Ltd.) is attached to a sample table, and a sufficient amount of fine particles attached to the outer surface of the developing roller is collected using the double-sided tape to obtain a sample.

Then, using an FTIR device (trade name: FT/IR-4700, manufactured by JASCO Corporation), the sample is measured under the conditions of crystal: Ge, ATR method, and number of integrations 64. The presence of the organosilicon compound is confirmed from the obtained infrared spectrum, for example, based on the presence or absence of signals attributed to organic groups shown below. Alkyl groups such as methyl group (Si—$CH_3$), ethyl group (Si—$C_2H_5$), propyl group (Si—$C_3H_7$), butyl group (Si—$C_4H_9$), pentyl group (Si—$C_5H_{11}$), hexyl group (Si—$C_6H_{13}$), heptyl group (Si-$C_7$His), octyl group (Si—$C_8H_{17}$), and the like bonded to a Si atom.

Method for Confirming Structures Represented by Formula (D), Formula (T) and Formula (Q)

Confirmation that the fine particles contain at least one selected from the group consisting of structures represented by formula (D), formula (T), and formula (Q), and that the toner has silica particles as an external additive (has the structure represented by formula (Q)) is performed using a nuclear magnetic resonance device (NMR).

Among the structures represented by formula (D), formula (T), and formula (Q), Ra, Rb, and Rc bonded to silicon atoms are confirmed by $^{13}$C-NMR (solid) measurement. Measurement conditions are shown below.

Measurement Conditions for $^{13}$C-NMR (Solid)

Device: JNM-ECX500II manufactured by JEOL RESONANCE Co., Ltd.
Sample tube: 3.2 mmφ
Sample: fine particles 150 mg
Measurement temperature: room temperature
Pulse mode: CP/MAS
Measurement nuclear frequency: 123.25 MHz ($^{13}$C)
Reference substance: adamantane (external standard: 29.5 ppm)
Sample rotation speed: 20 kHz
Contact time: 2 ms
Delay time: 2 s
Number of integrations: 1024 times In the structures represented by formula (D), formula (T), and formula (Q), the presence of Ra, Rb, and Rc is confirmed, for example, by the presence or absence of signals attributed to organic groups shown below. Alkyl groups such as methyl group (Si—$CH_3$), ethyl group (Si—$C_2H_5$), propyl group (Si—$C_3H_7$), butyl group (Si—$C_4H_9$), pentyl group (Si—$C_5H_{11}$), hexyl group (Si—$C_6H_{13}$), heptyl group (Si-$C_7$His), octyl group (Si—$C_8H_{17}$), and the like, aryl groups such as phenyl group (Si—$C_6H_5$) and the like, alkylene groups such as methine group (>CH—Si), methylene group (Si—$CH_2$—), ethylene group (Si—$C_2H_4$—), trimethylene group (Si—$C_3H_6$—), and the like, and arylene groups such as phenylene group (Si—$C_6H_4$—) and the like bonded to a Si atom.

Among the structures represented by formula (D), formula (T), and formula (Q), the siloxane bond portion is confirmed by $^{29}$Si-NMR (solid) measurement. Measurement conditions are shown below.

Measurement Conditions for $^{29}$Si-NMR (solid)

Device: JNM-ECX500II manufactured by JEOL RESONANCE Co., Ltd.
Sample tube: 3.2 mmp
Sample: fine particles 150 mg
Measurement temperature: room temperature
Pulse mode: CP/MAS
Measurement nuclear frequency: 97.38 MHz ($^{29}$Si)
Reference substance: DSS (external standard: 1.534 ppm)
Sample rotation speed: 10 kHz Contact time: 10 ms Delay time: 2 s Number of integrations: 2000 to 8000 times After the above measurement, peaks are separated into X1 structure, X2 structure, X3 structure, and X4 structure by curve fitting for a plurality of silane components with different substituents and bonding groups in the fine particles, and the peak area is calculated for each peak. Here, the structures of X1, X2, X3 and X4 are shown below by the structural formula (X1), (X2), (X3) and (X4) respectively.

X1 structure represented by structural formula (X1): $(Rd)(Re)(Rf)SiO_{1/2}$

X2 structure represented by structural formula (X2): $(Rg)(Rh)Si(O_{1/2})_2$

X3 structure represented by structural formula (X3): $RiSi(O_{1/2})_3$

X4 structure represented by structural formula (X4): $Si(O_{1/2})_4$ (X1)

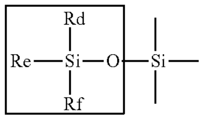

(X2)

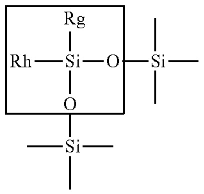

(X3)

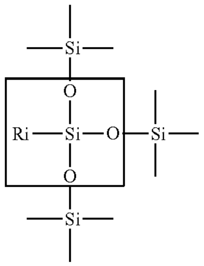

(X4)

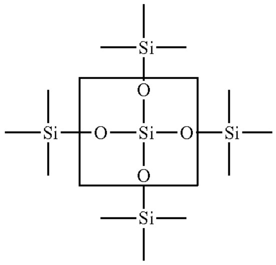

Rd, Re, Rf, Rg, Rh and Ri in formulas (X1) to (X4) each represent an organic group, a halogen atom, a hydroxy group, an acetoxy group or an alkoxy group bonded to a silicon atom.

In formulas (X1) to (X4), the structures of the portions enclosed by rectangles are X1 structure to X4 structure, respectively.

In the chart obtained by $^{29}$Si-NMR measurement of the fine particles, the ratio of the peak area of X2 structure to X4 structure attributed to the structures of formula (D), formula (T), and formula (Q) to the total peak area of the organosilicon polymer is preferably 50 mol % or more, more preferably 70 mol % or more.

When it is necessary to confirm the structures represented by formula (D), formula (T), and formula (Q) in more detail, the measurement results of $^{1}$H-NMR may be used together with the measurement results of $^{13}$C-NMR and $^{29}$Si-NMR for identification.

Method for Calculating the Amount of Fine Particles on Outer Surface of Surface Layer to which Fine Particles have been Attached The amount of the fine particles on the outer surface of the surface layer to which the fine particles have been attached can be measured by elemental analysis using EDS.

A double-sided carbon tape for SEM (manufactured by Nissin EM Co., Ltd.) is pasted on a sample stage (aluminum sample stage 15 mm×6 mm), and a sample of the developing roller cut out with a razor is pasted thereon so that the outer surface of the developing roller is the upper surface, and platinum is vapor-deposited at 15 mA for 15 sec. The sample stage is set on s sample holder, and the height of the sample stage including the attached developing roller piece is adjusted to 30 mm using a sample height gauge.

Next, using a scanning electron microscope "S-4800" (trade name; manufactured by Hitachi, Ltd.), the outer surface of the developing roller is observed in a field of view magnified up to 50,000 times. In the observation, focus is on the outer surface of the developing roller. EDS analysis is performed on an arbitrary position on the outer surface of the developing roller, and the element concentration (atomic %) of Si element on the outer surface of the developing roller comprising the fine particles is measured. The element concentration of the Si element is based on all the elements present on the outer surface of the surface layer of the developing roller.

The above measurement is repeated 10 times at different positions on the outer surface of the developing roller to obtain an arithmetic mean value.

Then, the sample is taken out from the scanning electron microscope. The outer surface of the sample is taped with a mending tape MP-18 (manufactured by Scotch) to peel off and remove fine particles on the outer surface of the sample. Using the scanning electron microscope again for the sample from which the fine particles have been peeled off and removed, the outer surface of the developing roller is observed in a field of view magnified up to 50,000 times. In the observation, the focus is on the outer surface of the developing roller. In the observation field, a position where no fine particles are present is designated and EDS analysis is performed to measure the element concentration (atomic %) of the Si element on the outer surface of the developing roller that does not contain the fine particles. The above measurement is repeated 10 times at different positions on the developing roller from which fine particles have been peeled off and removed, and an arithmetic mean value is obtained.

The difference between the arithmetic mean value of the element concentration of the Si element on the outer surface of the developing roller comprising the fine particles and the arithmetic mean value of the element concentration of the Si element on the outer surface of the developing roller from which the fine particles have been removed, which were thus obtained, is found and the amount (atomic %) of the fine particles on the outer surface of the surface layer to which the fine particles have been attached is calculated.

Method for Calculating Adhesion Rate of Silica Particles by Water Washing Method and Amount of Silica Added Calculation of the adhesion rate of silica particles by the water washing method is performed by the following method. The water washing method is as follows.

Water Washing

A sucrose concentrate is prepared by the addition of 160 g of sucrose (Kishida Chemical Co., Ltd.) to 100 mL of deionized water and dissolving while heating on a water bath. 31 g of this sucrose concentrate and 6 mL of Contaminon N (a 10 mass % aqueous solution of a neutral pH 7 detergent for cleaning precision measurement instrumentation, comprising a nonionic surfactant, anionic surfactant, and organic builder, Wako Pure Chemical Industries, Ltd.) are introduced into a centrifugal separation tube (50 mL volume) to prepare a dispersion. 1.0 g of the toner is added to this dispersion, and clumps of the toner are broken up using, for example, a spatula.

The centrifuge tube is shaken for 20 min with a shaker (MIGHTY SHAKER AS-1N, manufactured by AS ONE Corporation) at a shaking speed of 300 rpm and a shaking width of 40 mm.

After shaking, the solution is transferred over to a glass tube (50 mL volume) for swing rotor service, and separation is performed with a centrifugal separator (H-9R, Kokusan Co., Ltd.) using conditions of 3,500 rpm and 30 minutes. Satisfactory separation of the toner from the aqueous solution is checked visually, and the toner separated into the uppermost layer is recovered with, for example, a spatula. The aqueous solution containing the recovered toner is filtered on a vacuum filter and then dried for at least 1 hour in a dryer. The dried toner is pulverized with a spatula and washed with water to obtain a sample.

Next, the amount of silicon in the obtained sample after water washing is measured with fluorescent X-rays. The adhesion rate (%) is calculated from the ratio of the amount of the target element in the toner after water washing and the toner before water washing.

Measurement of the X-ray fluorescence of the particular element is based on JIS K 0119-1969 and specifically proceeds as follows. An "Axios" wavelength-dispersive X-ray fluorescence analyzer (PANalytical B.V.) is used as the measurement instrumentation, and the "SuperQ ver. 4.0F" (PANalytical B.V.) software provided with the instrument is used in order to set the measurement conditions and analyze the measurement data. Rh is used for the X-ray tube anode; a vacuum is used for the measurement atmosphere; the measurement diameter (collimator mask diameter) is 10 mm; and the measurement time is 10 seconds. Detection is carried out with a proportional counter (PC) in the case of measurement of light elements, and with a scintillation counter (SC) in the case of measurement of heavy elements.

The samples to be measured are those prepared by the following method. 1 g of the toner before or after water washing is introduced into a specialized aluminum compaction ring with a diameter of 10 mm and is smoothed over. Then, using a "BRE-32" tablet compression molder (Maekawa Testing Machine Mfg. Co., Ltd.), a pellet is produced by molding to a thickness of 2 mm by compression for 60 seconds at 20 MPa, and this pellet is used as the measurement sample. The measurement is performed using the conditions indicated above and the elements are identified based on the positions of the resulting X-ray peaks; their concentrations are calculated from the count rate (unit: cps), which is the number of X-ray photons per unit time.

A method for quantifying the amount of silicon in the toner is as follows.

0.5 mass parts of silica ($SiO_2$) fine powder is added to 100 mass parts of the toner particle and thorough mixing is performed using a coffee mill. Similarly, 2.0 mass parts and 5.0 mass parts of the silica fine powder are each likewise mixed with 100 mass parts of the toner particle, and these are used as samples for calibration curve construction.

For each of these samples, a pellet of the sample for calibration curve construction is fabricated proceeding as above using the tablet compression molder, and the count rate (unit: cps) is measured for the Si-Kα radiation observed at a diffraction angle (2θ)=109.080 using polyethylene terephthalate (PET) for the analyzer crystal. In this case, the acceleration voltage and current value for the X-ray generator are, respectively, 24 kV and 100 mA. A calibration curve in the form of a linear function is obtained by placing the obtained X-ray count rate on the vertical axis and the amount of $SiO_2$ addition to each calibration curve sample on the horizontal axis.

Next, the toner to be analyzed is made into pellets as described above using the tablet press, and the Si-Kα ray count rate is measured. Then, the content of silica in the toner is obtained from the above calibration curve. The ratio of the silicon element amount W (after water washing) in the toner after water washing to the silicon element amount W (before water washing) in the toner before water washing calculated by the above method is obtained and defined as the adhesion rate (%).

$$\text{Adhesion rate (\%)}=\{[\text{Silicon element amount } W \text{ (before water washing)}]-[\text{Silicon element amount } W \text{ (after water washing)}]/[\text{Silicon element amount } W \text{ (before water washing)}]$$

Also, from the silicon element amount W (before water washing) of the toner before water washing measured at this time, the addition amount (parts by weight) of silica as an external additive can be calculated.

Method for Calculating Number-Average Particle Diameter of Primary Particles of Silica Particles Calculation is performed by combining elemental analysis by scanning electron microscope "S-4800" (trade name; manufactured by Hitachi, Ltd.) with that by energy dispersive X-ray analysis (EDS).

A sample is prepared in the following manner.

An electro-conductive paste (product number 16053, manufactured by TED PELLA, Inc., PELCO Colloidal Graphite, Isopropanol base) is thinly applied to a sample stage (aluminum sample stage 15 mm×6 mm), and toner is attached on top thereof. After air blowing to remove excess toner from the sample stage, platinum is vapor-deposited at 15 mA for 15 sec. The sample stage is set on the sample holder, and the height of the sample stage is adjusted to 30 mm using a sample height gauge.

Using a scanning electron microscope, the toner is observed in a field of view magnified up to 50,000 times. The external additive is observed by focusing on the toner particle surface. EDS analysis is performed on each particle of the external additive, and it is determined whether the analyzed particles are silica particles based on the presence or absence of Si element peaks.

In a field of view magnified up to 200,000 times, the above-mentioned EDS elemental analysis method is also used to randomly capture an image of the outer surface of the toner.

From the captured image, 100 silica particles are randomly selected, the major diameter of the primary particles of the target fine particles is measured, and the arithmetic mean value thereof is taken as the number-average particle diameter.

When the toner comprises both organosilicon polymer particles and silica particles, silica particles are identified by comparing the ratio (Si/O ratio) of the elemental contents (atomic %) of Si and O with specimens.

EDS analysis is performed under the same conditions for specimens of the organosilicon polymer particles and silica particles to obtain respective elemental contents (atomic %) of Si and O.

The Si/O ratio of the organosilicon polymer particles is denoted by A and the Si/O ratio of the silica particles is denoted by B. Measurement conditions under which A is significantly greater than B are selected.

Specifically, the specimens are measured 10 times under the same conditions, and the arithmetic mean of each of A and B is obtained. Measurement conditions are selected such that the obtained average value is A/B>1.1.

When the Si/O ratio of the particles to be determined is on the A side of [(A+B)/2], the particles are identified to be organosilicon polymer particles. Otherwise, the particles are determined to be silica particles.

TOSPEARL 120A (Momentive Performance Materials Japan Co., Ltd.) is used as a specimen of organosilicon polymer particles, and HDK V15 (Asahi Kasei Corp.) is used as a specimen of silica fine particles.

The observation magnification is adjusted, as appropriate, according to the size of the silica particles.

Method for Identifying Hydrotalcite Particles

The identification of the hydrotalcite particles, which are an external additive, can be performed by combining shape observation with a scanning electron microscope (SEM) and elemental analysis with an energy dispersive X-ray spectroscopy (EDS).

Using a scanning electron microscope "S-4800" (trade name; manufactured by Hitachi, Ltd.), the toner is observed in a field of view magnified up to 50,000 times. The external additive to be identified is observed by focusing on the toner particle surface. EDS analysis is performed on the external additive to be identified, and hydrotalcite particles can be identified from the types of elemental peaks.

Where an elemental peak of at least one metal selected from the group consisting of Mg, Zn, Ca, Ba, Ni, Sr, Cu, and Fe and an elemental peak of at least one metal selected from the group consisting of Al, B, Ga, Fe, Co, and In, which are metals that can constitute hydrotalcite particles, are observed as elemental peaks, the presence of hydrotalcite particles including metals of the above two kinds can be inferred.

A specimen of hydrotalcite particles inferred by EDS analysis is separately prepared, and shape observation by SEM and EDS analysis are performed. Whether the particles are from hydrotalcite is determined by comparing whether the analysis results of the specimen match the analysis results of the particles to be identified.

Method for Measuring Element Ratio of Polyvalent Metal Elements in Hydrotalcite Particles The ratio of each element of the polyvalent metal elements of the hydrotalcite particles is measured by EDS mapping measurement of the toner using a scanning transmission electron microscope (STEM). EDS mapping measurements have spectral data for each pixel in the analysis area. EDS mapping can be measured with high sensitivity by using a silicon drift detector with a large detection element area.

By performing statistical analysis on the spectral data of each pixel obtained by EDS mapping measurement, it is possible to obtain principal component mapping in which pixels with similar spectra are extracted, enabling mapping that specifies components.

The observation sample is prepared according to the following procedure.

A total of 0.5 g of toner is weighed and placed in a cylindrical mold with a diameter of 8 mm using a Newton press under a load of 40 kN for 2 min to prepare a cylindrical toner pellet with a diameter of 8 mm and a thickness of 1 mm. A thin slice with a thickness of 200 nm is produced from the toner pellet by means of an ultramicrotome (Leica Microsystems, FC7).

STEM-EDS analysis is performed with the following equipment and conditions.

Scanning transmission electron microscope: JEM-2800 manufactured by JEOL Ltd.

EDS detector: JEOL JED-2300T dry SD100GV detector (detection element area: 100 $mm^2$)

EDS analyzer: NORAN System 7, manufactured by Thermo Fisher Scientific Inc. Conditions of STEM-EDS STEM acceleration voltage: 200 kV Magnification: 20,000 times Probe size: 1 nm STEM image size: 1024×1024 pixels (an EDS elemental mapping image at the same position is acquired)

EDS mapping size: 256×256 pixels, Dwell Time: 30 s, number of integrations: 100 frames The ratio of each element such as polyvalent metal elements in hydrotalcite particles based on multivariate analysis is obtained as follows.

EDS mapping is obtained with the above STEM-EDS analyzer. Next, multivariate analysis is performed on the collected spectral mapping data using the COMPASS (PCA) mode in the measurement command of the NORAN System 7 mentioned above to extract a principal component map image.

At that time, the setting values are as follows.

Kernel size: 3×3

Quantitative map setting: high (delayed)

Filter fit type: high precision (slow)

At the same time, by such operations, the area ratio of each extracted principal component in the EDS measurement field of view is calculated. Quantitative analysis is performed by the Cliff-Lorimer method on the EDS spectrum of each of the obtained principal component mappings.

The toner particle portion and the hydrotalcite particles are discriminated from each other based on the quantitative analysis results of the obtained STEM-EDS principal component mapping. The particles can be identified as hydrotalcite particles from the particle diameter, shape, content of polyvalent metals such as aluminum and magnesium, and weight ratio thereof.

In addition, when fluorine and aluminum are present inside the hydrotalcite particles, the particles can be determined to be hydrotalcite particles comprising fluorine and aluminum by the following means.

Method for Analyzing Fluorine and Aluminum in Hydrotalcite Particles Based on the mapping data from the STEM-EDS mapping analysis obtained by the above method, the hydrotalcite particles are analyzed for fluorine and aluminum. Specifically, an EDS line analysis is performed in the direction normal to the outer periphery of the hydrotalcite particle to analyze fluorine and aluminum present inside the particle.

Figure 9A:
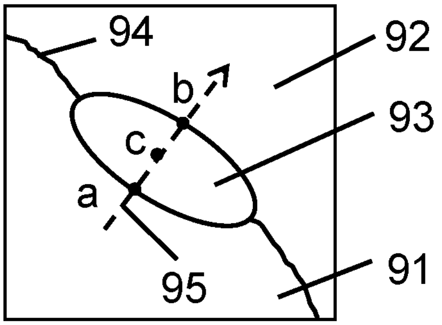
FIGS. 9A to 9C are schematic diagrams of EDS line analysis in STEM-EDS mapping analysis.

A schematic diagram of line analysis is shown in FIG. 9A. Line analysis is performed in the direction normal to the outer periphery of a hydrotalcite particle 93 in the hydrotalcite particle 93 adjacent to a toner particle 91 and a toner particle 92, that is, in a direction of 95 in FIG. 9A. Reference numeral 94 indicates the boundary of the toner particles.

The range where the hydrotalcite particle is present in the acquired STEM image is selected with a rectangular selection tool, and line analysis is performed under the following conditions.

Line Analysis Conditions

STEM magnification: 800,000 times

Line length: 200 nm

Line width: 30 nm

Number of line divisions: 100 points (intensity measurement every 2 nm)

When the elemental peak intensity of fluorine or aluminum is present in the EDS spectrum of the hydrotalcite particle at least 1.5 times the background intensity and also when the elemental peak intensity of fluorine or aluminum at each of two ends (points a and b in FIG. 9A) of the hydrotalcite particle in the line analysis does not exceed 3.0 times the peak intensity at point c, the element is determined to be comprised inside the hydrotalcite particle. The point c is the midpoint of the line segment ab (that is, the midpoint between the two ends).

Figure 9B:
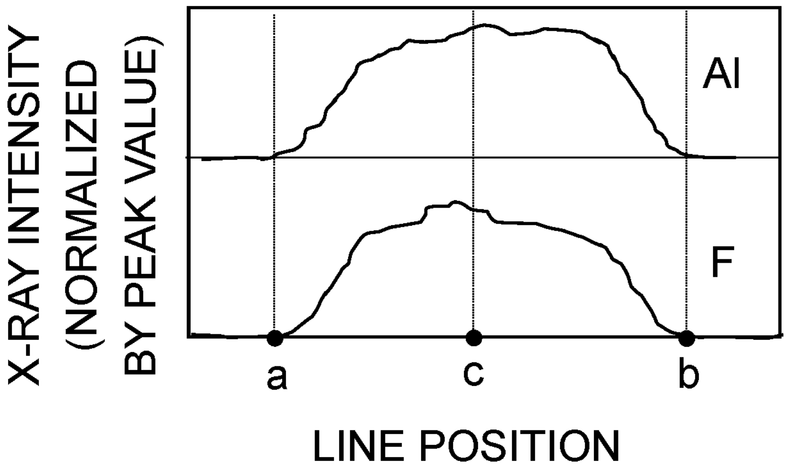
Figure 9C:
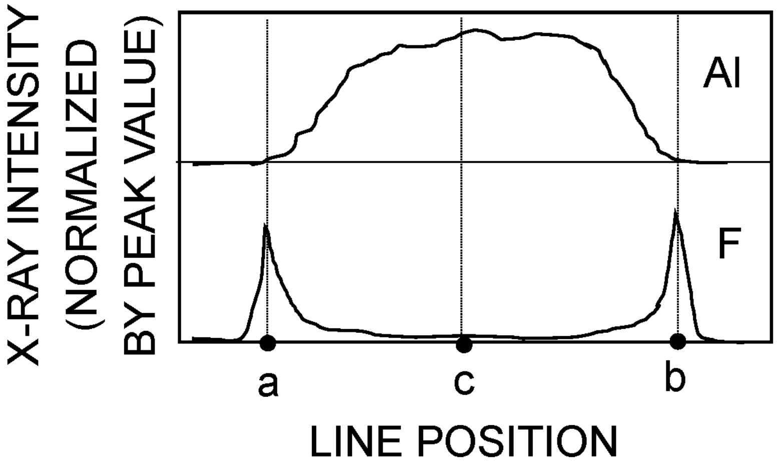

Examples of X-ray intensities of fluorine and aluminum obtained by line analysis are shown in FIGS. 9B and 9C. When the hydrotalcite particle comprises fluorine and aluminum inside, the graph of the X-ray intensity normalized by the peak intensity shows a shape like that shown FIG. 9B. When the hydrotalcite particle comprises fluorine derived from a surface treatment agent, the graph of the X-ray intensity normalized by the peak intensity has peaks near points a and b at both ends of the graph of fluorine, as shown in FIG. 9C. By confirming the X-ray intensity derived from fluorine and aluminum in the line analysis, it can be confirmed that the hydrotalcite particle comprises fluorine and aluminum inside.

Method for Calculating Value of Ratio (Elemental Ratio) F/Al of Atomic Number Concentration of Fluorine to Aluminum in Hydrotalcite Particles The atomic number concentration ratio (elemental ratio) F/Al of fluorine and aluminum in the hydrotalcite particles obtained from the principal component mapping derived from the hydrotalcite particles which is determined by the STEM-EDS mapping analysis described above is acquired in a plurality of fields of view, and the arithmetic mean of 100 or more such particles is taken to obtain the atomic number concentration ratio (element ratio) F/Al of fluorine to aluminum in the hydrotalcite particles.

Method for Calculating Value of Ratio (Elemental Ratio) Mg/Al of Atomic Number Concentration of Magnesium to Aluminum in Hydrotalcite Particles Calculation is performed with respect to magnesium and aluminum by the same method as the method for calculating the atomic number concentration ratio (element ratio) F/Al of fluorine to aluminum in the hydrotalcite particles described hereinabove, and the atomic number concentration ratio (element ratio) Mg/Al of magnesium to aluminum in the hydrotalcite particles is calculated.

Method for Measuring Number-Average Particle Diameter of Primary Particles of Hydrotalcite Particles The number-average particle diameter of hydrotalcite particles is measured by combining elemental analysis by scanning electron microscope "5-4800" (trade name; manufactured by Hitachi, Ltd.) with that by energy dispersive X-ray analysis (EDS).

A sample is prepared in the following manner.

An electro-conductive paste (product number 16053, manufactured by TED PELLA, Inc., PELCO Colloidal Graphite, Isopropanol base) is thinly applied to a sample stage (aluminum sample stage 15 mm×6 mm), and toner is attached on top thereof. After air blowing to remove excess toner from the sample stage, platinum is vapor-deposited at 15 mA for 15 sec. The sample stage is set on the sample holder, and the height of the sample stage is adjusted to 30 mm using a sample height gauge.

In a field of view magnified up to 200,000 times, the above-mentioned EDS elemental analysis method is used to randomly capture an image of the outer surface of the toner. From the captured image, hydrotalcite particles are selected, and the major diameter of the primary particles of 100 hydrotalcite particles is randomly measured to determine the number-average particle diameter. The observation magnification is adjusted, as appropriate, according to the size of the external additive. Here, a particle that looks like a single particle in observation is determined to be a primary particle.

According to at least one aspect of the present disclosure, it is possible to provide a developing device that contributes to stable formation of high quality electrophotographic images. Moreover, according to at least one aspect of the present disclosure, it is possible to provide a cleaning method for the developing roller that can better remove the adhered matter on the outer surface of the developing roller. Furthermore, according to at least one aspect of the present disclosure, it is possible to provide a process cartridge that contributes to stable formation of high quality electrophotographic images. Furthermore, according to at least one aspect of the present disclosure, it is possible to provide an electrophotographic image forming apparatus capable of stably forming high quality electrophotographic images.

EXAMPLES

The present disclosure will be described in more detail hereinbelow with reference to Examples and Comparative Examples, but the present disclosure is not limited thereto. Unless otherwise specified, the parts used in the examples are based on mass.

Production Example of Developing Roller

Production of Developing Roller 1

Production of Intermediate Layer Roller 1

A substrate was prepared by coating a primer (trade name: DY35-051, manufactured by Dow Corning Toray Co., Ltd.) on a SUS304 mandrel having an outer diameter of 6 mm and a length of 263 mm and baking. This substrate was placed in a mold, and an addition-type silicone rubber composition mixed with the materials shown in Table 1 below was injected into the cavity formed in the mold.

Subsequently, by heating the mold, the addition-type silicone rubber composition was cured by heating at a temperature of 150° C. for 15 min and demolded. Thereafter, the mixture was further heated at a temperature of 180° C. for 1 h to complete the curing reaction, thereby producing an intermediate layer roller 1 having an electro-conductive elastic layer (intermediate layer 22) with a thickness of 2.75 mm on the outer circumference of the substrate.

TABLE 1

| Material | Parts by mass |
|---|---|
| Liquid silicone rubber material (Trade name: SE6724A/B, manufactured by Dow Corning Toray Co., Ltd.) | 100 |
| Carbon black (Trade name: TOKABLACK #7360SB, manufactured by Tokai Carbon Co., Ltd.) | 20 |
| Platinum catalyst | 0.1 |

Production of Isocyanate Group-Terminated Prepolymer B-1

A total of 100 parts of polyether polyol (trade name: PTG-L3500, manufactured by Hodogaya Chemical Co., Ltd.) was gradually added dropwise to 25 parts of polymeric MDI (trade name: Millionate MR200, manufactured by Tosoh Corporation) in a reaction vessel under a nitrogen atmosphere. At this time, the temperature in the reaction vessel was kept at 65° C. After completion of the dropwise addition, the reaction was conducted at 65° C. for 2 h.

The obtained reaction mixture was cooled to room temperature to obtain an isocyanate group-terminated prepolymer B-1 having an isocyanate group content of 4.3% by mass.

Preparation of Resin Layer Coating Liquid X-1

Then, the raw materials were mixed in the proportions shown in Table 2 below.

TABLE 2

| Material | Parts by mass |
|---|---|
| Isocyanate group-terminated prepolymer B-1 | 58 |
| Polyether polyol A-1 (Trade name: PTMG2000, manufactured by Mitsubishi Chemical Corporation) | 42 |
| Carbon black D-1 (Trade name: MA100, manufactured by Mitsubishi Chemical Corporation) | 25 |
| Resin particles E-1 (Trade name: C-400 transparent, manufactured by Negami Chemical Industrial Co., Ltd.) | 15 |
| Silicone-based surfactant F-1 (Trade name: TSF4446, manufactured by Momentive Performance Materials Japan Co., Ltd.) | 3 |

Next, methyl ethyl ketone (MEK) was added so that the solid content of the raw material was 30% by mass, and a mixed liquid 1 was obtained. Further, 250 parts of the mixed liquid 1 and 200 parts of glass beads having an average particle diameter of 0.8 mm were placed in a glass bottle with an internal volume of 450 mL and dispersed for 3 h using a paint shaker (manufactured by Toyo Seiki Co., Ltd.). After that, the glass beads were removed to obtain a resin layer coating liquid X-1 for forming a resin layer comprising a crosslinked urethane resin.

Preparation of Resin Layer Roller Y-1

After dipping the intermediate layer roller 1 once in the surface layer coating liquid X-1, the roller was air-dried at a temperature of 23° C. for 30 min. Then, the roller was dried for 1 h in a hot air circulation dryer set to a temperature of 160° C. to produce a resin layer roller Y-1 in which a resin layer comprising a crosslinked urethane resin was formed on the outer peripheral surface of the intermediate layer roller. At this time, the layer thickness of the resin layer was 15 μm.

The dip coating immersion time was 9 sec. The pull-up speed in dip coating was adjusted so that the initial speed was 20 mm/sec and the final speed was 2 mm/sec, and the speed was changed linearly with time between 20 mm/sec and 2 mm/sec.

Preparation of Impregnation Coating Solution W-1

The raw materials were mixed in the following proportion.

Acrylic monomer G-1 (trade name: NK Ester A-NPG, manufactured by Shin-Nakamura Chemical Co., Ltd.): 100.0 parts Photopolymerization initiator H-1 (trade name: Omnirad 184, manufactured by IGM Resins): 10.0 parts Next, methyl ethyl ketone (MEK) was added so that the solid content of the above raw materials was 5.5% by mass, and stirring was performed for 3 h with a rotating means to obtain an impregnation coating liquid W-1.

Production of Developing Roller 1

The resin layer roller Y-1 was impregnated with the impregnation coating liquid W-1 by dipping once, and then air-dried at 90° C. for 60 min. The pull-up speed in dip coating was 20 mm/sec. Next, while rotating the resin layer roller Y-1 in the circumferential direction at 20 rpm, the outer surface of the resin layer roller Y-1 was irradiated with UV light by using a high-pressure mercury UV lamp (trade name: Handy-Type UV curing device, manufactured by Mario Network Co., Ltd.) in an air atmosphere with an integrated quantity of light of 15,000 mJ/cm$^2$ to crosslink and cure the acrylic monomer. The impregnated developing roller 1 was produced as described above. The layer thickness of the surface layer was 15 μm.

Table 5 shows the physical properties of the obtained developing roller 1.

Production Examples of Developing Rollers 2 to 5, C-1, and C-2

Table 3 shows the raw materials used to produce developing rollers 2 to 5, C-1, and C-2.

TABLE 3

| | Compound name |
|---|---|
| A-1 | Polyether polyol (Hydroxylation: 56.1 mg KOH/g. trade name: PTMG2000, manufactured by Mitsubishi Chemical Corporation) |
| A-2 | Polyether polyol (Hydroxylation: 17.5 mg KOH/g. trade name: PTG-L3500, manufactured by Hodogaya Chemical Co., Ltd.) |
| A-3 | Amine-based polyol (Hydroxylation: 701 mg KOH/g, trade name: NP-400, manufactured by Sanyo Chemical Industries, Ltd.) |
| B-1 | Polyether-based polyol/Polymeric MDI (NCO content: 4.3%, trade name PTG-L3500, manufactured by Hodogaya Chemical Co., Ltd./trade name: Millionate MR200, manufactured by Tosoh Corporation) |
| D-1 | Carbon black (Trade name: MA100, average primary particle diameter 24 nm, manufactured by Mitsubishi Chemical Corporation) |
| E-1 | Resin particles (Trade name: ART PEARL C-400 transparent, average particle diameter 15.0 μm, manufactured by Negami Chemical Industrial Co., Ltd,) |
| F-1 | Silicone-based surfactant F-1 (Trade name: TSF4446, manufactured by Momentive Performance Materials Japan Co., Ltd.) |
| G-1 | Neopentyl glycol diacrylate (Number of functional groups: 2, viscosity: 6 mPa · s/25° C., trade name: NK Ester A-NPG, manufactured by Shin-Nakamura Chemical Co., Ltd.) |

TABLE 3-continued

| | Compound name |
|---|---|
| G-2 | PO-modified neopentyl glycol diacrylate (Number of functional groups: 2, viscosity: 20 mPa · s/25° C., trade name: EBECRYL 145, manufactured by Daicel-Allnex, Ltd.) |
| G-3 | Pentaerythritol alkoxytetraacrylate (Number of functional groups: 4, viscosity: 160 mPa · s/25° C., trade name: EBECRYL 40, manufactured by Daicel-Allnex, Ltd.) |
| H-1 | α-Hydroxyalkylphenone (Radical photopolymerization initiator, trade name: Omnirad 184, manufactured by IGM Resins) |

The resin layer rollers Y-2 to Y-4 were formed in the same manner as the resin layer roller Y-1, except that the proportions were as shown in Tables 4-1 and 4-2 and the solid content of the resin layer coating material and the dip coating pull-up speed were adjusted so that the layer thickness was 15 km.

TABLE 4-1

| Resin | | | Polyol | | Isocyanate | |
|---|---|---|---|---|---|---|
| layer roller | Intermediate layer roller | Resin layer coating liquid | Type | Parts by mass | Type | Parts by mass |
| Y-1 | 1 | X-1 | A-1 | 42 | B-1 | 58 |
| Y-2 | 1 | X-2 | A-2 | 73 | B-1 | 27 |
| Y-3 | 1 | X-3 | A-3 | 6 | B-1 | 94 |
| Y-4 | 1 | X-4 | A-3 | 6 | B-1 | 94 |

TABLE 4-2

| Resin | Conductive agent | | Resin particles | | Additive | |
|---|---|---|---|---|---|---|
| layer roller | Type | Parts by mass | Type | Parts by mass | Type | Parts by mass |
| Y-1 | D-1 | 25 | E-1 | 15 | F-1 | 3 |
| Y-2 | D-1 | 25 | E-1 | 15 | F-1 | 3 |
| Y-3 | D-1 | 25 | E-1 | 15 | F-1 | 3 |
| Y-4 | D-1 | 25 | E-1 | 15 | — | — |

Developing rollers 2 to 5, C-1, and C-2 were produced in the same manner as the developing roller 1, except that the proportions and conditions shown in Table 5 were used. Table 5 also shows the physical properties of the obtained developing rollers. The layer thickness of the developing rollers 2 to 5, C-1 and C-2 was 15 am.

TABLE 5

| | | Impregnation coating liquid | | | | | | | | |
|---|---|---|---|---|---|---|---|---|---|---|
| | Resin | | Acrylic monomer | | Initiator | | Solid | Integrated quantity of | Easticity of the matrix | |
| Developing roller | layer roller | No. | Type | Parts by mass | Type | Parts by mass | content NV % | light mJ/cm$^2$ | E1 MPa | E2 MPa |
| 1 | Y-1 | W-1 | G-1 | 100 | H-1 | 10 | 5.5 | 15000 | 510 | 21 |
| 2 | Y-1 | W-2 | G-2 | 100 | H-1 | 5 | 1.1 | 15000 | 200 | 21 |
| 3 | Y-1 | W-3 | G-1 | 100 | H-1 | 10 | 11.0 | 15000 | 1014 | 21 |
| 4 | Y-2 | W-4 | G-2 | 100 | H-1 | 5 | 1.1 | 15000 | 200 | 10 |
| 5 | Y-3 | W-4 | G-2 | 100 | H-1 | 5 | 1.1 | 15000 | 200 | 100 |
| C-1 | Y-1 | W-5 | G-3 | 100 | H-1 | 1 | 1.0 | 5000 | 150 | 21 |
| C-2 | Y-4 | W-6 | G-3 | 100 | H-1 | 10 | 5.5 | 15000 | 800 | 300 |

In Table 5, NV % indicates % by mass of the solid content.

Production Example of Fine Particles

Production Example of Fine Particles 1

Preparation Step of Precursor Aqueous Solution 1

A total of 60.0 parts of ion-exchanged water was weighed into a reaction vessel equipped with a stirrer and a thermometer, and the pH was adjusted to 3.0 using 10% by mass hydrochloric acid. This was heated with stirring to bring the temperature to 60° C. After that, 40.0 parts of methyltrimethoxysilane was added and stirred for 2 h. After visually confirming that the oil layer and the water layer were not separated and became one layer, the mixture was cooled to obtain a precursor aqueous solution 1.

Polymerization Step

A total of 1000.0 parts of ion-exchanged water was weighed into a reaction vessel equipped with a stirrer and a thermometer, and 6.0 parts of NOIGEN EA177 (manufactured by DKS Co., Ltd.) and 380.0 parts of PMMA particles (non-crosslinked type, number-average particle diameter 10 μm) were added. The mixture was heated with stirring at 180 rpm, and the temperature was brought to 50° C. and kept for 30 min. A total of 34.0 parts of precursor aqueous solution 1 was added while stirring was continued.

The mixture was kept as it was for 30 min, and the pH was adjusted to 9.0 using an aqueous sodium hydroxide solution. This was kept as it was for another 300 min to form substantially hemispherical fine particles composed of the organosilicon polymer on the surface of the PMMA particles.

Washing Step

After the polymerization process was completed, the reaction solution was cooled and solid-liquid separated with a pressure filter to obtain a cake of PMMA particles on which fine particles were formed. This was re-slurried with ion-exchanged water to obtain a dispersion liquid again, and then subjected to solid-liquid separation again with a filter. After repeating re-slurrying and solid-liquid separation several times, solid-liquid separation was finally performed to obtain a cake of PMMA particles on which fine particles were formed.

Separation and Drying Step

After completion of the washing step, the cake of PMMA particles on which fine particles were formed was added to 1000.0 parts of acetone in a reaction vessel equipped with a stirrer, and the mixture was kept for 1 h while being stirred at 180 rpm. After visually confirming that the PMMA particles were sufficiently dissolved, centrifugation was performed at 15,000 rpm for 10 min, the precipitate was recovered, and vacuum drying was performed. Pulverization treatment was performed by a pulverizer (manufactured by Hosokawa Micron Corporation), and substantially hemispherical fine particles were separated using an air force classifier to obtain substantially hemispherical fine particles 1 having a substantially flat surface and a curved surface. Table 7 shows the physical properties of the fine particles 1 obtained.

Production Examples of Fine Particles 2 to 6, C-1, and C-2

Fine particles 2 to 6, C-1, and C-2 were obtained in the same manner as in the production example of substantially hemispherical fine particles 1, except that formulations and production conditions shown in Table 6 were used. Table 7 shows the physical properties of the fine particles 2 to 6, C-1 and C-2 obtained.

Second Step

A total of 440.0 parts of water was put into a reaction vessel equipped with a thermometer, a stirrer, and a dropping device, and 17.0 parts of ammonia water with a concentration of 10.0% by mass was added to obtain a homogeneous solution.

While stirring this at a temperature of 35° C., 100.0 parts of the reaction liquid obtained in the first step was added dropwise over 0.5 h, and stirring was performed for 6 h to obtain a suspension.

The obtained suspension was centrifuged to precipitate fine particles, which were taken out and dried in a dryer at a temperature of 200° C. for 24 h to obtain fine particles C-3. The fine particles C-3 thus obtained had a substantially spherical shape without a flat surface (end surface). For the fine particles C-3, which are spherical, the number-average value of the longest diameter was measured in the same way as w above on an arbitrary projected plane. This is shown in Table 7 as w of the fine particles C-3.

TABLE 6

| | Monomer | | Base material | | Polymerization conditions | | | |
|---|---|---|---|---|---|---|---|---|
| Fine particles | Type | Number of parts*1 | Material | Particle diameter (μm) | pH | Temperature (° C.) | Time after pH adjustment (h.) | Number of parts*2 |
| 1 | Methyltri methoxysilane | 40.0 | PMMA particles | 10 | 9.0 | 50 | 5 | 34.0 |
| 2 | Methyltri methoxysilane | 40.0 | PMMA particles | 10 | 9.0 | 50 | 5 | 12.0 |
| 3 | Methyltri methoxysilane | 40.0 | PMMA particles | 10 | 9.0 | 50 | 5 | 15.0 |
| 4 | Methyltri methoxysilane | 40.0 | PMMA particles | 10 | 9.0 | 50 | 5 | 56.0 |
| 5 | Methyltri methoxysilane | 40.0 | PMMA particles | 10 | 9.0 | 80 | 5 | 91.0 |
| 6 | Methyltri methoxysilane | 40.0 | PMMA particles | 10 | 9.0 | 30 | 5 | 34.0 |
| C-1 | Methyltri methoxysilane | 40.0 | PMMA particles | 10 | 9.0 | 50 | 5 | 10.0 |
| C-2 | Methyltri methoxysilane | 40.0 | PMMA particles | 10 | 9.0 | 50 | 5 | 98.0 |
| C-3 | Described in the specification | | | | | | | |
| C-4 | Described in the specification | | | | | | | |

In Table 6, "Number of parts*1" for monomer indicates a number of parts of monomer in the production step of precursor aqueous solution (parts). "Number of parts*2" for polymerization condition indicates a number of parts of precursor aqueous solution added (parts).

Production Example of Fine Particles C-3

First Step

A total of 360.0 parts of water was put into a reaction vessel equipped with a thermometer and a stirrer, and 15.0 parts of hydrochloric acid with a concentration of 5.0% by mass was added to obtain a homogeneous solution. A total of 136.0 parts of methyltrimethoxysilane was added with stirring at a temperature of 25° C., and filtration was performed after stirring for 5 h to obtain a transparent reaction liquid comprising a silanol compound or a partial condensate thereof.

Production Example of Fine Particles C-4

Finely powdered talc (trade name: P-8, manufactured by Nippon Talc Co., Ltd.) was used as fine particles C-3. The finely powdered talc had a flattened shape. The number-average value of the longest diameter on the flat surface of the finely powdered talc was measured using the above-described method for measuring w for the finely powdered talc. This is shown in Table 7 as w for finely powdered talc.

TABLE 7

| Fine particles | Number-average value of ratio ratio df/h | ratio l1/l2 | ratio s1/s2 | Substantially hemispherical shape | Presence of substantially flat surface | Longest diameter w (nm) | Ratio h/b | Structures |
|---|---|---|---|---|---|---|---|---|
| 1 | 0.02 | 0.93 | 1.04 | Yes | Yes | 88 | 0.55 | Formula (T) |
| 2 | 0.02 | 1.09 | 0.93 | Yes | Yes | 16 | 0.55 | Formula (T) |
| 3 | 0.05 | 1.10 | 0.95 | Yes | Yes | 31 | 0.56 | Formula (T) |
| 4 | 0.05 | 0.96 | 1.08 | Yes | Yes | 233 | 0.51 | Formula (T) |
| 5 | 0.03 | 1.01 | 0.95 | Yes | Yes | 365 | 0.74 | Formula (T) |
| 6 | 0.04 | 0.98 | 1.08 | Yes | Yes | 95 | 0.34 | Formula (T) |
| C-1 | 0.03 | 0.96 | 1.07 | Yes | Yes | 8 | 0.59 | Formula (T) |
| C-2 | 0.05 | 1.06 | 0.98 | Yes | Yes | 427 | 0.51 | Formula (T) |
| C-3 | Calculation is im possible | Calculation is impossible | Calculation is impossible | No (spherical) | No | 100 | Calculation is impossible | Formula (T) |
| C-4 | Calculation is impossible | Calculation is impossible | Calculation is impossible | No (flat) | Yes | 318 | Calculation is impossible | Formula (Q) |

In column "Substantially hemispherical shape", "Yes" indicates that the fine particles have a substantially hemispherical shape and "No" indicates that the fine particles do not have a substantially hemispherical shape.
In column "Presence of substantially flat surface", "Yes" indicates that the fine particles have a substantially flat surface and "No" indicates that the fine particles do not have a substantially flat surface.
"Longest diameter w" indicates a number-average value of longest diameter w (nm).
"Ratio h/b" indicates a number-average value of ratio h/b.
"Structures" indicates which structure the fine particles have.

In column "Substantially hemispherical shape", "Yes" indicates that the fine particles have a substantially hemispherical shape and "No" indicates that the fine particles do not have a substantially hemispherical shape.

Production Example of Toner Supply Roller

Production Example of Toner Supply Roller 1

A core made of stainless steel (SUS304) with an outer diameter of 5 mm and a length of 254 mm was placed as a substrate in a mold consisting of a cylindrical member with an inner diameter of 13 mm that was coated on the inner surface with a release agent, an upper bridge member, and a lower bridge member. The following materials (A), (B), (E) to (I) were blended, and a urethane rubber composition obtained by mixing the blend was injected into a cavity formed in the mold.

(A): Ion conductive agent (lithium bis(trifluoromethanesulfonyl)imide, trade name: EF-N115, manufactured by Mitsubishi Materials Corporation): 5.0 parts
(B): Polyol (polyethylene propylene ether triol having a number-average molecular weight of 2000, trade name: ACTCALL EP-550N; manufactured by Mitsui Chemicals, Inc.): 100.0 parts
(E): Polyisocyanate mixture (NCO %=45, contains MDI=20%, trade name: COSMONATE TM20; manufactured by Mitsui Chemicals, Inc.): 24.4 parts
(F): Silicone foam stabilizer (trade name: SRX274C, manufactured by Dow Corning Toray Co., Ltd.): 1.0 part
(G): Tertiary amine catalyst (mixture of bis(2-dimethylaminoethyl) ether and dipropylene glycol, trade name: TOYOCAT-ET, manufactured by Tosoh Corporation): 0.3 parts
(H): Amine catalyst B (trade name: TOYOCAT-L33, manufactured by Tosoh Corporation): 0.2 parts
(I): Blowing agent (water): 1.4 parts Subsequently, the mold was heated to 70° C. to foam and cure the urethane rubber composition for 10 min, and the substrate having the foamed elastic layer formed on the peripheral surface was removed from the mold. A toner supply roller according to Example 1 having a foamed elastic layer with a diameter of 16.5 mm on the outer circumference of the substrate was thus produced.

Production Example of Toner Supply Roller 2

A toner supply roller 2 was produced in the same manner as in the production example of the toner supply roller 1, except that no ion conductive agent (A) was used.

Production Example of Toner Supply Roller 3

A toner supply roller 3 was produced in the same manner as in the production example of the toner supply roller 1, except that the ion conductive agent (A) was changed to 5.0 parts of lithium perchlorate (manufactured by Nippon Carlit Co., Ltd.).

Production Example of Toner

Production Example of Toner Particle 1

Preparation Step of Aqueous Medium

To 1000.0 parts of ion-exchanged water in a reaction vessel, 14.0 parts of sodium phosphate (12 hydrate, manufactured by Rasa Kogyo Co., Ltd.) was added, and the temperature was kept at 65° C. for 1 h while purging with nitrogen. A calcium chloride aqueous solution obtained by dissolving 9.2 parts of calcium chloride (dihydrate) in 10.0 parts of ion-exchanged water was added as a whole while stirring at 12,000 rpm using T. K. Homomixer (manufactured by Tokushu Kika Kogyo Co., Ltd.) to prepare an aqueous medium comprising a dispersion stabilizer. Furthermore, 10% by mass hydrochloric acid was added to the aqueous medium to adjust the pH to 6.0 to obtain an aqueous medium.

Preparation Step of Polymerizable Monomer Composition

Styrene: 60.0 parts
C. I. Pigment Blue 15:3: 6.5 parts

The above materials were put into an attritor (manufactured by Mitsui Miike Kakoki Co., Ltd.) and further dispersed at 220 rpm for 5 h using zirconia particles with a diameter of 1.7 mm to prepare a pigment dispersion liquid. The following materials were added to this pigment dispersion liquid.

Styrene: 11.0 parts
n-Butyl acrylate: 29.0 parts
Crosslinking agent (divinylbenzene): 0.2 parts
Saturated polyester resin: 6.0 parts (condensation product of propylene oxide-modified bisphenol A (2 mol adduct) and terephthalic acid (molar ratio 10:12), glass transition temperature Tg=68° C., weight-average molecular weight Mw=10,000, molecular weight distribution Mw/Mn=5.12)
Fischer-Tropsch wax (melting point 78° C.): 10.0 parts
Charge control agent: 0.5 parts Aluminum Compound of 3,5-di-tert-butylsalicylic acid This was kept at 65° C. and uniformly dissolved and dispersed at 500 rpm using T. K. Homomixer (manufactured by Tokushu Kika Kogyo Co., Ltd.) to prepare a polymerizable monomer composition.

Granulation Step

While keeping the temperature of the aqueous medium at 70° C. and the rotation speed of the stirrer at 12,000 rpm, the polymerizable monomer composition was loaded into the aqueous medium, and 9.0 parts of t-butyl peroxypivalate as a polymerization initiator was added. Granulation was performed for 10 min while maintaining the rotation speed of the stirring device at 12,000 rpm.

Polymerization Step

The stirrer was changed from the high-speed stirring device to a propeller stirring blade, polymerization was carried out for 5 h while stirring at 150 rpm and keeping the temperature at 70° C., and a polymerization reaction was performed by raising the temperature to 95° C. and heating for 5 h to obtain a slurry of toner particles.

Washing and Drying Step

After the polymerization step, the slurry of toner particles was cooled, and hydrochloric acid was added to the slurry of toner particles to adjust the pH of the system to 1.5 or less, and after stirring for 1 h, solid-liquid separation was performed in a pressure filter to obtain a toner cake. After re-slurrying the toner cake with ion-exchanged water to obtain a dispersion liquid again, solid-liquid separation was performed again with the pressure filter. Reslurrying and solid/liquid separation were continued until the electrical conductivity of the filtrate became 5.0 μS/cm or less, and the final solid/liquid separation provided a toner cake.

The resulting toner cake was dried with a flash dryer Flash Jet Dryer (manufactured by Seishin Enterprise Co., Ltd.), and a multi-division classifier utilizing the Coanda effect was used to cut fine and coarse particles to obtain toner particles 1. The drying conditions were such that the blowing temperature was 90° C., the outlet temperature of the dryer was 40° C., and the feeding speed of the toner cake was adjusted so that the outlet temperature did not deviate from 40° C. according to the moisture content of the toner cake. The weight-average particle diameter of the obtained toner particles 1 was 6.2 μm.

Production Example of Toner 1

External Addition Step

Toner 1 was obtained by mixing the following materials with a Henschel mixer (Model FM-10 manufactured by Nippon Coke Industry Co., Ltd.).

Toner particles 1: 100.0 parts
Silica particles 2 (trade name: NX90S, manufactured by Nippon Aerosil Co., Ltd.): 1.5 parts The rotation speed of the stirring blade of the Henschel mixer was 3,600 rpm, the mixing time was 5 min, and the jacket temperature was adjusted to 10° C.

The obtained toner mixture 1 was sieved through a mesh with an opening of 109 μm to obtain toner 1.

Production Example of Silica Particles 1

A total of 100 parts of original silica fine particles (trade name: AEROSIL 380, manufactured by Nippon Aerosil Co., Ltd., original BET specific surface area: 380 $m^2/g$) obtained by gas-phase oxidation and high-temperature baking was added to a hexane solution including 10 parts of hexamethyldisilazane and 20 parts of dimethylpolysiloxane (trade name: KF-96-100cs, manufactured by Shin-Etsu Chemical Co., Ltd.), and hydrophobization was performed at 350° C. After the treatment, pulverization was performed using a pin mill under the condition of a peripheral speed of 70 m/sec, and further classification treatment was performed to adjust the particle diameter and obtain silica particles 1 (average primary particle diameter 7 nm, measured BET specific surface area 300 $m^2/g$).

Here, Table 8 shows silica particles used as an external additive. The average particle diameter in the table refers to the number-average particle diameter of primary particles.

TABLE 8

| Silica particles | Number-average particle diameter (nm) | Material |
|---|---|---|
| Silica particles 1 | 7 | Described in the specification |
| Silica particles 2 | 20 | NX90S (Manufactured by Nippon Aerosil Co., Ltd.) |
| Silica particles 3 | 100 | Sciqas 0.1 μm (Manufactured by Sakai Chemical Industry Co., Ltd.) |
| Silica particles 4 | 400 | Sciqas 0.4 μm (Manufactured by Sakai Chemical Industry Co., Ltd.) |

Production Example of Hydrotalcite Particles 1

A mixed aqueous solution of 1.03 mol/L magnesium chloride and 0.239 mol/L aluminum sulfate (solution A), a 0.753 mol/L sodium carbonate aqueous solution (solution B), and a 3.39 mol/L sodium hydroxide aqueous solution (C solution) were prepared.

Next, using a metering pump, solutions A, B, and C were added to the reaction vessel at a flow rate that gave a volume ratio of 4.5:1 for solution A:solution B, the pH value of the reaction liquid was maintained in the range of 9.3 to 9.6 with the solution C, and the reaction temperature was 40° C. to form a precipitate. After filtration and washing, the slurry was re-emulsified with ion-exchanged water to obtain a raw hydrotalcite slurry. The concentration of hydrotalcite in the resulting hydrotalcite slurry was 5.6% by mass.

The obtained hydrotalcite slurry was vacuum dried overnight at 40° C. Next, the dried hydrotalcite was added to ion-exchange water to obtain 0.1% (w/v %). Stirring was carried out at a constant speed for 48 h using a magnetic stirrer to prevent precipitation. Then, filtration through a membrane filter with a pore size of 0.5 μm and washing with ion-exchanged water were performed. The obtained hydrotalcite was vacuum-dried at 40° C. overnight, and then pulverization treatment was performed. Table 9 shows the composition and physical properties of the obtained hydrotalcite particles 1.

Production Example of Hydrotalcite Particles 2

A hydrotalcite slurry was obtained in the same manner as in the production example of hydrotalcite particles 1. The obtained hydrotalcite slurry was vacuum dried overnight at 40° C. A solution was prepared by dissolving NaF in ion-exchanged water to obtain a concentration of 100 mg/L and adjusting pH to 7.0 using 1 mol/L HCl or 1 mol/L NaOH, and dried hydrotalcite was added to the solution to obtain 0.1% (w/v %). Stirring was carried out at a constant speed for 48 h using a magnetic stirrer to prevent precipitation. Then, filtration through a membrane filter with a pore size of 0.5 μm and washing with ion-exchanged water were performed. The obtained hydrotalcite was vacuum-dried at 40° C. overnight and then pulverization treatment was performed. Table 9 shows the composition and physical properties of the obtained hydrotalcite particles 2.

Production Examples of Hydrotalcite Particles 3 and 4

Hydrotalcite particles 3 and 4 were obtained in the same manner as in the production example of hydrotalcite particles 2, except that the solution A:solution B ratio and the concentration of NaF aqueous solution were adjusted as appropriate. Table 9 shows the composition and physical properties of the obtained hydrotalcite particles 3 and 4. The average particle diameter in the table refers to the number-average particle diameter of primary particles.

TABLE 9

| Hydrotalcite particles | Mg/Al ratio | F/Al ratio | Number-average particle diameter (nm) |
|---|---|---|---|
| 1 | 2.1 | 0.00 | 400 |
| 2 | 2.2 | 0.12 | 400 |
| 3 | 2.1 | 0.01 | 400 |
| 4 | 2.1 | 0.60 | 400 |

Production Examples of Toners 2 to 12 and C-1

Toners 2 to 12 and C-1 were obtained in the same manner as in the production example of toner 1, except that the type of silica particles, the type of hydrotalcite particles, the number of parts added, the rotation speed of the stirring blade when mixing the external addition, the mixing time, and the jacket temperature in the production example of toner 1 were changed as shown in Table 10. Table 10 shows the adhesion rate of silica particles in each resulting toner. The number of parts added in the table represents parts by mass with respect to 100 parts by mass of toner particles.

TABLE 10

| | Silica particles | | | Hydrotalcite particles | | External addition conditions | | | Adhesion rate of |
|---|---|---|---|---|---|---|---|---|---|
| Toner | No. | Particle diameter (nm) | Number of parts added (parts) | No. | Number of parts added (parts) | Rotation speed (rpm) | Mixing time (min) | Jacket temperature (° C.) | silica particles (%) |
| 1 | 2 | 20 | 1.5 | — | — | 3600 | 5 | 10 | 70 |
| 2 | 2 | 20 | 1.5 | — | — | 3300 | 5 | 10 | 50 |
| 3 | 2 | 20 | 1.5 | — | — | 4000 | 15 | 10 | 90 |
| 4 | 1 | 7 | 0.5 | — | — | 3000 | 5 | 10 | 50 |
| 5 | 1 | 7 | 3.0 | — | — | 3000 | 10 | 10 | 50 |
| 6 | 3 | 100 | 0.5 | — | — | 4000 | 10 | 30 | 50 |
| 7 | 4 | 400 | 0.5 | — | — | 4000 | 10 | 40 | 50 |
| 8 | 4 | 400 | 3.0 | — | — | 4000 | 30 | 40 | 50 |
| 9 | 2 | 20 | 3.0 | 1 | 0.1 | 3600 | 5 | 10 | 70 |
| 10 | 2 | 20 | 3.0 | 2 | 0.1 | 3600 | 5 | 10 | 70 |
| 11 | 2 | 20 | 3.0 | 3 | 0.1 | 3600 | 5 | 10 | 70 |
| 12 | 2 | 20 | 3.0 | 4 | 0.1 | 3600 | 5 | 10 | 70 |
| C-1 | 2 | 20 | 1.5 | — | — | 2800 | 5 | 10 | 30 |

Production Examples of Developing Devices

Production Example of Developing Device 1

Production Step of Developing Roller 1A Having Fine Particles 1 Attached to Outer Surface After extracting the existing toner from the developing device of a process cartridge (trade name: CE411A Cyan, manufactured by Hewlett-Packard Inc.), 30 g of fine particles 1 were added. Next, after pulling out the existing developing roller from the developing device, the developing roller 1 was assembled. After that, a seal member was removed from the developing device.

Then, the process cartridge having the developing device was mounted on an electrophotographic apparatus (trade name: LaserJetPro400color, manufactured by Hewlett-Packard Inc.), and paper was passed for 30 min to attach the fine particles 1 to the outer surface of the developing roller 1.

After passing the paper, the developing roller 1 was pulled out from the developing device, and excess fine particles 1 were removed by air blowing to produce a developing roller 1A having the fine particles 1 attached to the outer surface. Table 11 shows the fine particle amount of the developing roller 1A having the fine particles 1 attached to the outer surface that was under the same conditions.

Production Step of Developing Device 1

The developing device was taken out of an unused process cartridge (CE411A Cyan, manufactured by Hewlett-Packard Inc.).

Then, after extracting the existing toner from the developing device, 50 g of toner 1 was filled.

Further, the existing developing roller, developing blade, and toner supply roller were taken out of the developing device, and the toner supply roller 1 was assembled. After the existing developing blade was assembled at the same position as before it was taken out, the developing roller 1A having the fine particles 1 attached to the outer surface was assembled to produce the developing device 1.

Production Examples of Developing Devices 2 to 28 and C-1 to C-7

Developing devices 2 to 28 and C-1 to C-7 were produced in the same manner as in the production example of the developing device 1, except that in the production example of the developing device 1, the paper passing time in the step of attaching the fine particles to the outer surface of the developing roller was changed as appropriate and the developing roller, fine particles, toner supply roller, and toner were changed as shown in Table 11. Table 11 shows the fine particle amount of the developing roller 1 having the fine particles 1 on the outer surface that was produced under each condition.

The developing rollers 1A to 5A, C-1A, and C-2A are developing rollers 1 to 5, C-1, and C-2, respectively, to which fine particles have been attached as shown in Table 11.

The developing rollers in the developing devices 1 to 29, C-1 to C-4 and C-7 had a plurality of fine particles attached to the outer surface. Further, the substantially flat surface of each of the fine particles attached to the outer surface of the developing roller in the developing devices 1 to 29, C-1 to C-4 and C-7 was in surface contact with the outer surface of the surface layer of the developing roller, each fine particle formed a protruding portion on the outer surface of the surface layer, and at least a part of the protruding portion was composed of a curved surface.

Meanwhile, in the developing rollers of the developing devices C-5 and C-6, such substantially flat surfaces and protrusions were not observed.

TABLE 11

| Developing device No. | Developing roller No. | Fine particles No. | Fine particles Attached amount atm. % | Toner supply roller No. | Toner No. |
|---|---|---|---|---|---|
| 1 | 1A | 1 | 9.9 | 1 | 1 |
| 2 | 2A | 1 | 10.1 | 1 | 1 |
| 3 | 3A | 1 | 9.8 | 1 | 1 |
| 4 | 4A | 1 | 9.7 | 1 | 1 |
| 5 | 5A | 1 | 10.1 | 1 | 1 |
| 6 | 1A | 2 | 9.9 | 1 | 1 |
| 7 | 1A | 3 | 9.5 | 1 | 1 |
| 8 | 1A | 4 | 9.6 | 1 | 1 |
| 9 | 1A | 5 | 10.2 | 1 | 1 |
| 10 | 1A | 6 | 9.7 | 1 | 1 |
| 11 | 1A | 5 | 3.0 | 1 | 1 |
| 12 | 1A | 2 | 9.6 | 1 | 2 |
| 13 | 1A | 2 | 9.5 | 1 | 3 |
| 14 | 1A | 2 | 10.3 | 1 | 4 |
| 15 | 1A | 2 | 10.0 | 1 | 5 |
| 16 | 1A | 2 | 9.7 | 1 | 6 |
| 17 | 1A | 2 | 9.7 | 1 | 7 |
| 18 | 1A | 2 | 9.7 | 1 | 8 |
| 19 | 1A | 1 | 10.4 | 2 | 1 |
| 20 | 1A | 1 | 9.9 | 2 | 9 |
| 21 | 1A | 1 | 10.2 | 3 | 1 |
| 22 | 1A | 1 | 10.1 | 3 | 9 |
| 23 | 1A | 1 | 10.3 | 3 | 10 |
| 24 | 1A | 1 | 9.6 | 1 | 9 |
| 25 | 1A | 1 | 10.1 | 1 | 10 |
| 26 | 1A | 1 | 10.3 | 1 | 11 |

TABLE 11-continued

| Developing device No. | Developing roller No. | Fine particles No. | Fine particles Attached amount atm. % | Toner supply roller No. | Toner No. |
|---|---|---|---|---|---|
| 27 | 1A | 1 | 10.3 | 1 | 12 |
| 28 | 4A | 2 | 3.0 | 1 | 7 |
| 29 | 5A | 5 | 3.0 | 1 | 5 |
| C-1 | C-1A | 1 | 3.3 | 1 | 7 |
| C-2 | C-2A | 1 | 3.1 | 1 | 7 |
| C-3 | 5A | C-1 | 9.9 | 1 | 7 |
| C-4 | 5A | C-2 | 10.0 | 1 | 7 |
| C-5 | 5A | C-3 | 10.1 | 1 | 7 |
| C-6 | 5A | C-4 | 9.8 | 1 | 7 |
| C-7 | 5A | 2 | 9.8 | 1 | C-1 |

In the table, the attached amount is the amount of fine particles on the outer surface of the surface layer of the developing roller to which the fine particles were attached. atm. % indicates atomic %.

Example 1

The following evaluations were made for the developing device 1. Evaluation results are shown in Table 12.

Band Image Evaluation after Allowing to Stand for Long Period of Time in High-Temperature and High-Humidity Environment The developing device 1 was allowed to stand in an environment of 40° C. and 95% RH for 30 days.

Next, after taking the developing device 1 out of the above environment, the developing device was assembled into the above process cartridge and allowed to stand in the environment of 23° C. and 55% RH for 24 h.

Next, the process cartridge assembled with the developing device 1 was allowed to stand in an environment of 30° C. and 80% RH for 24 h.

Next, the seal member was removed from the developing device 1 under the same environment, and the developing device was mounted on an image forming apparatus (trade name: LaserJetPro400color, manufactured by HP Inc.). After the power of the image forming apparatus was turned on and the initial sequence was executed, the following evaluation images were continuously output to evaluate the band image.

Evaluation Images

- Halftone image: 1 sheet (1st sheet of continuous paper feeding)
- Solid white image: 18 sheets
- Halftone image: 1 sheet (20th sheet of continuous paper feeding)
- Solid white image: 19 sheets
- Halftone image: 1 sheet (40th sheet of continuous paper feeding)
- Solid white image: 19 sheets
- Halftone image: 1 sheet (60th sheet of continuous paper feeding)
- Solid white image: 19 sheets
- Halftone image: 1 sheet (80th sheet of continuous paper feeding)
- Solid white image: 19 sheets
- Halftone image: 1 sheet (100th sheet of continuous paper feeding)

Band Image Evaluation

In each halftone image obtained by the above continuous paper feeding, the band images occurring with the developing roller pitch were evaluated according to the following evaluation criteria.

Rank A: bands with the developing roller pitch cannot be visually recognized on the image.

Rank B: bands with the developing roller pitch are very slightly visible on the image.

Rank C: bands with the developing roller pitch are slightly visible on the image.

Rank D bands with the developing roller pitch are clearly visible on the image.

Examples 2 to 29 and Comparative Examples 1 to 7

Band images after allowing to stand for a long period of time in a high-temperature and high-humidity environment were evaluated in the same manner as in Example 1, except that developing device 1 was changed to developing devices 2 to 29 and C-1 to C-7. Table 12 shows the evaluation results of Examples 2 to 29 and Comparative Examples 1 to 7.

TABLE 12

| Example/ Comparative Example | Developing device No. | Band image evaluation rank | | | | | |
|---|---|---|---|---|---|---|---|
| | | 1st sheet | 20th sheet | 40th sheet | 60th sheet | 80th sheet | 100th sheet |
| Example 1 | 1 | C | B | B | A | A | A |
| Example 2 | 2 | C | C | B | B | B | A |
| Example 3 | 3 | C | B | B | A | A | A |
| Example 4 | 4 | C | C | B | B | A | A |
| Example 5 | 5 | C | C | C | B | B | 8 |
| Example 6 | 6 | C | C | B | B | B | A |
| Example 7 | 7 | C | C | B | B | A | A |
| Example 8 | 8 | C | C | C | B | B | 8 |
| Example 9 | 9 | C | C | B | B | B | B |
| Example 10 | 10 | C | C | B | B | A | A |
| Example 11 | 11 | C | B | B | B | B | B |
| Example 12 | 12 | C | C | B | B | B | A |
| Example 13 | 13 | B | B | A | A | A | A |
| Example 14 | 14 | C | C | C | B | B | A |
| Example 15 | 15 | C | C | B | B | B | A |
| Example 16 | 16 | C | C | C | B | B | A |
| Example 17 | 17 | C | C | C | C | B | B |
| Example 18 | 18 | C | C | C | B | B | A |
| Example 19 | 19 | B | B | A | A | A | A |
| Example 20 | 20 | B | B | A | A | A | A |
| Example 21 | 21 | C | B | B | A | A | A |
| Example 22 | 22 | C | B | A | A | A | A |
| Example 23 | 23 | C | B | A | A | A | A |
| Example 24 | 24 | C | B | A | A | A | A |
| Example 25 | 25 | B | A | A | A | A | A |
| Example 26 | 26 | B | A | A | A | A | A |
| Example 27 | 27 | B | A | A | A | A | A |
| Example 28 | 28 | C | C | C | C | C | B |
| Example 29 | 29 | C | C | C | C | C | B |
| Comparative Example 1 | C-1 | D | D | D | D | C | C |
| Comparative Example 2 | C-2 | D | D | D | C | C | C |
| Comparative Example 3 | C-3 | D | D | D | C | C | C |
| Comparative Example 4 | C-4 | D | D | C | C | C | C |
| Comparative Example 5 | C-5 | D | D | D | D | D | D |
| Comparative Example 6 | C-6 | D | D | D | D | D | C |
| Comparative Example 7 | C-7 | D | D | D | C | C | C |

As shown in Table 12, with the developing device according to one aspect of the present disclosure, even after the developing device was allowed to stand for a long period of time in a high-temperature and high-humidity environment, band images could be quickly recovered by the initial sequence and image output although the developing roller was increased in hardness only in the vicinity of the outermost surface.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-146783, filed Sep. 15, 2022, which is hereby incorporated by reference herein in its entirety.

What is claimed is:

1. A developing device comprising:

a developing roller;

a toner; and a toner supply roller that supplies the toner to the developing roller, the developing roller comprising:

an electro-conductive substrate; and a surface layer on the electro-conductive substrate, the surface layer being composed of a single layer, wherein the surface layer has a matrix comprising a crosslinked urethane resin as a binder, wherein when an elastic modulus of the matrix in a first region in a cross section in a thickness direction of the surface layer is defined as E1, the first region being from an outer surface of the surface layer to a position at a depth of 0.1 μm from the outer surface, and an elastic modulus of the matrix in a second region in the cross section is defined as E2, the second region being from a position at a depth of 1.0 μm from the outer surface to a position at a depth of 1.1 μm from the outer surface, E1 and E2 satisfy following relational expressions (1) and (2):

$$E1 \geq 200\ \text{MPa} \quad (1)$$

$$10\ \text{MPa} \leq E2 \leq 100\ \text{MPa} \quad (2), \text{ and}$$

wherein:

fine particles are attached to the outer surface of the surface layer, and the fine particles form protrusions on the outer surface of the surface layer;

each of the fine particles comprises an organosilicon compound, and in a cross-sectional view of each of the fine particles and the outer surface of the surface layer, each of the fine particles has a substantially flat surface that is in surface contact with the outer surface of the surface layer and a curved surface that constitutes at least a part of each of the protrusions;

a number-average value of the longest diameter w of the substantially flat surface of the fine particles is 10 nm to 400 nm;

the toner comprises a toner particle and silica particles as an external additive;

the toner particle comprises a binder resin; and an adhesion rate of the silica particles to the toner particle measured by a water washing method is 50% or more.

2. The developing device according to claim 1, wherein a number average value of a ratio h/b of a maximum height h to a maximum width b is 0.30 to 0.80, where in a cross section that intersects with the substantially flat surface of the fine particle, assuming that:

a straight line that connects two points Pa and Pb of intersections of a line Lf and a line Lc is defined as an imaginary straight line Li, the line Lf corresponding to the substantially flat surface, and the line Lc being corresponding to the curved surface;

in a straight line Ls1 vertically intersecting the imaginary straight line Li, such a distance that one of distances Da and db that becomes maximum is defined as the maximum height h, the distance Da being a distance between a point Pc and a point Pe, the point Pc being a point of intersection of the imaginary straight line Li and the straight line Ls1, the point Pe being a point of intersection of the line Lc and the straight line Ls1, the distance db being a distance between a point Pd and the point Pe, the point Pd being a point of intersection of the line Lf and the straight line Ls1; and in a straight line Ls2 parallel to the imaginary straight line Li, such a distance Dc that becomes maximum is defined as the maximum width b, the distance Dc being a distance between two points Pf and Pg of intersection of the straight line Ls2 and the line Lc.

3. The developing device according to claim 1, wherein when observing the outer surface of the surface layer to which the fine particles are attached by EDS elemental analysis, an amount of the fine particles on the outer surface of the surface layer is 3.0 atomic % or more.

4. The developing device according to claim 1, wherein a number-average particle diameter of primary particles of the silica particles is 7 nm to 400 nm.

5. The developing device according to claim 1, wherein a content of the silica particles is 0.5 parts by mass to 3.0 parts by mass with respect to 100 parts by mass of the toner particle.

6. The developing device according to claim 1, wherein the toner supply roller has an electro-conductive substrate and a foamed elastic layer on the substrate, the foamed elastic layer comprises an ion conductive agent, and the toner further comprises hydrotalcite particles as an external additive.

7. The developing device according to claim 6, wherein the ion conductive agent comprises fluorine as an anion component, and the fluorine is present inside the hydrotalcite particles in a line analysis in a STEM-EDS mapping analysis of the toner.

8. The developing device according to claim 7, wherein in the line analysis in the STEM-EDS mapping analysis of the toner, fluorine and aluminum are present inside the hydrotalcite particles, and a value F/Al is 0.01 to 0.60, where F is an atomic number concentration of the fluorine in the hydrotalcite particles, and Al is an atomic number concentration in the hydrotalcite particles, both of which are obtained from a principal component mapping of the hydrotalcite particles by the STEM-EDS mapping analysis of the toner.

9. A method of cleaning an outer surface of a developing roller, to which said outer surface a plurality of fine particles are attached, wherein the developing roller comprises an electro-conductive substrate and a surface layer on the electro-conductive substrate, the surface layer being composed of a single layer, and the surface layer has a matrix comprising a crosslinked urethane resin as a binder, wherein when an elastic modulus of the matrix in a first region in a cross section in a thickness direction of the surface layer is defined as E1, the first region being from the outer surface of the surface layer to a position at a depth of 0.1 μm from the outer surface, and an elastic modulus of the matrix in a second region in the cross section is defined as E2, the second region being from a position at a depth of 1.0 μm from the outer surface to a position at a depth of 1.1 μm from the outer surface, E1 and E2 satisfy following formulas (1) and (2):

$$E1 \geq 200 \text{ MPa} \quad (1)$$

$$10 \text{ MPa} \leq E2 \leq 100 \text{ MPa} \quad (2)$$

wherein:

fine particles are attached to the outer surface of the surface layer, and the fine particles form protrusions on the outer surface of the surface layer;

each of the fine particles comprises an organosilicon compound, and in a cross-sectional view of each of the fine particles and the outer surface of the surface layer, each of the fine particles has a substantially flat surface that is in surface contact with the outer surface of the surface layer and a curved surface that constitutes at least a part of each of the protrusions; and a number-average value of the longest diameter w of the substantially flat surface of the fine particles is 10 nm to 400 nm, the cleaning method comprises the steps of:

supplying toner to the developing roller using a toner supply roller and removing the plurality of fine particles from the outer surface of the surface layer by bringing the toner into contact with the plurality of the fine particles attached to the outer surface of the surface layer, wherein:

the toner comprises a toner particle and silica particles as an external additive;

the toner particle comprises a binder resin; and an adhesion rate of the silica particles to the toner particle measured by a water washing method is 50% or more.

10. A process cartridge detachably mounted to a main body of an electrophotographic image forming apparatus, the process cartridge comprising a developing device, the developing device comprising developing roller, a toner, and a toner supply roller that supplies the toner to the developing roller, wherein the developing roller comprises:

an electro-conductive substrate; and a surface layer on the electro-conductive substrate, the surface layer being composed of a single layer, wherein the surface layer has a matrix comprising a crosslinked urethane resin as a binder, wherein when an elastic modulus of the matrix in a first region in a cross section in a thickness direction of the surface layer is defined as E1, the first region being from an outer surface of the surface layer to a position at a depth of 0.1 μm from the outer surface, and an elastic modulus of the matrix in a second region in the cross section is defined as E2, the second region being from a position at a depth of 1.0 μm from the outer surface to a position at a depth of 1.1 μm from the outer surface, E1 and E2 satisfy following relational expressions (1) and (2):

$$E1 \geq 200 \text{ MPa} \quad (1)$$

$$10 \text{ MPa} \leq E2 \leq 100 \text{ MPa} \quad (2), \text{ and}$$

wherein:

fine particles are attached to the outer surface of the surface layer, and the fine particles form protrusions on the outer surface of the surface layer;

each of the fine particles comprises an organosilicon compound, and in a cross-sectional view of each of the fine particles and the outer surface of the surface layer, each of the fine particles has a substantially flat surface that is in surface contact with the outer surface of the surface layer and a curved surface that constitutes at least a part of each of the protrusions;

a number-average value of the longest diameter w of the substantially flat surface of the fine particles is 10 nm to 400 nm;

the toner comprises a toner particle and silica particles as an external additive;

the toner particle comprises a binder resin; and an adhesion rate of the silica particles to the toner particle measured by a water washing method is 50% or more.

11. An electrophotographic image forming apparatus comprising a photosensitive member and a developing device that supplies a developer to an electrostatic latent image formed on the photosensitive member, the developing device comprising a developing roller, a toner, and a toner supply roller that supplies the toner to the developing roller, wherein the developing roller comprises:

an electro-conductive substrate; and a surface layer on the electro-conductive substrate, the surface layer being composed of a single layer, wherein the surface layer has a matrix comprising a crosslinked urethane resin as a binder, wherein when an elastic modulus of the matrix in a first region in a cross section in a thickness direction of the surface layer is defined as E1, the first region being from an outer surface of the surface layer to a position at a depth of 0.1 μm from the outer surface, and an elastic modulus of the matrix in a second region in the cross section is defined as E2, the second region being from a position at a depth of 1.0 μm from the outer surface to a position at a depth of 1.1 μm from the outer surface, E1 and E2 satisfy following relational expressions (1) and (2):

$$E1 \geq 200 \text{ MPa} \quad (1)$$

$$10 \text{ MPa} \leq E2 \leq 100 \text{ MPa} \quad (2)\text{, and}$$

wherein: fine particles are attached to the outer surface of the surface layer, and the fine particles form protrusions on the outer surface of the surface layer;

each of the fine particles comprises an organosilicon compound, and in a cross-sectional view of each of the fine particles and the outer surface of the surface layer, each of the fine particles has a substantially flat surface that is in surface contact with the outer surface of the surface layer and a curved surface that constitutes at least a part of each of the protrusions;

a number-average value of the longest diameter w of the substantially flat surface of the fine particles is 10 nm to 400 nm;

the toner comprises a toner particle and silica particles as an external additive;

the toner particle comprises a binder resin; and an adhesion rate of the silica particles to the toner particle measured by a water washing method is 50% or more.

* * * * *